(12) United States Patent
Hatridge et al.

(10) Patent No.: US 12,524,034 B2
(45) Date of Patent: Jan. 13, 2026

(54) PARAMETRICALLY-DRIVEN COHERENT SIGNAL ROUTER FOR QUANTUM COMPUTING AND RELATED METHODS

(71) Applicant: University of Pittsburgh—Of the Commonwealth System of Higher Education, Pittsburgh, PA (US)

(72) Inventors: Michael Jonathan Hatridge, Pittsburgh, PA (US); David Pekker, Pittsburgh, PA (US); Roger Mong, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 950 days.

(21) Appl. No.: 17/686,702

(22) Filed: Mar. 4, 2022

(65) Prior Publication Data
US 2022/0269301 A1 Aug. 25, 2022

Related U.S. Application Data

(63) Continuation of application No. PCT/US2020/041342, filed on Jul. 9, 2020.
(Continued)

(51) Int. Cl.
*G06F 1/02* (2006.01)
*G02F 1/35* (2006.01)
*G02F 1/365* (2006.01)

(52) U.S. Cl.
CPC ............ *G06F 1/022* (2013.01); *G02F 1/3534* (2013.01); *G02F 1/365* (2013.01)

(58) Field of Classification Search
CPC ......... G06F 1/022; G02F 1/3534; G02F 1/365
See application file for complete search history.

(56) References Cited

U.S. PATENT DOCUMENTS

| | | | |
|---|---|---|---|
| 8,244,082 B2 | 8/2012 | Pacher et al. | |
| 9,680,452 B1 * | 6/2017 | Abdo | H04B 10/70 |

(Continued)

FOREIGN PATENT DOCUMENTS

| | | |
|---|---|---|
| JP | 2016-170800 A | 9/2016 |
| JP | 2018-538680 A | 12/2018 |

(Continued)

OTHER PUBLICATIONS

Extended European Search Report for European Patent Application No. 20885475.2 dated Aug. 25, 2023 (15 pages).

(Continued)

*Primary Examiner* — Rhonda S Peace
(74) *Attorney, Agent, or Firm* — Goodwin Procter LLP

(57) ABSTRACT

Systems and methods are provided for routing quantum signals in a quantum computing system. An exemplary method includes providing a waveguide configured to be coupled to at least two modules and a nonlinear element, the waveguide configured to facilitate exchange of quantum information between the at least two modules, the waveguide having at least two waveguide modes, each waveguide mode having a respective frequency; providing a first module couplable to the waveguide at a first module frequency corresponding to a first waveguide mode and a second module couplable to the waveguide at a second mode frequency corresponding to a second waveguide mode; and driving the waveguide via the nonlinear element at a difference frequency equal to a difference between the first module frequency and the second module frequency, thereby causing exchange of quantum information between the first and the second modules.

20 Claims, 42 Drawing Sheets

Related U.S. Application Data

(60) Provisional application No. 62/900,101, filed on Sep. 13, 2019.

(56) References Cited

U.S. PATENT DOCUMENTS

| | | | |
|---|---|---|---|
| 9,952,482 | B2 | 4/2018 | Rudolph et al. |
| 10,320,331 | B1 | 6/2019 | Abdo |
| 10,348,245 | B1* | 7/2019 | Abdo ................ H03H 9/25 |
| 10,628,752 | B2* | 4/2020 | Abdo ............... H10N 60/805 |
| 11,586,967 | B2* | 2/2023 | Paik ................. G06N 10/40 |
| 11,942,946 | B2* | 3/2024 | Szmuk .............. G06N 10/40 |
| 12,086,684 | B2* | 9/2024 | Chen ............... H10N 60/805 |
| 2006/0210270 | A1 | 9/2006 | Han et al. |
| 2009/0016386 | A1 | 1/2009 | Edamatsu et al. |
| 2012/0155870 | A1 | 6/2012 | Harrison et al. |
| 2016/0292586 | A1 | 10/2016 | Rigetti et al. |
| 2018/0137428 | A1 | 5/2018 | Abdo |
| 2019/0156238 | A1 | 5/2019 | Abdo |
| 2022/0269301 | A1* | 8/2022 | Hatridge ............ G06F 1/022 |

FOREIGN PATENT DOCUMENTS

| | | |
|---|---|---|
| WO | WO-2018/106765 A1 | 6/2018 |
| WO | WO-2019/156759 A2 | 8/2019 |

OTHER PUBLICATIONS

International Search Report and Written Opinion for International Application No. PCT/2020/41342 mailed Apr. 14, 2021 (15 pages).

Kuzyk et al. (2018) "Scaling Phononic Quantum Networks of Solid-State Spins with Closed Mechanical Subsystems," Cornell University Library, Phys. Rev. X 8, 041027-1-041027-14.

\* cited by examiner

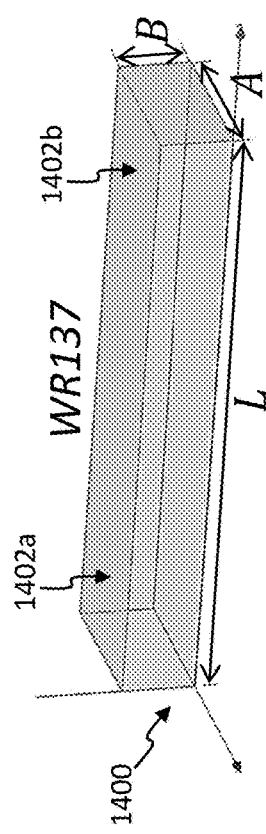
FIG. 14A
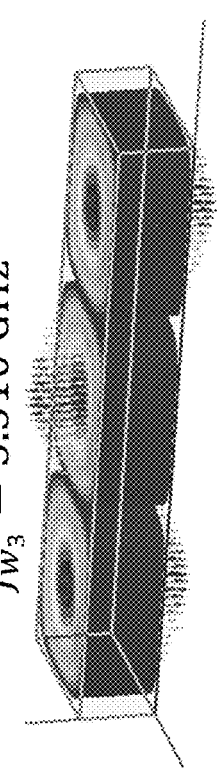
$f_{w_1} = 4.452$ GHz
FIG. 14B
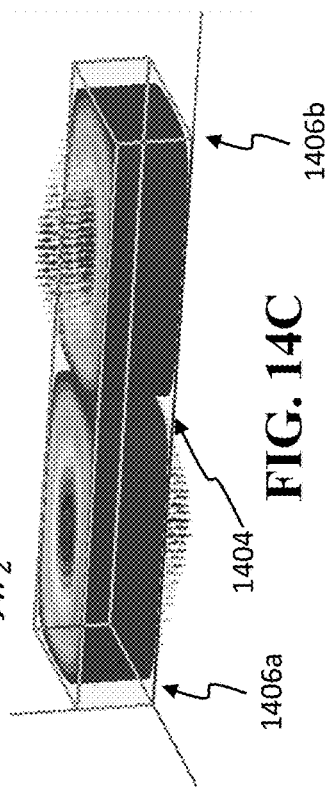
$f_{w_2} = 4.876$ GHz
FIG. 14C
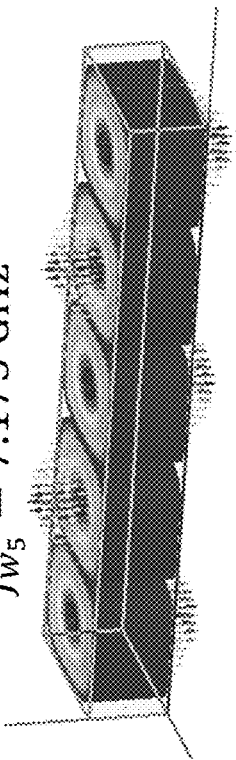
$f_{w_3} = 5.510$ GHz
FIG. 14D
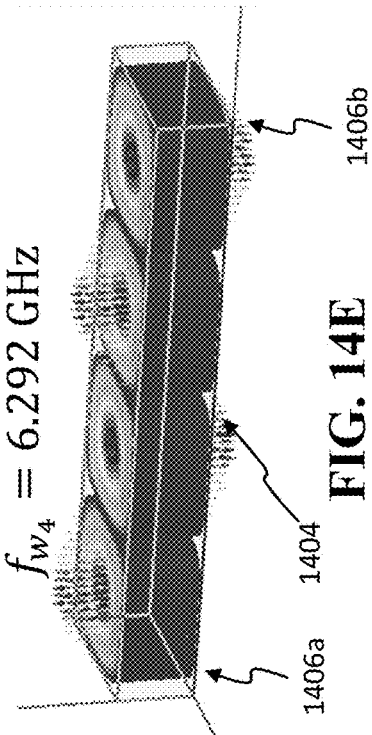
$f_{w_4} = 6.292$ GHz
FIG. 14E
$f_{w_5} = 7.173$ GHz
FIG. 14F

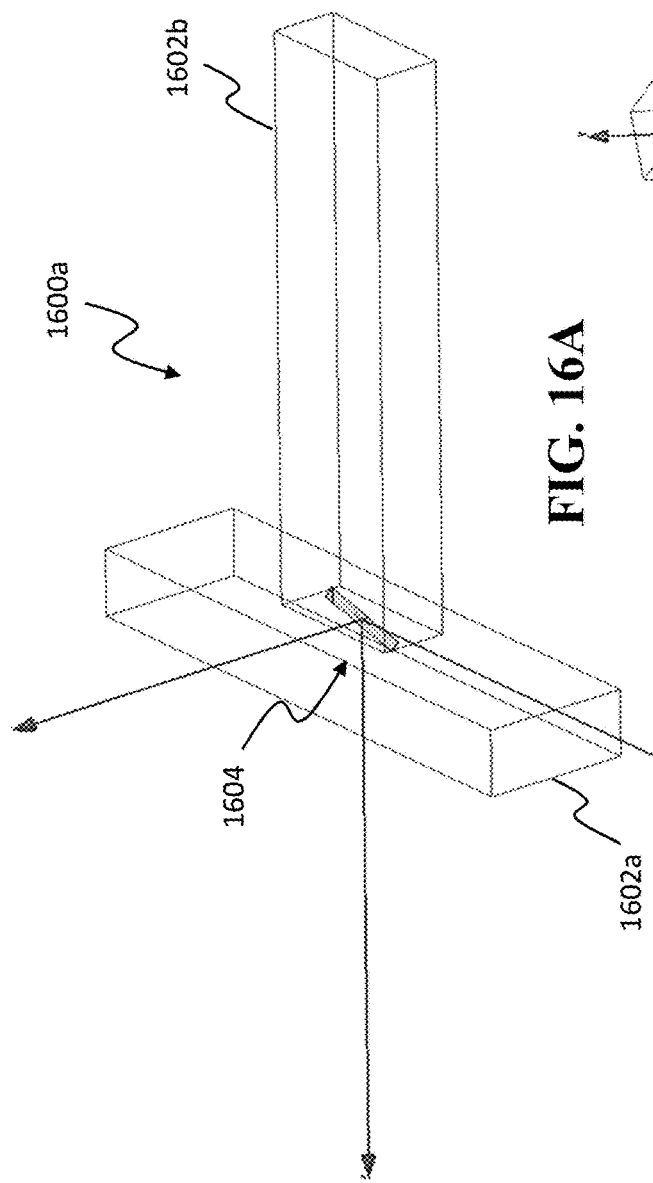
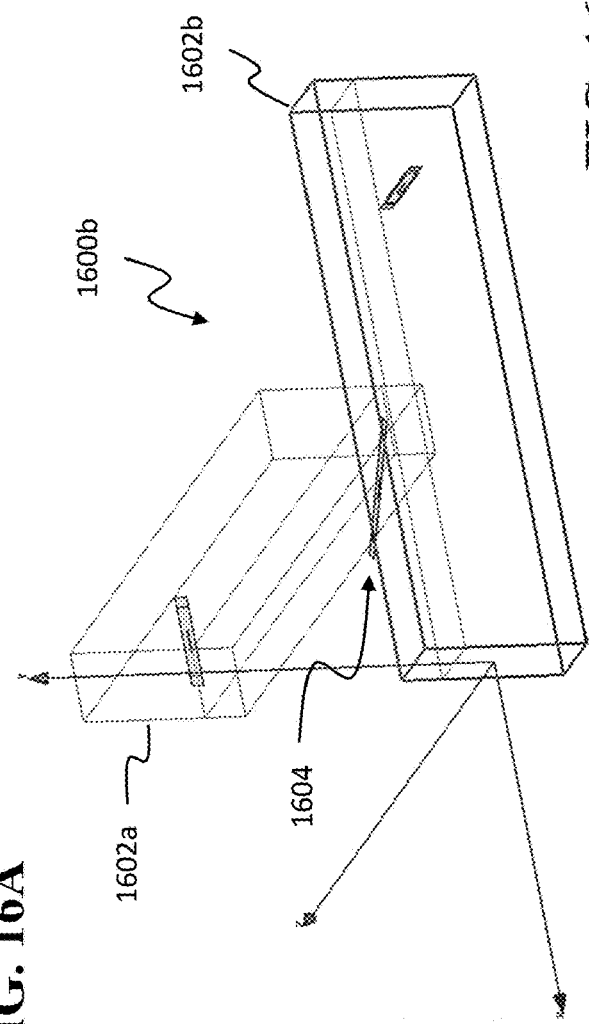
FIG. 16A
FIG. 16B

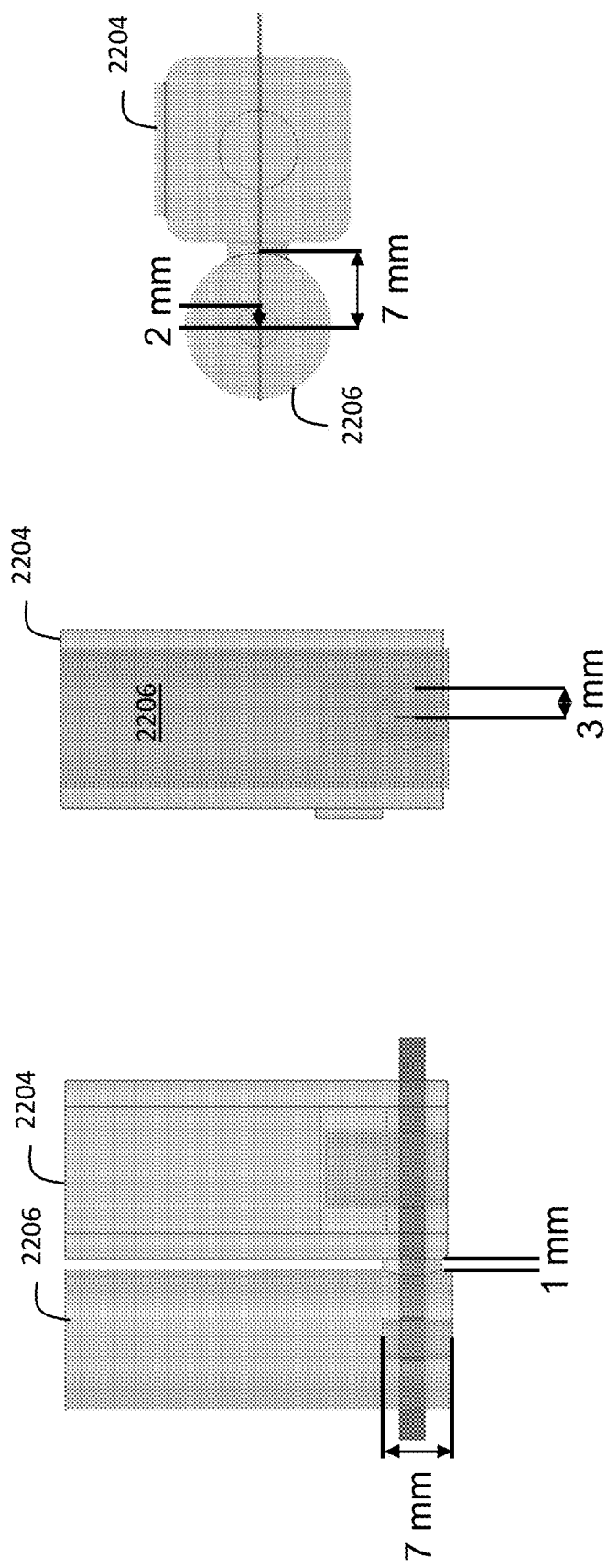

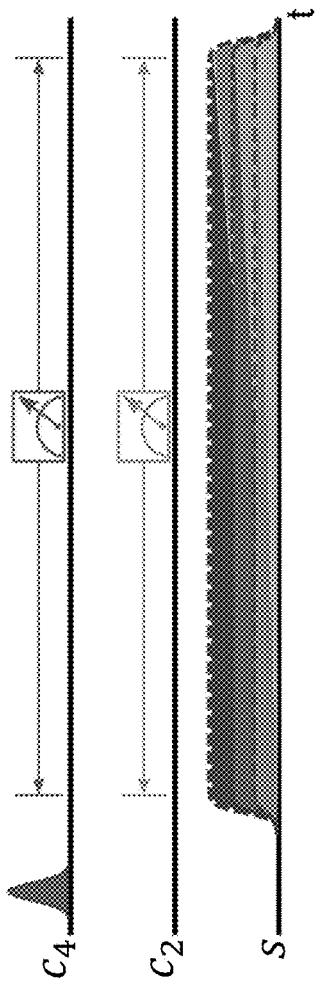
FIG. 28A
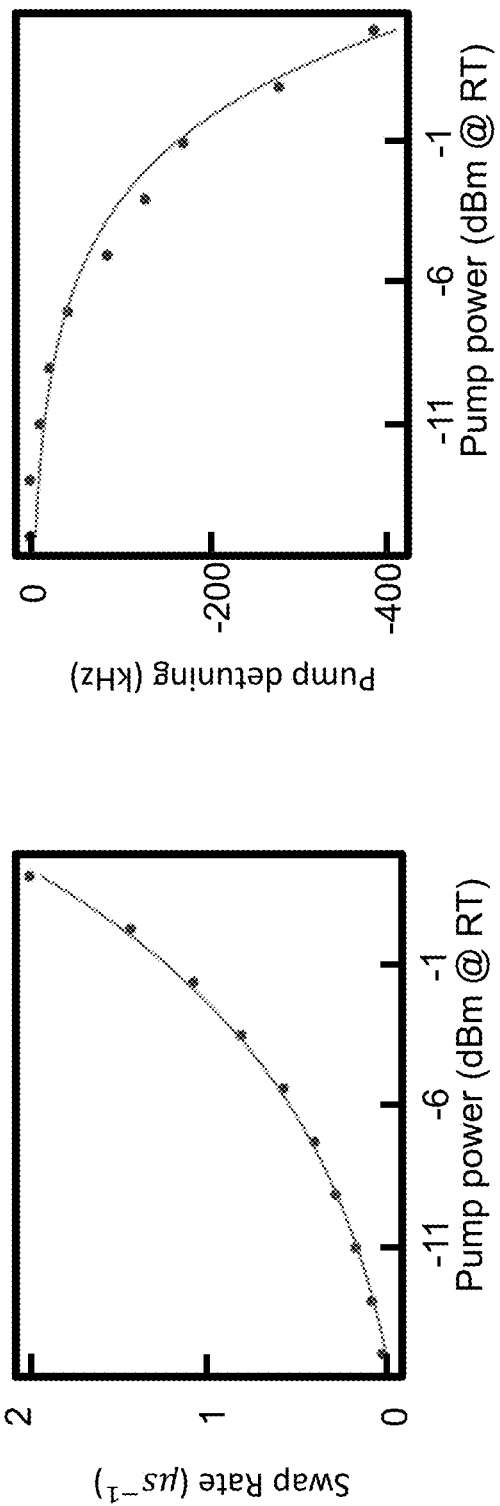
FIG. 28B
FIG. 28C

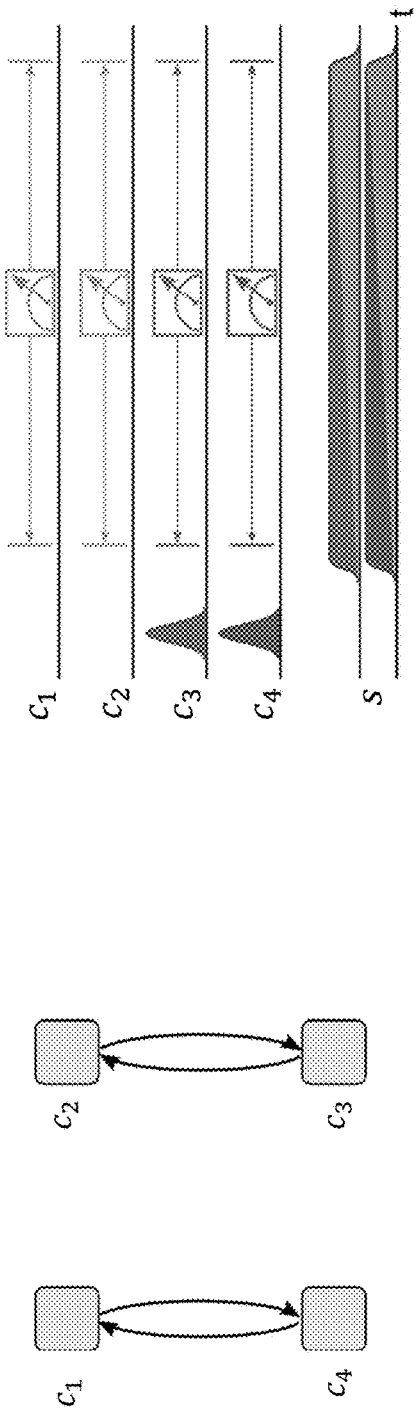
FIG. 29A
FIG. 29B
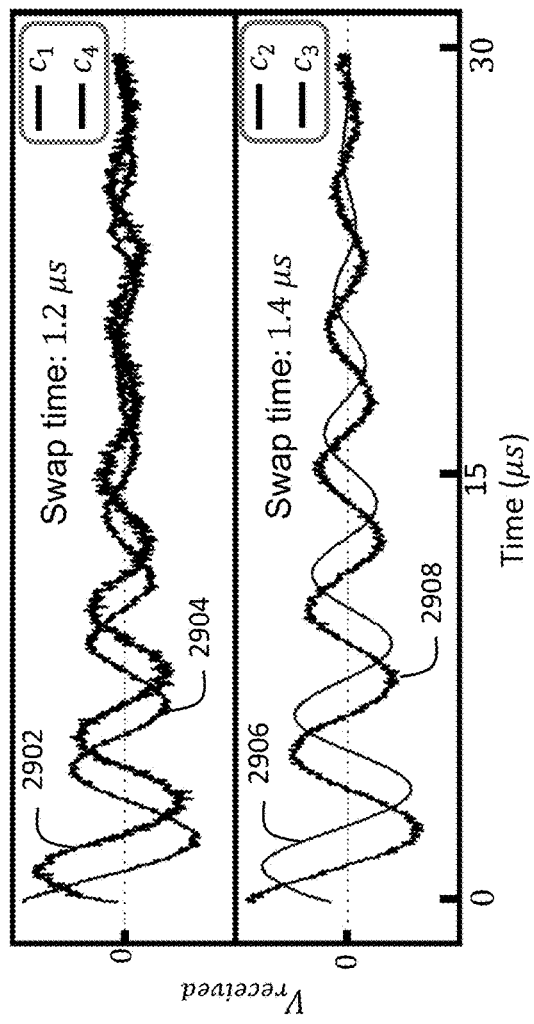
FIG. 29C

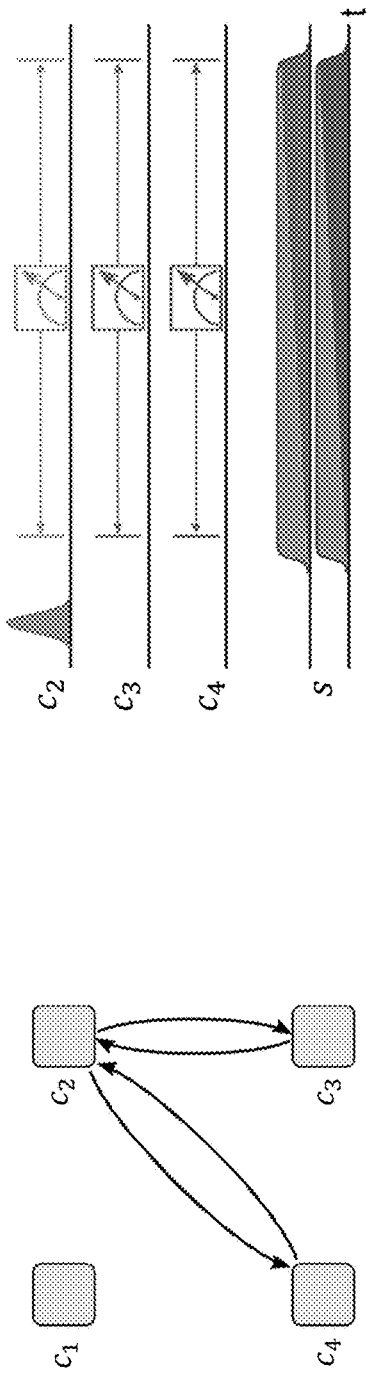
FIG. 30B
FIG. 30A
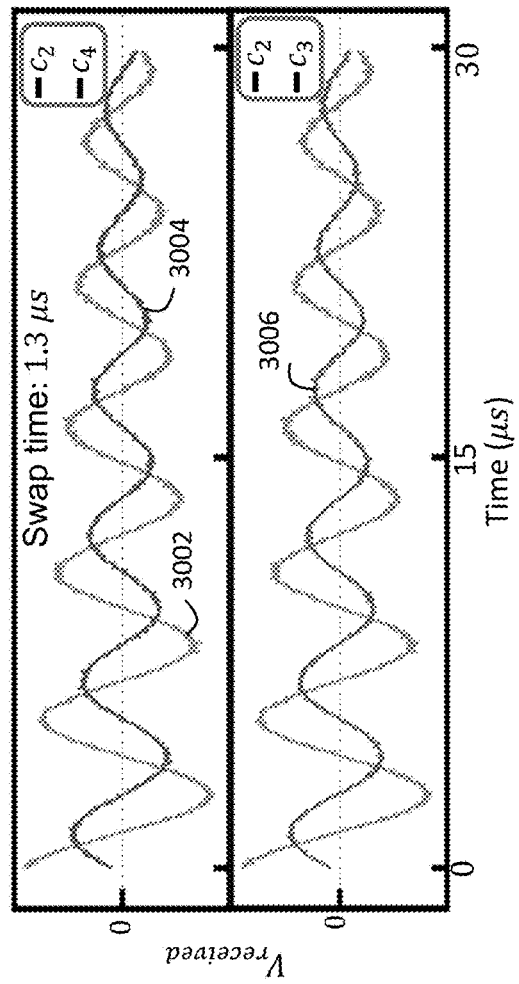
FIG. 30C

PARAMETRICALLY-DRIVEN COHERENT SIGNAL ROUTER FOR QUANTUM COMPUTING AND RELATED METHODS

CROSS-REFERENCE TO RELATED APPLICATIONS

This application is a continuation of International Application No. PCT/US2020/041342, with an international filing date of Jul. 9, 2020, which claims priority to and benefit of U.S. Provisional Patent Application No. 62/900,101, entitled "PARAMETRICALLY-DRIVEN COHERENT SIGNAL ROUTER FOR QUANTUM COMPUTING AND RELATED METHODS," filed on Sep. 13, 2019, the entire contents of each of which are incorporated herein by reference in their entireties for all purposes.

GOVERNMENT INTERESTS

This invention was made with Government support under Grant Nos. W911NF-15-1-0397 and W911NF-18-1-0144 awarded by the U.S. Army Research Office (ARMY/ARO) and Grant No. FA9550-15-1-0015 awarded by the U.S. Air Force Office of Scientific Research (USAF/AFOSR). The Government has certain rights in the invention.

TECHNICAL FIELD

The following disclosure is directed to methods and systems for routing quantum signals in a quantum computing system and, more specifically, methods and systems for routing quantum signals in a quantum computing system utilizing parametric photon transitions.

BACKGROUND

In a quantum computer, individual quantum bits (qubits) are the fundamental units of computation upon which logical operations can be performed. Unlike classical systems in which information can readily be transported between distant bits, quantum bits require coherent quantum channels which can transmit information without interaction with the environment. The term qubit also indicates a physical structure that holds a unit of quantum information. Prevalent architectures for transmitting quantum information in superconducting systems utilize a "surface code" architecture in which quantum bits are connected in a two-dimensional array such that each qubit may be coupled to its four nearest neighbors. While simple to implement, this configuration lacks the ability to connect quantum bits over longer distances and/or directly with a non-nearest neighbor, hampering both error correction and efficient computation.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are systems and methods for routing quantum information not only between the nearest neighbors but directly between any pair of qubits. The exemplary systems and methods leverage long-distance links between quantum bits for efficient operation and reduction in hardware requirements. The architecture(s) described herein can include qubit modules that are configured to communicate with a "quantum router" through which to send quantum information.

In one aspect, the disclosure features methods for routing quantum signals in a quantum computing system is provided herein. An exemplary quantum routing method can include providing a waveguide configured to be coupled to at least two modules and a nonlinear element, the waveguide configured to facilitate exchange of quantum information between the at least two modules, the waveguide having at least two waveguide modes, each waveguide mode having a respective frequency; providing a first module couplable to the waveguide at a first module frequency corresponding to a first waveguide mode and a second module couplable to the waveguide at a second mode frequency corresponding to a second waveguide mode; and driving the waveguide via the nonlinear element at a first difference frequency equal to a difference between the first module frequency and the second module frequency, thereby causing exchange of quantum information between the first and the second modules.

Various embodiments of the exemplary methods can include one or more of the following features. The method can include establishing coupling between a first waveguide mode and a second waveguide mode of the at least two waveguide modes. The exchange of quantum information can include parametric photon exchange. Each module frequency can be different from a corresponding waveguide mode frequency by a respective detuning frequency. The detuning frequency can be between 0 MHz and 1000 MHz.

The method can include providing a third module couplable to the waveguide at a third module frequency corresponding to a third waveguide mode; and driving the waveguide via the nonlinear element at a second difference frequency equal to a difference between the first module frequency and the third module frequency, thereby causing exchange of quantum information between the first module and the third module.

The driving of the waveguide at the first difference frequency can be at a same time as the driving the waveguide at the second difference frequency. The first difference frequency can be different from the second difference frequency. The waveguide can be driven such that (i) the exchange of quantum information between the first module and second module and (ii) the exchange of quantum information between the first module and the third module occurs in parallel. The difference frequency can be different from the other difference frequency by 10-1000 MHz (0.01-1 GHz).

The method can include providing a third module couplable to the waveguide at a third module frequency corresponding to a third waveguide mode; and providing a fourth module couplable to the waveguide at a fourth module frequency corresponding to a fourth waveguide mode. The method can include driving the waveguide via the nonlinear element at a second difference frequency equal to a difference between the third module frequency and the fourth module frequency, thereby causing exchange of quantum information between the third module and fourth module. The waveguide can be driven such that (i) the exchange of quantum information between the first module and the second module and (ii) the exchange of quantum information between the third module and the fourth module occurs in parallel.

The nonlinear device can be one of a superconducting nonlinear asymmetric inductive element (SNAIL) or superconducting quantum interference device (SQUID). The exchange can be driven by higher order parametric couplings and the drive frequency is appropriately reduced. The waveguide can have a number of waveguide modes corresponding to a number of modules.

In another aspect, the disclosure features systems for routing quantum signals. An exemplary routing system can include a waveguide couplable to at least two modules and a nonlinear element. The waveguide can be configured to facilitate the exchange of quantum information between the at least two modules. The waveguide can include at least two waveguide modes, in which each waveguide mode has a respective frequency. The system can include a first module couplable to the waveguide at a first module frequency corresponding to a first waveguide mode of the at least two waveguide modes, and a second module couplable to the waveguide at a second module frequency corresponding to a second waveguide mode of the at least two waveguide modes. The nonlinear element can be configured to drive the waveguide at a first difference frequency equal to a difference between the first module frequency and the second module frequency, thereby causing exchange of quantum information between the first and the second modules.

Various embodiments of the exemplary systems can include one or more of the following features. A first waveguide mode of the at least two waveguide modes can be configured to be coupled to a second waveguide mode of the at least two waveguide modes.

The exchange of quantum information can include parametric photon exchange. Each module frequency can be different from a corresponding waveguide mode frequency by a respective detuning frequency. The system can include a third module couplable to the waveguide at a third module frequency corresponding to a third waveguide mode, in which the nonlinear element can be configured to drive the waveguide at a second difference frequency equal to a difference between the first module frequency and the third module frequency, thereby causing exchange of quantum information between the first module and the third module.

The nonlinear element can be configured to drive the waveguide at the first difference frequency and the waveguide at the second difference frequency at the same time. The waveguide can be driven such that (i) the exchange of quantum information between the first module and second module and (ii) the exchange of quantum information between the first module and the third module occurs in parallel. The first difference frequency can be different from the second difference frequency. The first difference frequency can be different from the second difference frequency by 10 MHz to 1000 MHz.

The system can include a third module couplable to the waveguide at a third module frequency corresponding to a third waveguide mode and a fourth module couplable to the waveguide at a fourth module frequency corresponding to a fourth waveguide mode. The waveguide can be driven via the nonlinear element at a second difference frequency equal to a difference between the third module frequency and the fourth module frequency, thereby causing exchange of quantum information between the third module and the fourth module. The waveguide can be driven such that (i) the exchange of quantum information between the first module and the second module and (ii) the exchange of quantum information between the third module and the fourth module occurs in parallel. The nonlinear device can be one of a superconducting nonlinear asymmetric inductive element (SNAIL) or superconducting quantum interference device (SQUID). The waveguide can have a number of waveguide modes corresponding to a number of modules.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIG. 14A is an exemplary waveguide used in the routing of quantum information. FIGS. 14B-14F are eigenmode simulations illustrating various modes that exist in the waveguide having the dimensions of the waveguide of FIG. 14A.

FIG. 16A is a diagram of an exemplary router tree structure in which a first waveguide is coupled to a second waveguide via a nonlinear element. FIG. 16B is a diagram of an exemplary router tree structure in which a first waveguide is coupled to a second waveguide via a nonlinear element.

FIGS. 22A-22H are models of an exemplary quantum router system, including a router, modules having communication cavities and readout cavities, and a nonlinear element.

FIGS. 28A-28C are a set of plots illustrating the photon swap rate and pump detuning as a function of pump power.

FIG. 29A is a diagram illustrating a parallel photon transition among pairs of cavities.

FIGS. 29B-29C are plots illustrating parallel swap between two pairs of cavities.

FIG. 30A is a diagram illustrating a V-shaped photon transition among a group of cavities. FIGS. 30B-30C are plots illustrating V-shaped swap among the group of cavities.

Figure 1:
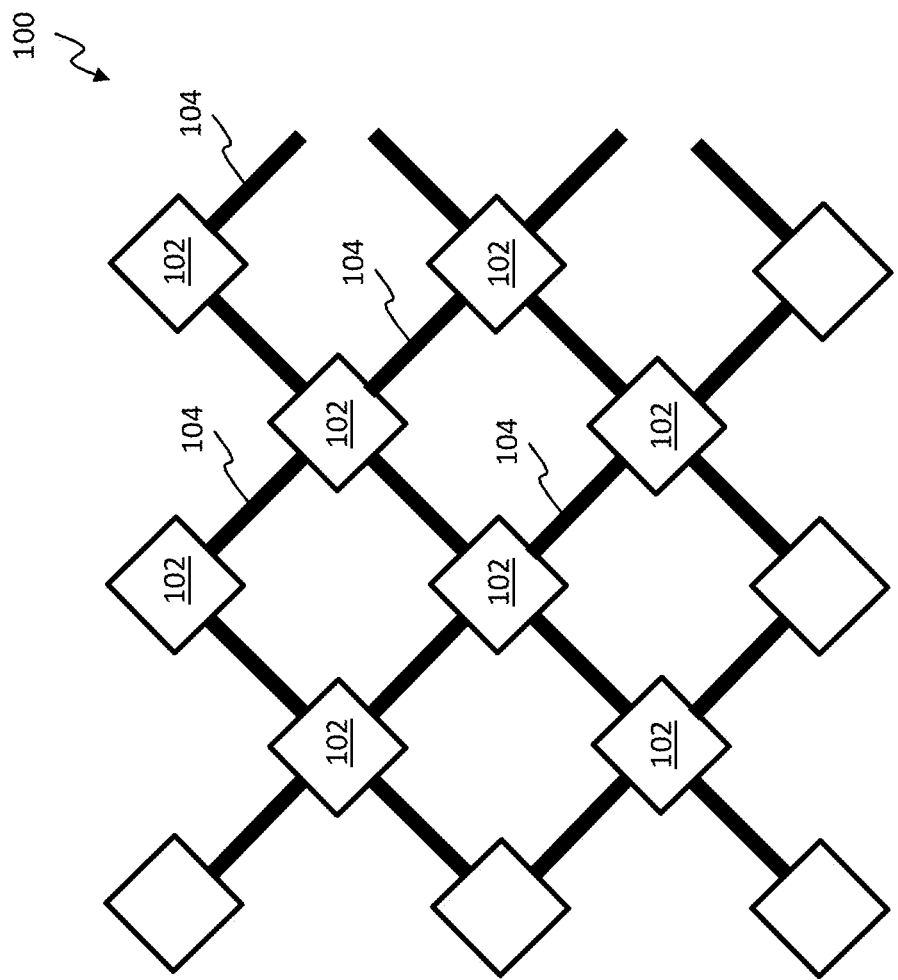
FIG. 1 is a diagram of a conventional surface code quantum communication system.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Disclosed herein are embodiments of systems and methods for routing quantum signals in a quantum computing system. In some embodiments, the systems and methods may rely on parametric interactions in a system of microwave elements (e.g., a "tree" of microwave elements). These interactions may be parallel. In particular, some exemplary systems may utilize three-wave parametric couplings between one or more modes of a microwave waveguide and external quantum module modes to efficiently route quantum signals. In this exemplary system, there may be no native coupling between the modes due to the difference in resonant frequencies between each microwave element. Interaction between the modes may occur when the system is driven at a difference frequency, enabling photons to travel or "hop" between a pair of coupled modes. In some embodiments of a system including more than two modes, each pair of modes can be parametrically coupled by ensuring that the coupling frequencies are sufficiently separated, as discussed further below. In this way, multiple couplings may be operated in parallel without deleterious effects.

The various embodiments of the methods and systems for routing quantum information may rely on (1) virtual parametric couplings, (2) deliberately detuned and distributed modes in individual routers, and/or (3) customizable tree structures of routing elements. Such systems can have greater fidelity in operation than conventional quantum information systems, provide scalability for certain implementations (e.g., application specific), and/or maintain cost-efficiency as described further herein.

FIG. 1 illustrates a conventional surface code quantum communication system 100. The surface code system 100 includes qubits 102 connected to adjacent qubits by couplers 104. In general, quantum computing depends on the ability to communicate information between remote qubits. To do so, entanglement between remote qubits is necessary. In the two-dimensional system 100, qubits 102 are only able to swap with their nearest neighbor. Accordingly, the time required to communicate quantum information scales linearly as distance between qubits increases. Thus, such systems are limited in the speed and efficiency with which they can carry quantum information.

One advantage of the exemplary quantum routing systems and methods is that quantum information can be efficiently transmitted between non-adjacent qubits. For example, in conventional quantum systems, to perform a two qubit logic gate between a pair of qubits ten (10) sites apart, the conventional system requires approximately ten swapping operations to shuttle the information from the initial qubit to the last qubit. Additionally, another ten swapping operations is required to move the information back to the initial qubit. By contrast, the exemplary systems and methods described herein can transmit information over long-distance, coherent quantum links while requiring fewer physical operations. Another advantage is that, by avoiding the described swapping operations, the cost and footprint in hardware may be reduced.

Quantum Router Overview

Figure 2:
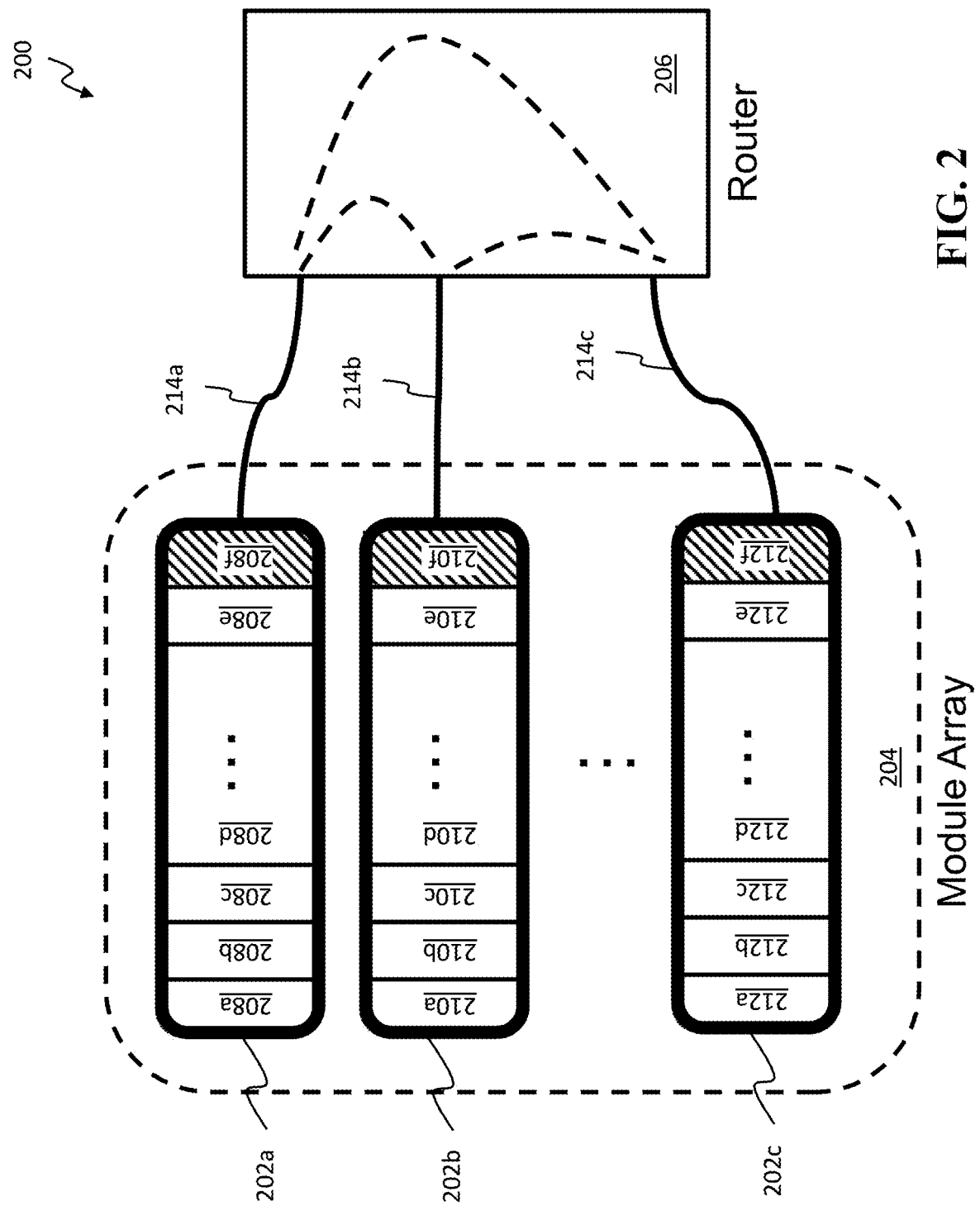
FIG. 2 is a diagram of an exemplary modular quantum computing system.

FIG. 2 is a diagram of an exemplary modular quantum computer system 200. The system 200 can include two or more modules 202a-202c (collectively referred to as 202) in module array 204. Each module 202 includes a register of qubits (e.g., optical qubits) that can be locally entangled by local quantum gates which are implemented between two or more of these qubits. Module 202a includes qubits 208a-208f (collectively referred to as 208); module 202b includes qubits 210a-210f (collectively referred to as 210); and module 202c includes qubits 212a-212f (collectively referred to as 212). Included in each register of qubits 208, 210, and 212 is a communicator qubit 208f, 210f, and 212f, respectively. Each communicator qubit can be coupled to a respective photonic channel 214a, 214b, and 214c (collectively referred to as 214). Communicator qubits 208f, 210f, and 212f can represent quantum information physically stored as microwave light (e.g., having one or more states) in a "communication cavity" of the modules 202. Modules communication elements, as referred to herein, can be cavities with a high quality factor ("high Q"). In some examples, the terms modules and cavities may be used interchangeably. In some cases, photonic channels 214 may be referred to as a transmission lines. Modules 202 may be connected to quantum router 206 via photonic channels 214.

Exemplary router 206 can provide an optical path between any two photonic channels 214. For example, router 206 can connect channel 214a to channel 214b and/or channel 214c. In another example, router 206 can connect channel 214b to channel 214c. In this way, the router can effect entanglement between any two communicator qubits (e.g., communicator qubit 208f with 210f; 208f with 212f; 210f with 212f, etc.). The combination of local and remote entanglement enables communication between and among each of the qubits 208, 210, 212 of the module array 204. In some embodiments, the exemplary router enables entanglement generated between any pair of modules 202 with up to $N_{module}/2$ entanglement operations in parallel.

Parametric Photon Transitions

In various embodiments, the exemplary quantum routing system includes a waveguide (e.g., 206) having two or more internal modes. The exemplary quantum routing system may also include two or more modules (e.g., modules 202), each having a communication cavity with a cavity mode. In some cases, the "modes" refer to resonant microwave modes or standing wave modes of a waveguide or module. In the physical sense, a mode of a waveguide (or module) is created when there is constructive interference in light bouncing from one end of the waveguide (or module) to another end. Each mode has an associated frequency (e.g., a resonant frequency). Frequency, as referred to herein, may be expressed in Hertz (as "f") or in radians per second (as "ω") with the relationship $f=\omega/2\pi$.

Figure 3A:
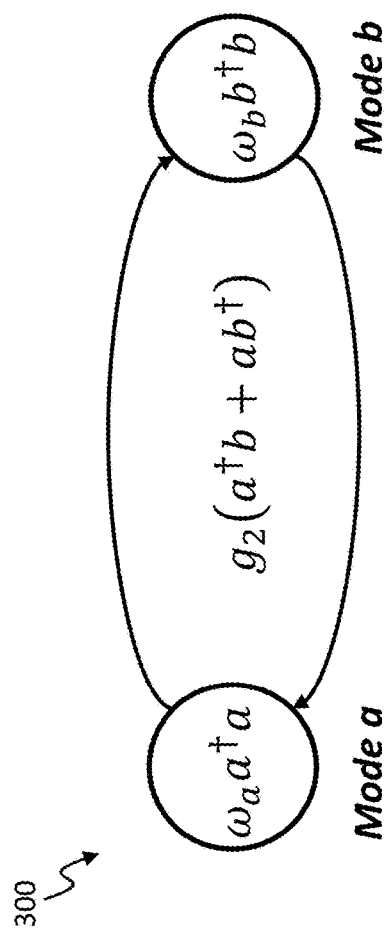
FIG. 3A is a diagram representing an exemplary direct photon swap between modes a and b utilizing frequency tuning.
Figure 3B:
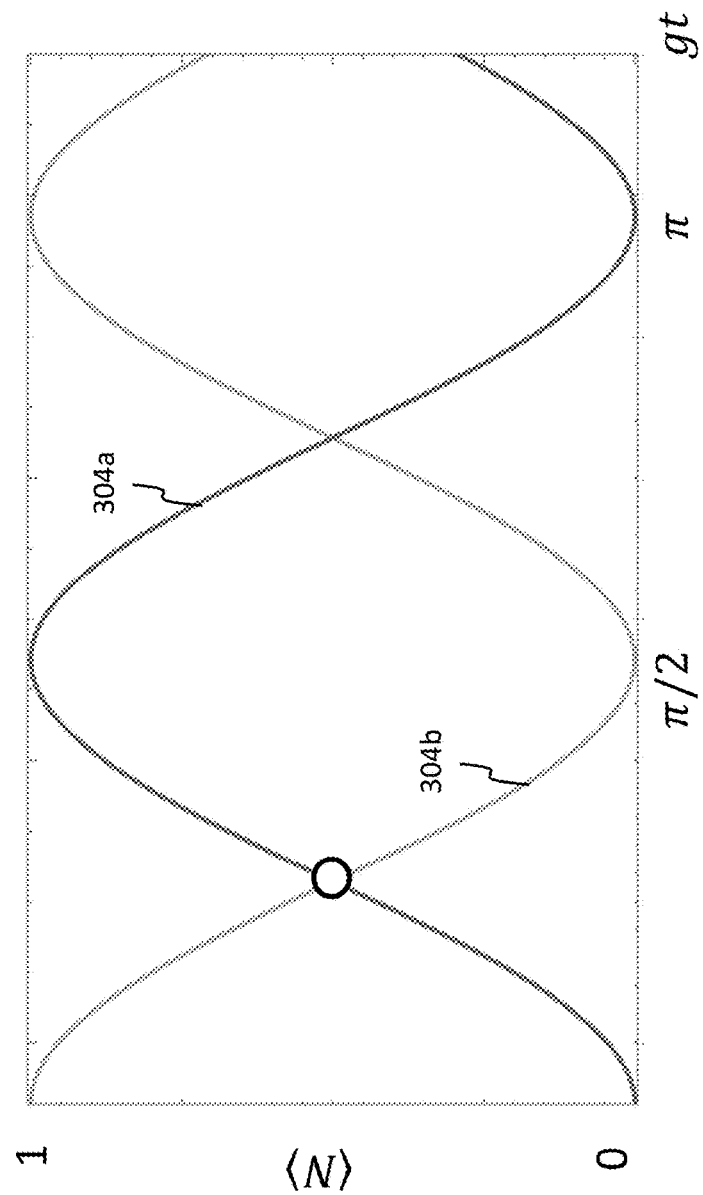
FIG. 3B is a plot of waveforms representing photon presence in a particular mode, such that zero (0) indicates "not present" and one (1) indicates "present".

In various embodiments, entanglement between modes of modules and waveguides can be effected by parametric photon transitions. In particular, the exemplary systems and methods described herein can realize photon transitions between modes of module communication cavities. In the following, FIGS. 3A-5B and their associated descriptions are provided to illustrate photon transitions (also referred to as "swaps") at a high level. FIG. 3A illustrates a direct photon swap 300 between modes a and b (e.g., cavity mode a and cavity mode b) utilizing frequency tuning. Mode a is defined by $\omega_a a^\dagger a$ and mode b is defined by $\omega_b b^\dagger b$, where $\omega_a$ is the resonant frequency associated with mode a and $\omega_b$ is the resonant frequency associated with mode b. The photon transitions are governed by the relationship $g_2(a^\dagger b+ab^\dagger)$ and the following Hamiltonian scaled by reduced Planck constant h:

$$H/\hbar=\omega_a a^\dagger a+\omega_b b^\dagger b+g_2(a^\dagger b+ab^\dagger)$$

where $g_2$ is the amplitude of the two-wave mixing term representing the destruction of one photon in a first mode (e.g., in mode a) to create one photon in a second mode (e.g., mode b). The notation $ab^\dagger$ (referred to as "a-b-dagger") connotes that one photon is destroyed in mode a to create one photon in mode b (or vice versa). In this system, photons can be swapped between modes a and modes b with the tuning of the mode frequency. For instance, when $|\omega_a-\omega_b|\ll g_2$, the photons are swapped at $t=\pi/2g$. FIG. 3B is a plot of waveforms 304a, 304b representing photon presence in a particular mode, such that zero (0) indicates "not present" and one (1) indicates "present". Note that the sinusoidal waveforms are 180 degrees out of phase, representing that the photons can exist fully in one of the two modes.

Figure 4:
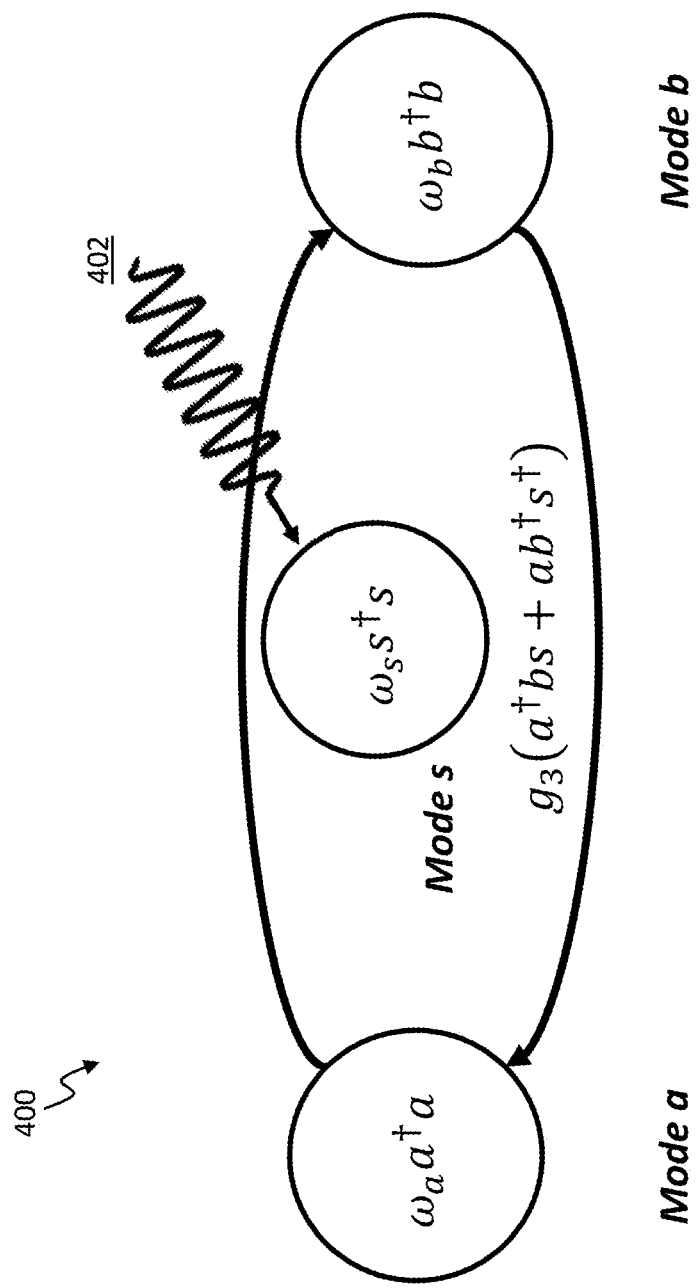
FIG. 4 is a diagram representing an exemplary parametric photon swap between modes a, b, and s.

FIG. 4 illustrates a parametric photon swap 400 between modes a and b enabled by a three-wave mixing term directed to a third mode, mode s. This process can be effectuated by parametric pumping 402, by which coupling strength is controlled by the varying the pump strength (represented by $A_{pump}$) with pumping frequency $f_{pump}$. The additional mode s is defined by $\omega_s s^\dagger s$, wherein $\omega_s$ is the resonant frequency associated with mode s. As discussed further herein, the mode s may be configured to drive photon transitions between two or more module modes (e.g., mode a and mode b). The photon transitions are governed by $g_3(a^\dagger bs+ab^\dagger s^\dagger)$ and the following Hamiltonian scaled by reduced Planck constant h:

$$H/\hbar=\omega_a a^\dagger a+\omega_b b^\dagger b+\omega_s s^\dagger s+g_3(a^\dagger bs+ab^\dagger s^\dagger)$$

where $g_3$ is the amplitude of the three-wave mixing term representing the destruction of one photon in a first mode (e.g., mode a) to create one photon in second and third modes (e.g., mode b and mode s) and vice versa.

By pumping mode s with pumping frequency $\omega_p = |\omega_a - \omega_b| \neq \omega_s$, the photon can be exchanged between modes a and b. Due to the conservation of energy principle, the pumping frequency is equal the difference in mode frequencies to cause the photon transition from location to another. It can be desirable for the pumping frequency to be detuned from (e.g., unequal to or be off-resonance from) the frequency of mode s because this causes the response of mode s to be semiclassical or "stiff". By being detuned from the mode s frequency, the pumping frequency avoids adding quantum noise and/or fluctuations to the photon(s) (light) being swapped. As such, the relationships above can be compared to the direct photon swap 300 as follows:

$$\frac{H_{eff}}{\hbar} = g_{2_{eff}}(a^\dagger b + ab^\dagger)$$

$$g_{2_{eff}} \propto g_3 A_{pump}$$

Light transitions between two modes at rate $g_{2_{eff}}$, which is proportional to the term $g_3$ times the pumping strength $A_{pump}$. For example, the greater the term $g_3$, the lower pumping strength $A_{pump}$ can be to attain the desired term $g_{2_{eff}}$.

In various embodiments, the systems and methods can utilize third-order coupling in which one pump photon (at the difference frequency) is generated and/or consumed to move one communication module photon to another module. For higher-order parametric couplings, the drive can be reduced correspondingly. For example, in 5th order coupling, three pump photons are generated and/or consumed together to move one communication module photon to another module, but the total energy remains the same. Therefore, the drive would be three times lower in frequency. In other words, pump frequency can be defined as: $f_{pump} = f_{difference}/3$.

Figure 5B:
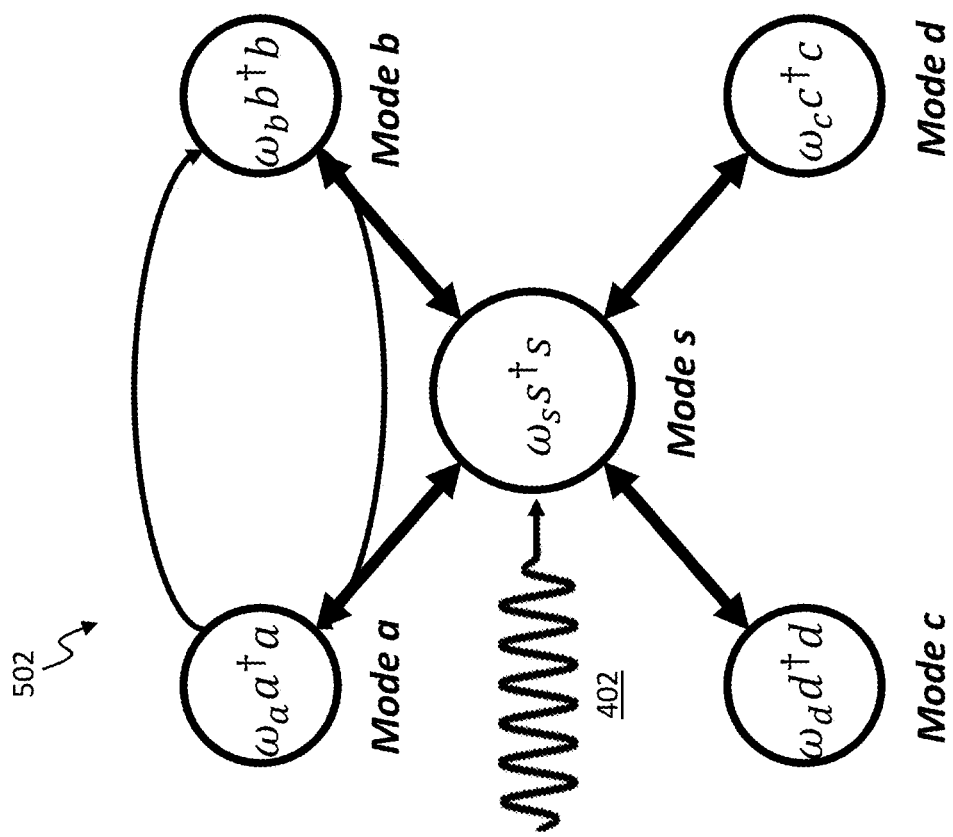
FIG. 5B is a diagram representing an example quantum router modes employing the parametric photon swapping scheme of FIG. 4.
Figure 5A:
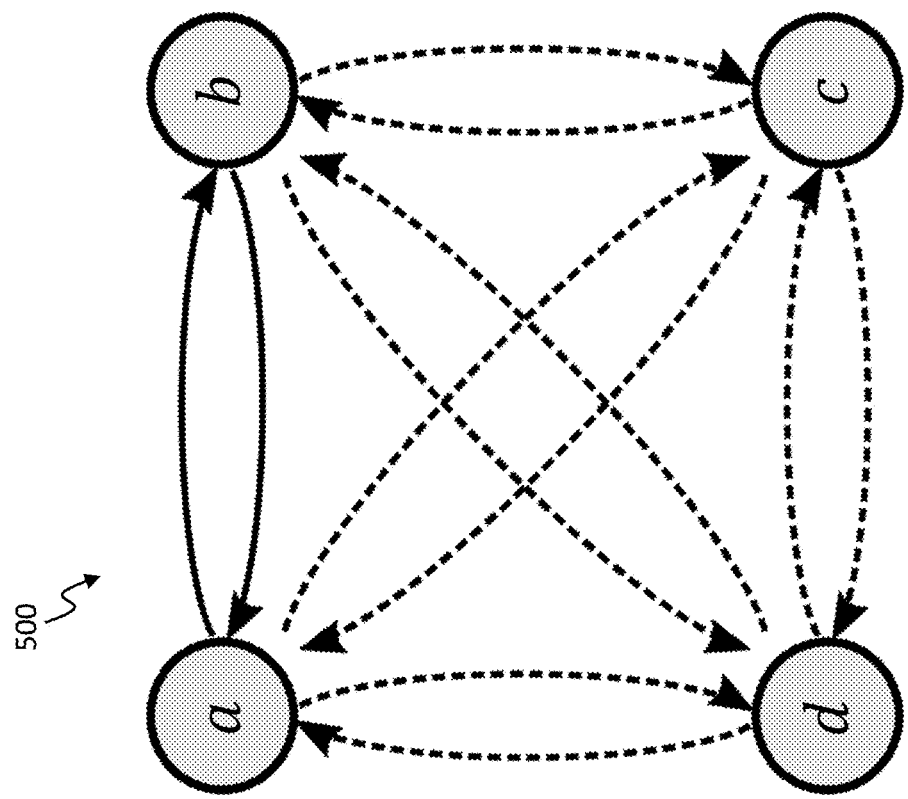
FIG. 5A is a diagram representing the target photon transitions among four (4) modes a, b, c, and d.

FIG. 5A is a diagram representing the desired or target photon transitions 500 among four (4) modes a, b, c, and d. FIG. 5B illustrates example modes 502 employing the parametric photon swapping scheme 400 described above and illustrated in FIG. 4. Note that, in application, the modes a, b, c, and d may be module communication modes, as described further below. The parametric photon transitions between the modes are configured such that each mode can be coupled with another mode in the system (also referred to as "all-to-all parametric coupling"). The couplings are governed by the following Hamiltonian:

$$H_{couple} = g_{sab}(a^\dagger bs + ab^\dagger s^\dagger) + g_{sac}(a^\dagger cs + ac^\dagger s^\dagger) + \ldots$$

Figure 5C:
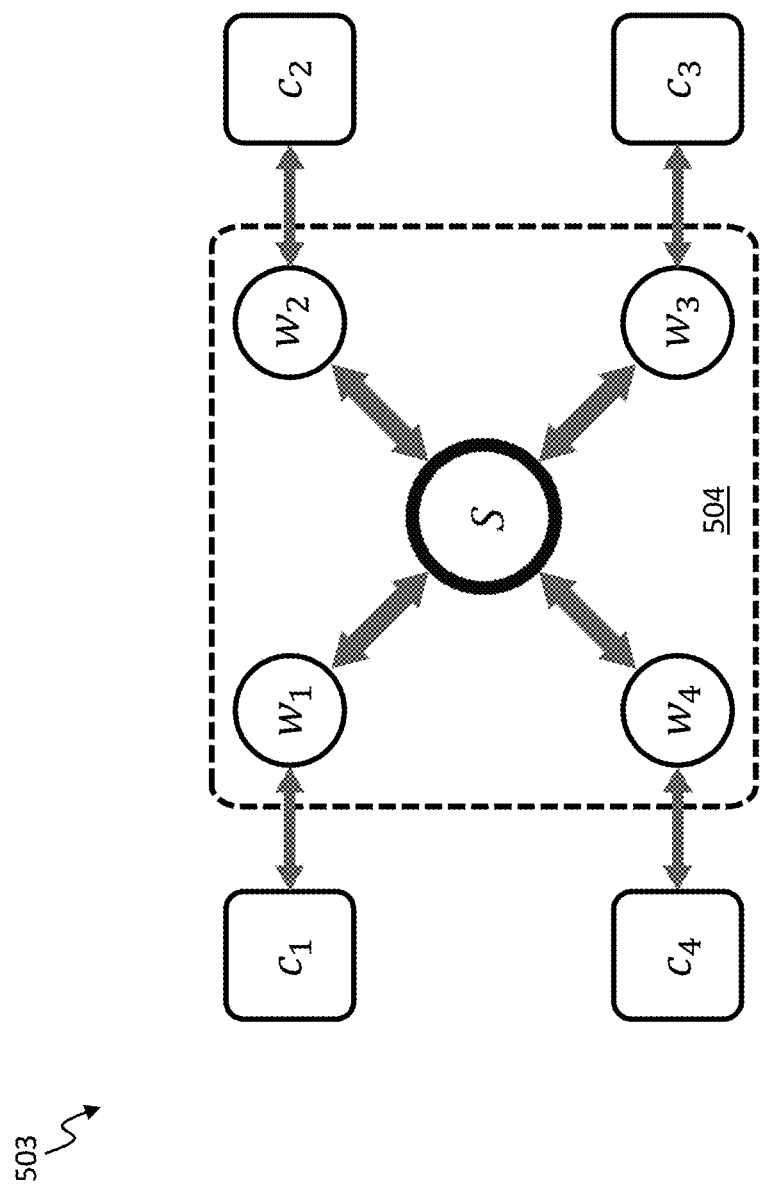
FIG. 5C is a diagram representing the example quantum router including the four modes $w_1$, $w_2$, $w_3$, $w_4$ and coupled to four cavity modes $c_1$, $c_2$, $c_3$, $c_4$.
Figure 5D:
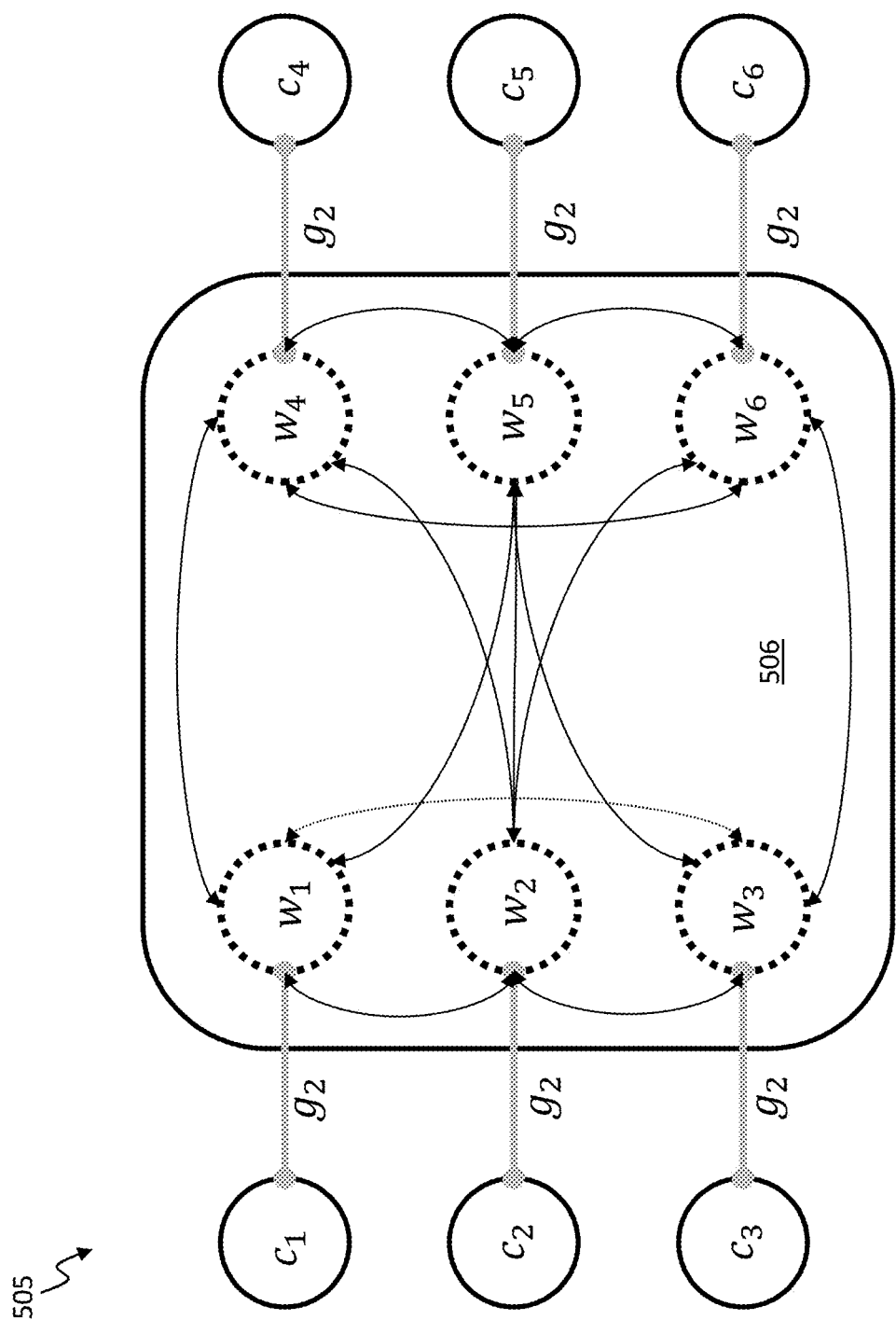
FIG. 5D is a diagram representing an exemplary quantum router configured to route quantum information between six modes $w_1$, $w_2$, $w_3$, $w_4$, $w_5$, $w_6$ and six cavity modes $c_1$, $c_2$, $c_3$, $c_4$, $c_5$, $c_6$.

The foregoing principles of photon transitions can be applied to a quantum computing system including one or more quantum routers and two or more modules. FIG. 5C illustrates an exemplary quantum computing system 503 including router 504 including the four modes $w_1$, $w_2$, $w_3$, $w_4$ and coupled to four cavity modes $c_1$, $c_2$, $c_3$, $c_4$. For example, the four cavity modes $c_1$, $c_2$, $c_3$, $c_4$ can be the module modes a, b, c, and d discussed above. FIG. 5D illustrates an exemplary quantum router 506 configured to route quantum information between six modes $w_1$, $w_2$, $w_3$, $w_4$, $w_5$, $w_6$ and six cavity modes $c_1$, $c_2$, $c_3$, $c_4$, $c_5$, $c_6$. Note that, in various embodiments, a quantum router may have many modes (e.g., a theoretically infinite number of modes). In practical implementations, an exemplary router, as described further below, may utilize only a subset of its many modes (e.g., 2, 3, 4, 5, 6, 7, 8, 9, 10, etc.) to route quantum information.

Figure 6A:
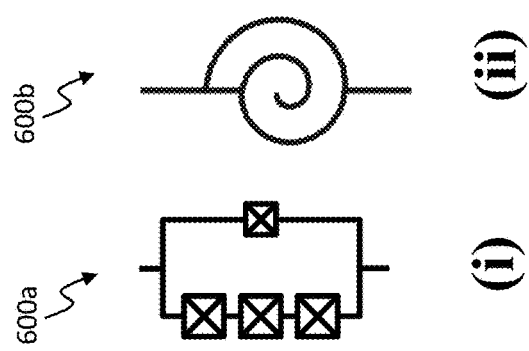
FIG. 6A is a diagram of (i) a first representation and (ii) a second representation of a nonlinear element configured to drive the exemplary routers described herein.

In various embodiments, to actuate desirable photon transitions, the router (e.g., router 504 or 506) can be driven with a nonlinear element, e.g., a superconducting nonlinear asymmetric inductive element (SNAIL) or superconducting quantum interference device (SQUID). By driving the nonlinear element at a difference frequency, the quantum information in one mode of the router (e.g., mode b or 2) may be swapped with the quantum information in another mode of the waveguide (e.g., mode c or 3). FIG. 6A illustrates (i) a first representation 600a and (ii) a second representation 600b of a nonlinear element (e.g., SNAIL) configured to drive the exemplary routers described herein (e.g., router 504, 506). The nonlinear element may be a three-wave mixing device. The Hamiltonian of the three-wave mixing device 600a is represented as:

$$H_3 = g_{sss}(s+s^\dagger)^3$$

The Hamiltonian of the SNAIL can be represented such that it includes linear and third-order terms:

$$H_{SNAIL} \approx \omega_s s^\dagger s + g_{sss}(s+s^\dagger)^3$$

Figure 6B:
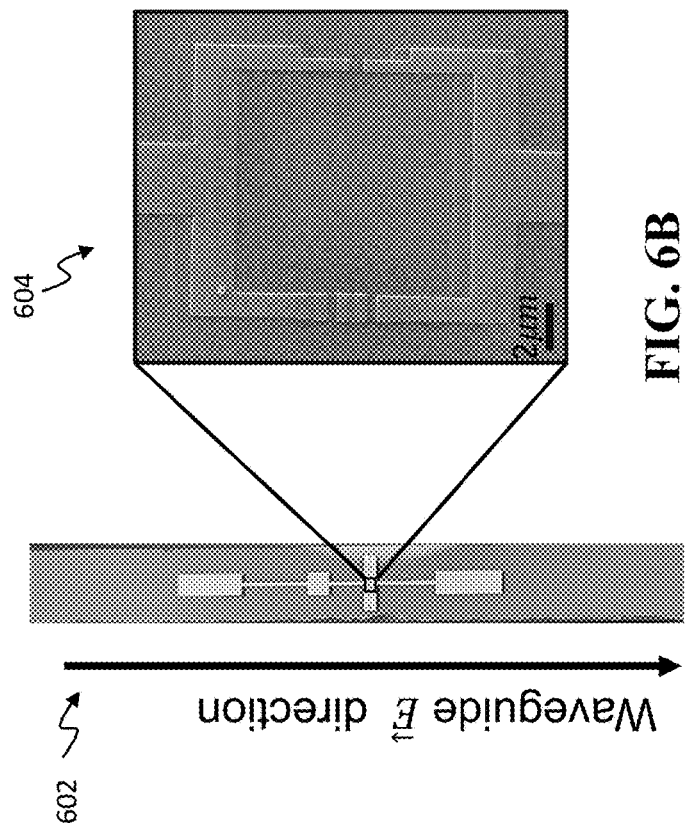
FIG. 6B is an image of an exemplary nonlinear element.

FIG. 6B illustrates an exemplary nonlinear element 602 as superconducting material disposed on an insulating substrate (e.g., SNAIL on a sapphire chip). The SNAIL can include an antenna 604 coupled to the electric field of the waveguide modes. The Hamiltonian of the SNAIL and the waveguide modes can be expressed as:

$$H = H_{SNAIL} + H_{WG} H_{WG} + \Sigma_i g_{sw_i}(w_i^\dagger s + w_i s^\dagger)$$

where $H_{WG} = \Sigma_i \omega_{w_i} w_i^\dagger w_i$, the Hamiltonian of the waveguide which includes the linear term. The above Hamiltonian can be rediagonalized to obtain the three-wave mixing term:

$$g_{\tilde{s}\tilde{w}_i\tilde{w}_j}\left(\tilde{w}_i^\dagger \tilde{w}_j \tilde{s} + \tilde{w}_i \tilde{w}_j^\dagger \tilde{s}^\dagger\right)$$

where $$g_{\tilde{s}\tilde{w}_i\tilde{w}_j} \approx g_{sss}\left(\frac{g}{\Delta}\right)_{sw_i}\left(\frac{g}{\Delta}\right)_{sw_j}$$

Figure 6C:
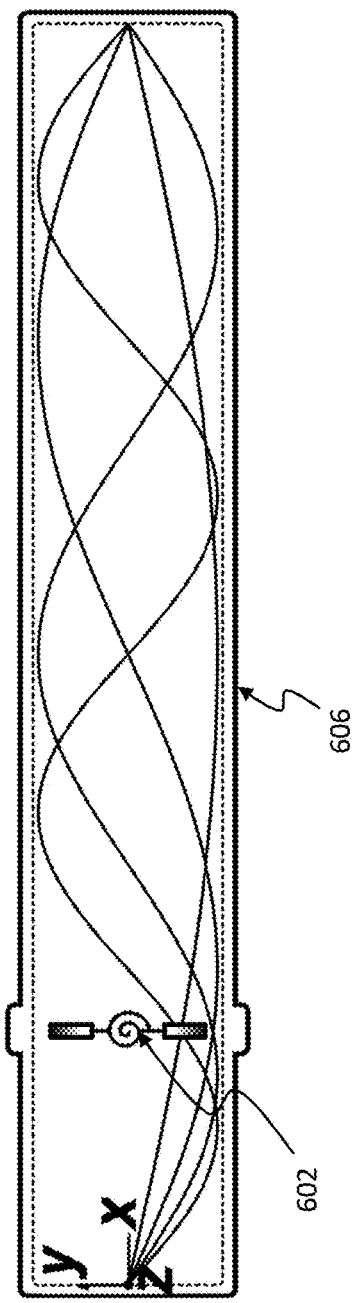
FIG. 6C is a diagram representing an exemplary quantum router being driven by nonlinear element of FIG. 6A or 6B.

FIG. 6C is a diagrammatic representation of the router 606 being driven by SNAIL 602.

Figure 7A:
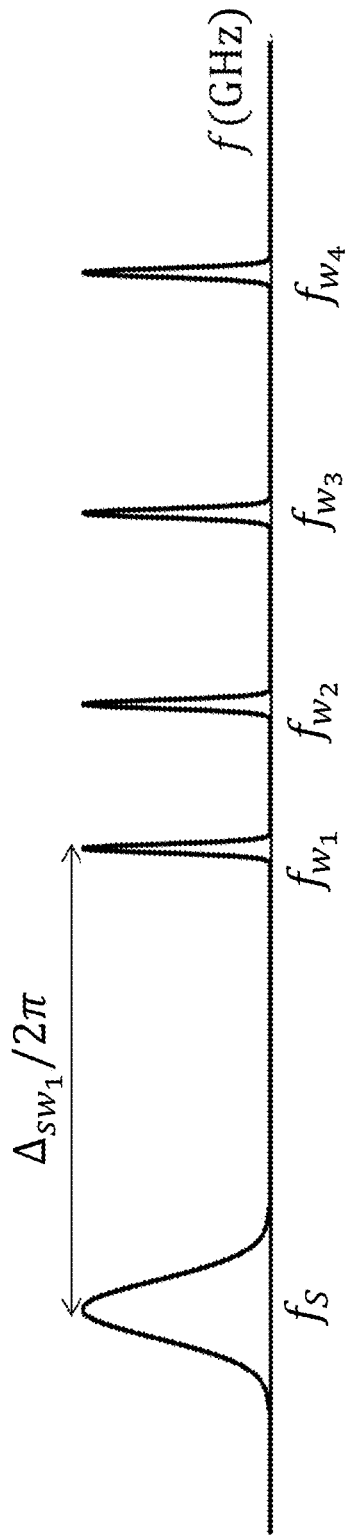
FIG. 7A is a diagram representing the frequencies of the modes of the SNAIL $f_S$ and each of the waveguide mode frequencies $f_{w_1}$, $f_{w_2}$, $f_{w_3}$, . $f_{w_4}$.

FIG. 7A illustrates the frequencies of the modes of the SNAIL $f_S$ and each of the waveguide mode frequencies $f_{w_1}$, $f_{w_2}$, $f_{w_3}$, $f_{w_4}$. Note that each of the waveguide mode frequencies $f_{w_1}$, $f_{w_2}$, $f_{w_3}$, $f_{w_4}$ are different from one another. Further, the SNAIL mode frequency $f_s$ and the first waveguide mode frequency $f_{w_1}$ is separated by a difference of $\Delta_{sw_1}/2\pi$. As described further herein, the frequency differences between the mode frequencies are configured to be distinct from one another to avoid driving multiple swaps at once.

Figure 7B:
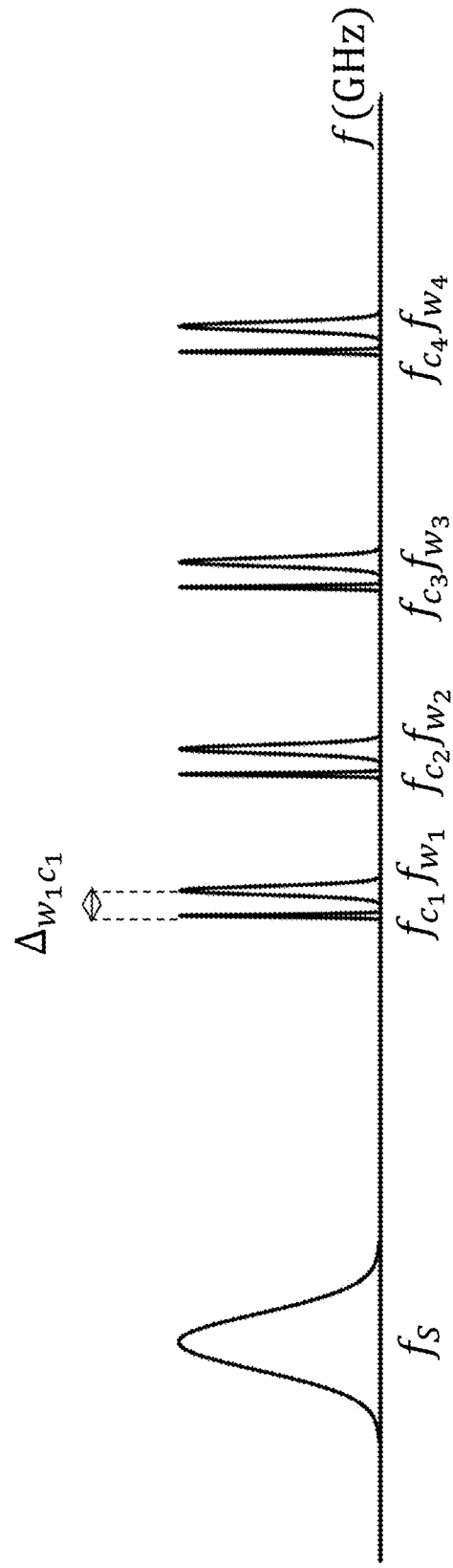
FIG. 7B is a diagram representing the frequencies $f_{c_1}$, $f_{c_2}$, $f_{c_3}$, $f_{c_4}$ of cavity modes $c_1$, $c_2$, $c_3$, $c_4$ in relation to the frequencies depicted in FIG. 7A.

FIG. 7B further illustrates the frequencies $f_{c_1}$, $f_{c_2}$, $f_{c_3}$, $f_{c_4}$ of cavity modes $c_1$, $c_2$, $c_3$, $c_4$ in relation to the frequencies depicted in FIG. 7A. Each cavity mode frequency is shifted or detuned by $\Delta w_i c_i \approx 10 g_{w_i c_i}$ away from the waveguide mode frequencies $f_{w_1}$, $f_{w_2}$, $f_{w_3}$, $f_{w_4}$.

Due to the coupling between the cavity modes and the waveguide modes, the Hamiltonian for the cavity modes share the third-order term above. The Hamiltonian for the SNAIL and cavity modes includes the three-wave mixing term. The Hamiltonian for the system 503 is as follows:

$$H_{int} = g_{sc_ic_j}(c_i^\dagger c_j s + c_i c_j^\dagger s^\dagger)$$

where $$g_{sc_ic_j} \approx g_{sw_iw_j}\left(\frac{g}{\Delta}\right)_{w_ic_i}\left(\frac{g}{\Delta}\right)_{w_jc_j} \approx \frac{g_{sss}}{10^4}$$

where $g_{sss}$ represents the third-order non-linearity of the SNAIL 602 and $$\frac{g}{\Delta}$$

is the hybridization factor. When the SNAIL 602 hybridizes with the waveguide (the router), the router modes inherit the third-order property of the SNAIL and other hybridized modes to a lesser degree. Furthermore, when the router modes hybridize with the module modes, the module modes inherit the third-order property of the SNAIL 602 to an even lesser degree than the router modes. Therefore, returning to the above equation, by multiplying the above factors, the cavities inherit $1/10^4$ the non-linearity of the SNAIL 602.

Note that rate $g_{sc_ic_j}$ is an example of the rate $g_3$, as described above. The term $g_{sc_ic_j}$ enables a precise notation for the mode(s) through which the photon is transitioning. Also note that each of the terms $c_ic_js$ describes a swap process that may be enabled in the system. For example, in system 503, the following swaps can be enabled:

TABLE 1

Example photon transitions available in a four cavity-mode system 503.

| Transition | Description |
| --- | --- |
| $c_1c_2s$ | Between cavity mode $c_1$ and cavity mode $c_2$ |
| $c_1c_3s$ | Between cavity mode $c_1$ and cavity mode $c_3$ |
| $c_1c_4s$ | Between cavity mode $c_1$ and cavity mode $c_4$ |
| $c_2c_3s$ | Between cavity mode $c_2$ and cavity mode $c_3$ |
| $c_2c_4s$ | Between cavity mode $c_2$ and cavity mode $c_4$ |
| $c_3c_4s$ | Between cavity mode $c_3$ and cavity mode $c_4$ |

In the exemplary quantum computing system, it can be desirable for module lifetimes to be long. Therefore, the exemplary router can be configured such that the router lifetimes can be short without shortening the module lifetimes. The square of the above term $$\frac{g}{\Delta}$$

represents how much the energy (e.g., the photon) of the module mode lives in a router mode. It is beneficial for the term $$\left(\frac{g}{\Delta}\right)^2$$

to generally be small. For example, if the term $$\left(\frac{g}{\Delta}\right)^2$$

equals $1/100$ the energy in the module mode(s) can live 100 times longer than it can in the router mode(s).

Figure 8:
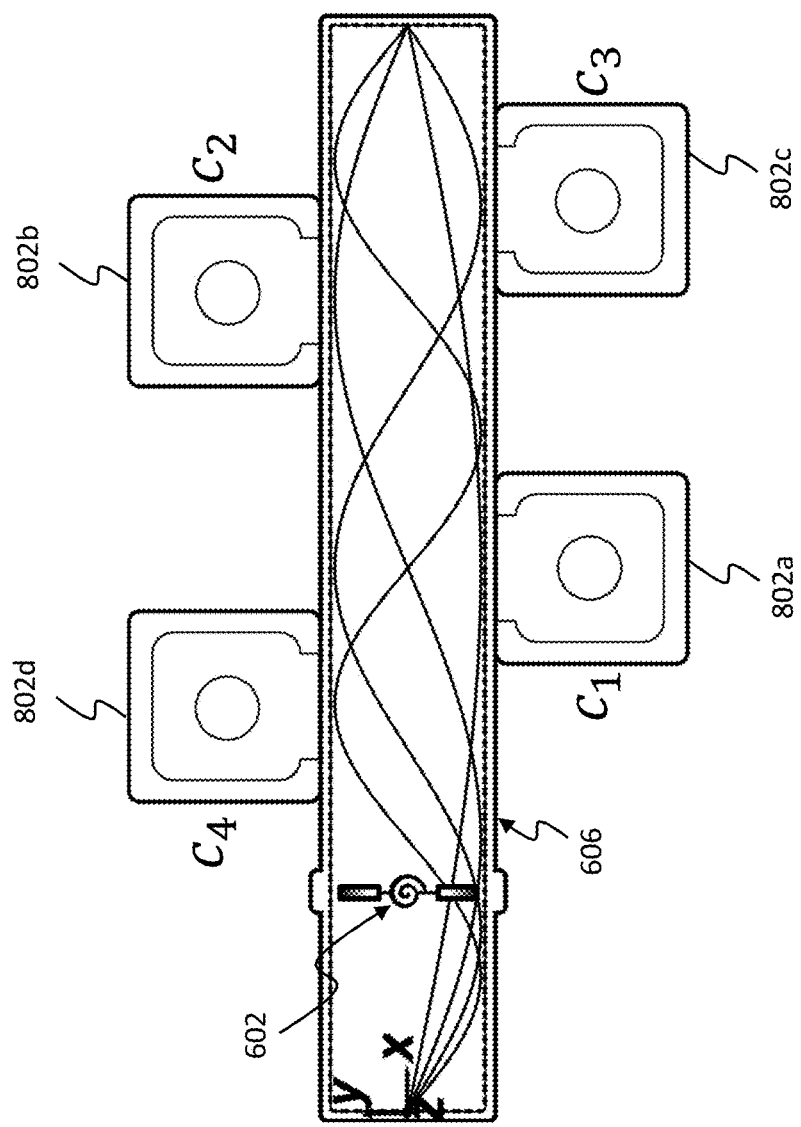
FIG. 8 is a diagram representing an exemplary quantum router being driven by a nonlinear element.

In this example, the system 503 does not require the precise tuning of the module frequencies $f_{c_1}$, $f_{c_2}$, $f_{c_3}$, $f_{c_4}$. The decrease in the term $g_{sc_ic_j}$ can be compensated by stronger pump (represented by a greater $A_{pump}$). FIG. 8 illustrates the router 606 being driven by SNAIL 602. The router 606 is coupled to four modules 802a, 802b, 802c, 802d having modes $c_1$, $c_2$, $c_3$, $c_4$.

Detuning Between Modes

Figure 9B:
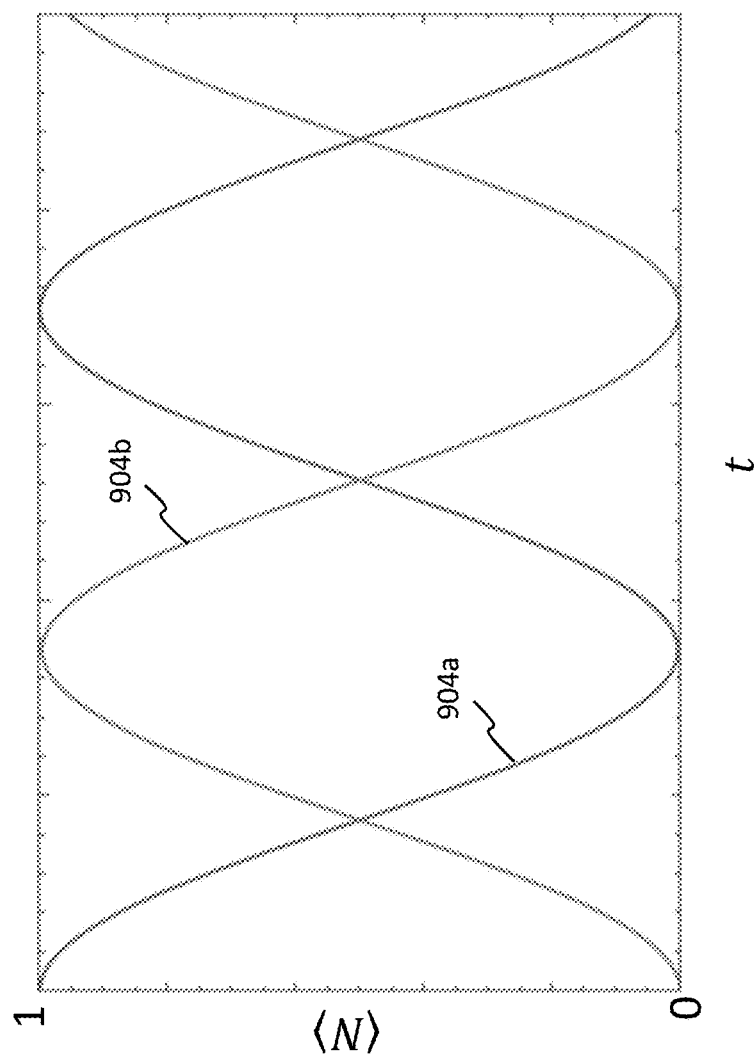
FIG. 9B is a plot illustrating the exchange of quantum information as a function of time, in which waveforms represent state of photons over time t for each of modes a and b, respectively.
Figure 9A:
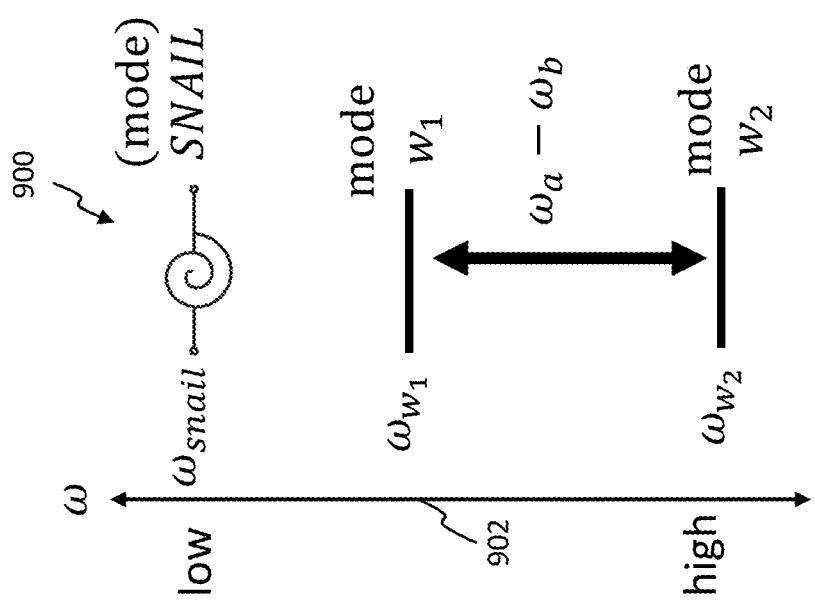
FIG. 9A is a diagram representing the interaction between modes of an exemplary waveguide.

FIG. 9A illustrates interaction between modes of an exemplary waveguide. Exemplary modes $w_1$ and $w_2$ of a waveguide have associated frequencies $\omega_{w_1}$ and $\omega_{w_2}$, respectively. By driving the waveguide at the difference frequency $\omega_{w_1}-\omega_{w_2}$, quantum information stored in mode $w_1$ is exchanged or swapped with quantum information stored in mode $w_2$. In some embodiments, the nonlinear device is a SNAIL having its own mode with frequency $\omega_{snail}$. The diagram 900 is arranged such that the frequencies of the modes are arranged in relative numerical order along frequency axis 902. Therefore, in this example, mode $w_1$ has a lower frequency $\omega_{w_1}$ than mode $w_2$ with frequency $\omega_{w_2}$. The SNAIL mode's frequency, $\omega_{SNAIL}$, can be selected to not coincide with a mode frequency (e.g., $\omega_{w_1}$ and/or $\omega_{w_2}$), or a difference between mode frequencies (e.g., $\omega_{w_1}-\omega_{w_2}$) such that the SNAIL is not resonantly excited. The exchange of quantum information is illustrated in FIG. 9B, in which waveforms 904a and 904b represent state of photons over time t for each of modes $w_1$ and $w_2$, respectively. Note that waveform 904a is 180 degrees out of phase with waveform 404b, representing the storing of quantum information in mode $w_1$ and/or $w_2$, e.g., between state 0 (quantum information not stored) and state 1 (quantum information stored).

Figure 10:
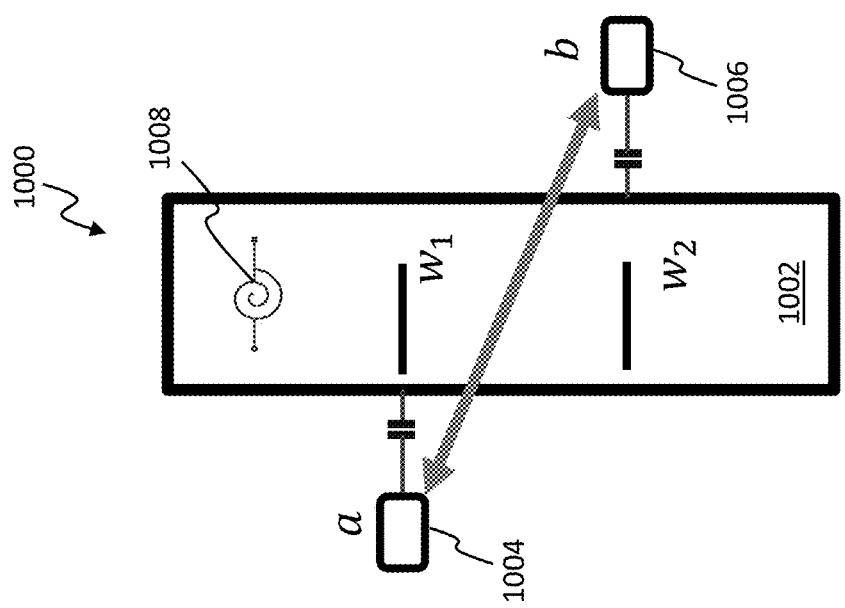
FIG. 10 is a diagram representing an exemplary system including a waveguide and two modules having cavity c and cavity d, respectively.

FIG. 10 is a diagram representing an exemplary system 1000 including a waveguide 1002 and two modules having cavity a (labelled 1004) and cavity b (labelled 1006), respectively. Cavity a and cavity b can each store quantum information. Cavity a can be coupled (e.g., capacitively coupled) to waveguide mode $w_1$ with frequency $\omega_{w_1}$ such that $\omega_{w_1}=\omega_a$. Cavity b can be coupled to waveguide mode $w_2$ with frequency $\omega_{w_2}$ such that $\omega_{w_2}=\omega_b$. In some embodiments, to swap quantum information between cavities a and b, the waveguide 1002 can be driven via the nonlinear element 1008 at the difference frequency $\omega_a-\omega_b$, with overall information flow being a→$w_1$→$w_2$→b. Note that, in this configuration, the quantum information spends considerable time in modes $w_1$ and $w_2$ of the waveguide 1002. Because cavities a and b are directly coupled to or resonant with modes $w_1$ and $w_2$ (referred to as "on-resonance"), respectively, the stored quantum information is generally always being exchanged between the module communication mode (e.g., cavity a or cavity b) and the corresponding waveguide mode (e.g., mode $w_1$ or mode $w_2$) while the waveguide is driven. Additionally or alternatively, other transitions may be induced by on-resonance cavity modes (e.g., between modes $w_1$ and $w_2$; between modes $w_1$ and b; and/or between modes $w_2$ and a). These other transitions may be undesirable when the primary goal of the exemplary routing system is the intentional exchange of quantum information between cavity modes a and b. In other words, the persistent exchange of quantum information may not be desirable if the quantum information is intended to be stored for longer period in a one location (e.g., in the module associated with cavity b) instead of another location (e.g., in the module associated with cavity a). Further, if the waveguide modes are short-lived (e.g., quantum information is not able to be stored for a useful duration), the quantum information may decohere (lose coherence). In some embodiments, to avoid this persistent exchange, quantum information should not be left in the communication mode when not actively being transferred.

In various embodiments, to prevent persistent exchange as described, the cavities can each be detuned from an associated waveguide mode by a detuning frequency. Further, each of the modes associated with the waveguide (e.g., modes $w_1$, $w_2$) and the cavities a, b may be detuned from one another to carefully control the storage of the quantum information. The resulting interaction may be referred to as an effective three-body interaction between the module modes.

Figure 11B:
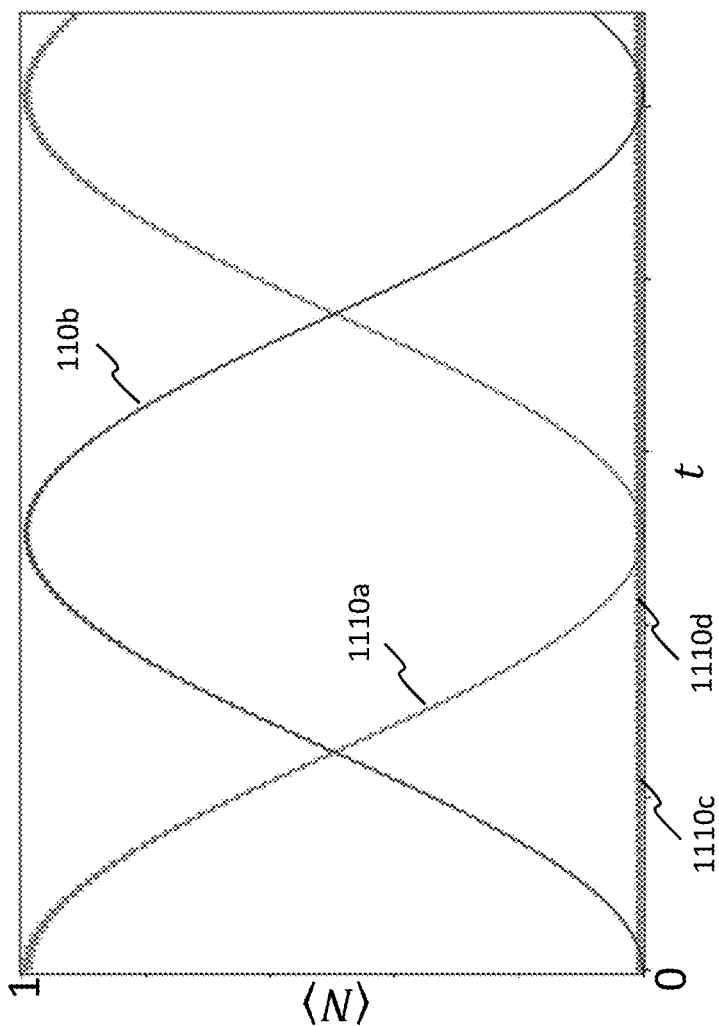
FIG. 11B is a plot representing the transitions of FIG. 11A via waveforms.
Figure 11A:
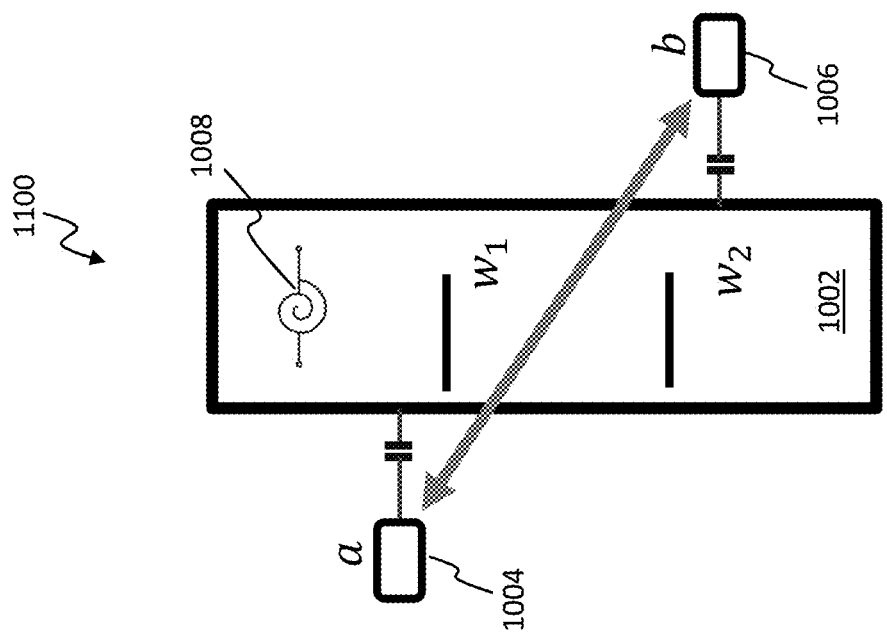
FIG. 11A is a diagram illustrating the detuning of cavities from the corresponding waveguide modes in an exemplary quantum router system.

FIG. 11A is a diagram illustrating the detuning of cavities from the corresponding waveguide modes in system 1100. The nonlinear element 1008 can be configured to drive the waveguide 1002 such that waveguide mode $w_1$ is strongly and/or directly coupled with waveguide mode $w_2$. In other words, only the electric fields of modes $w_1$ and $w_2$ interact with the nonlinear element 1008, while the modes of cavities a and b do not. In this example, cavity a may be detuned from mode $w_1$ and cavity b may be detuned from mode $w_2$. This can result in cavity a hybridizing slightly with mode $w_1$ and cavity b hybridizing slightly with mode $w_2$, thereby each inheriting a weaker parametric coupling. In various embodiments, greater detuning protects against unwanted transitions (e.g., those listed above); however, weaker hybridization between cavity modes and waveguide modes causes slower (desirable) transitions. In some embodiments, the detuning frequency is between 0 MHz and 1000 MHz. In an exemplary embodiment, the detuning frequency is between 50 MHz and 200 MHz (e.g., approximately 100 MHz). For example, cavity a can be detuned from mode $w_1$ by 100 MHz and cavity b can be detuned from mode $w_2$ as follows:

$$\omega_a = \omega_{w_1} + 100 \text{ MHz}$$

$$\omega_{w_2} = \omega_b - 100 \text{ MHz}$$

Accordingly, in this example, the nonlinear element 1008 can be configured to drive the waveguide 1002 at:

$$\omega_a - \omega_b + 200 \text{ MHz} + C$$

where C is a term representing corrections for AC Stark shift to account for higher-order perturbations.

In some embodiments, cavity a is detuned from mode $w_1$ and cavity b is detuned from mode $w_2$ such that the differences between pairs of frequencies are different from one another. This concept is illustrated in FIG. 12 for an example of a waveguide coupled to four modules.

Figure 12A:
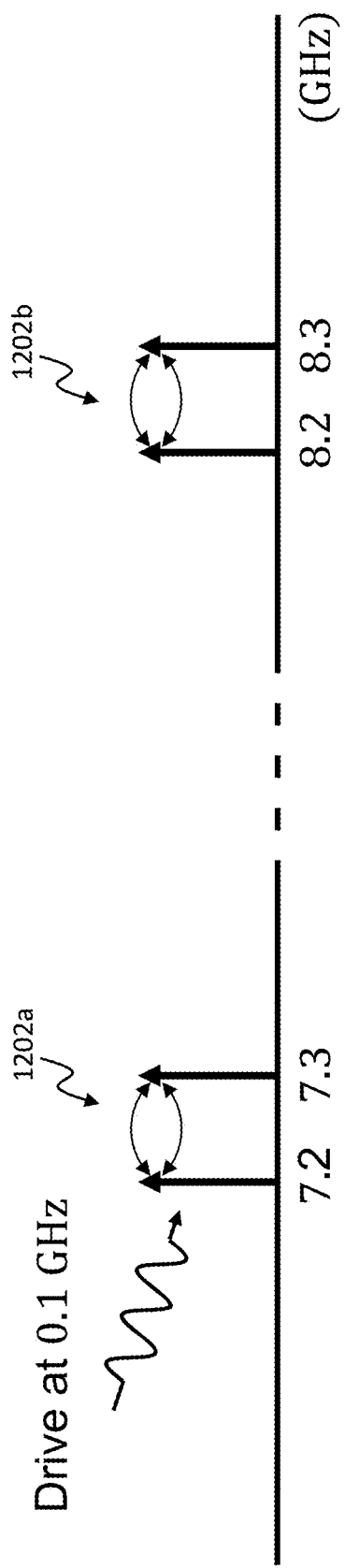
FIG. 12A is a diagram representing an example of driving a system that includes the same or similar pairs of frequency differences.

FIG. 12A depicts an example of driving a system that includes pairs of frequency differences (e.g., between 7.2 GHz, 7.3 GHz and 8.2 GHz, 8.3 GHz) that are not unique (e.g., both are 0.1 GHz apart). By driving a hypothetical system including the matching pair of differences with a frequency intended to excite the first pair 1202a, the driving frequency also unintentionally excites the second pair 1202b. Accordingly, this is an example of a system with reduced control over photon transitions.

Figure 12B:
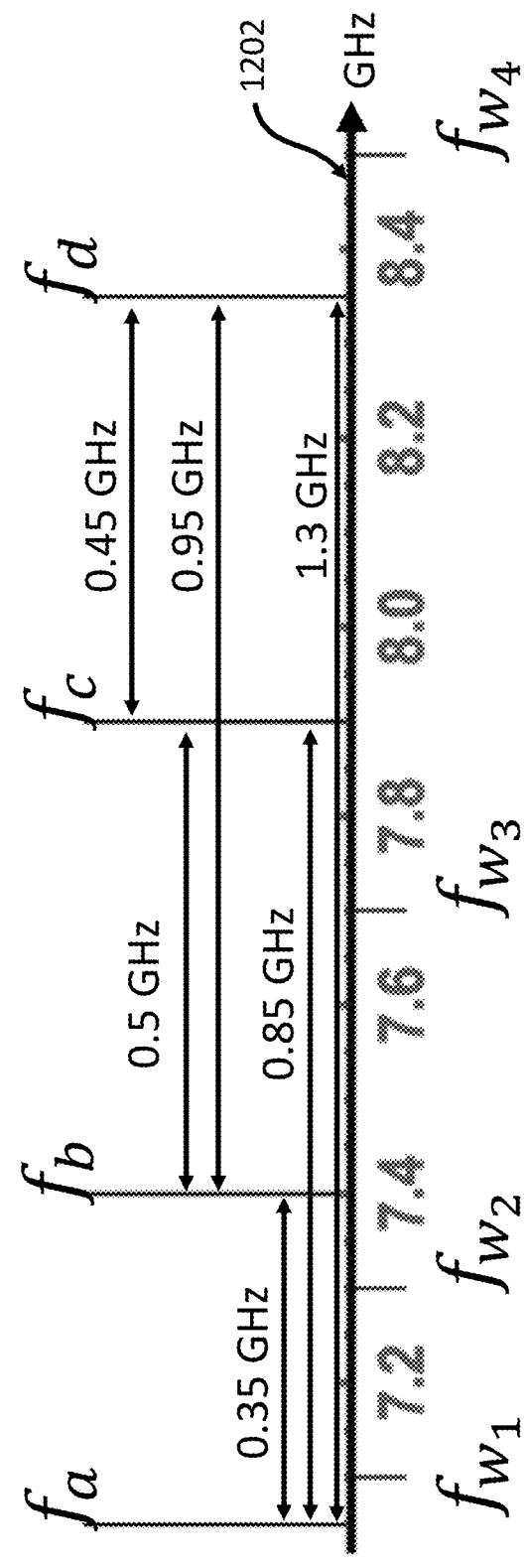
FIG. 12B depicts an arrangement of frequencies along linear axis and their relative differences.

FIG. 12B depicts an arrangement of frequencies along linear axis 1204 and their relative differences. The illustration of frequencies are for a system of an exemplary waveguide coupled to four exemplary modules. The exemplary waveguide has modes $w_1$, $w_2$, $w_3$, and $w_4$ with mode frequencies $f_{w_1}$, $f_{w_2}$, $f_{w_3}$, and $f_{w_4}$, respectively. The exemplary modules have communication modes a, b, c, and d with corresponding frequencies $f_a$, $f_b$, $f_c$, and $f_d$. By ensuring unique differences between the module communication modes' frequencies, interactions between modes can be better controlled. In contrast to the hypothetical system of FIG. 12A, the system can control the storage of quantum information in particular modes by ensuring that the differences between the module communication modes' frequencies are different from one another. For illustration, Table 2 below lists example frequencies for waveguide modes $w_1$, $w_2$, $w_3$, and $w_4$, Table 3 below lists example frequencies for module communication modes a, b, c, and d, and Table 4 lists the differences between the various module communication mode frequencies. In this example system, the frequencies are selected such that each listed frequency or frequency difference below in Tables 2, 3, and 4 is different from each other frequency or frequency difference. In some embodiments, each frequency or frequency different is different from each other frequency or frequency difference by a frequency between 0.1 GHz to 1 GHz, e.g., approximately 0.01 GHz, approximately 0.02 GHz, approximately 0.03 GHz, approximately 0.05 GHz, approximately 0.07 GHz, approximately 0.10 GHz, approximately 0.15 GHz, approximately 0.20 GHz, approximately 0.30 GHz, approximately 0.50 GHz, and so on. For example:

(1) each communication mode frequency (e.g., listed in Table 3) differs from each other communication mode frequency by at least 0.05 GHz; and (2) each communication mode frequency difference (e.g., listed in Table 4) differs from each other communication mode frequency difference by at least 0.05 GHz.

TABLE 2

Example frequencies of waveguide modes $w_1$, $w_2$, $w_3$, and $w_4$.

| Waveguide Mode | Freq. Ref. | Freq. (GHz) |
|---|---|---|
| $w_1$ | $f_{w_1}$ | 7.1 |
| $w_2$ | $f_{w_2}$ | 7.3 |
| $w_3$ | $f_{w_3}$ | 7.7 |
| $w_4$ | $f_{w_4}$ | 8.5 |

TABLE 3

Example frequencies of module communication modes a, b, c, and d.

| Module Mode | Freq. Ref. | Freq. (GHz) |
|---|---|---|
| a | $f_a$ | 7.05 |
| b | $f_b$ | 7.4 |
| c | $f_c$ | 7.9 |
| d | $f_d$ | 8.35 |

TABLE 4

Example frequency differences between module communications modes a, b, c, and d.

| Transition | Freq. Diff. Ref. | Freq. Diff. (GHz) |
|---|---|---|
| b → c | $f_c - f_b$ | 0.35 |
| b → d | $f_d - f_b$ | 0.85 |
| b → a | $f_a - f_b$ | 1.3 |
| c → d | $f_d - f_c$ | 0.5 |
| c → a | $f_a - f_c$ | 0.95 |
| d → a | $f_a - f_d$ | 0.45 |

As listed above, the mode difference frequency between each pair of communication modes is unique from any other mode difference in the example system. For example, the frequency difference between module mode x and mode y is $f_c-f_b=0.35$ GHz. By driving the nonlinear element (e.g., SNAIL) at this frequency difference ($f_{SNAIL-drive}=f_c-f_b=0.35$ GHz), other undesirable transitions are not caused. For example, by driving at the particular frequency difference $f_{SNAIL-drive}=f_c-f_b$, transitions (i) between modes a and b; (ii) between a and c; (iii) between a and d; (iv) between modes b and d; and (v) between modes c and d are prevented.

Returning to FIG. 11A, this arrangement of frequencies is reflected in the detuning of the cavity frequencies $\omega_a$, $\omega_b$ from their associated waveguide mode frequencies $w_{w_1}$, $\omega_{w_2}$. Specifically, frequencies are arranged such that $\omega_a < \omega_{w_1} < \omega_{w_2} < \omega_b$, with each difference between frequencies being unique from each other:

$$\omega_a - \omega_b \neq \omega_{w_1} - \omega_{w_2} \neq \omega_{w_2} - \omega_b \neq \omega_a - \omega_{w_1}$$

This can enable a greater degree of control over the transitions as described above. FIG. 11B represents the transitions via waveforms 1102a, 1102b, 1102c, and 1102d. For instance, the exchange of quantum information between cavity a and cavity a is represented by sinusoidal waveform 1102a (for cavity a) out-of-phase with sinusoidal waveform 1102b (for cavity b). Note that waveform 1102c (representing mode $w_1$) and waveform 1102d (representing mode $w_2$) are at or near state 0, illustrating that quantum information is stored for very short durations or not at all in either of mode $w_1$ or mode $w_2$. In other words, when the waveguide is driven at the difference frequency between modes a and b, information transits the waveguide-occupying modes $w_1$ and $w_2$ "virtually", thereby essentially "skipping" the waveguide modes $w_1$ and $w_2$. As discussed herein, these waveguide modes may be lossy (e.g., cannot efficiently store quantum information) in comparison to module modes. By allowing waveguide modes to be lossy (and skipped by the quantum information), the cost in manufacturing the waveguide can be reduced.

Figure 13A:
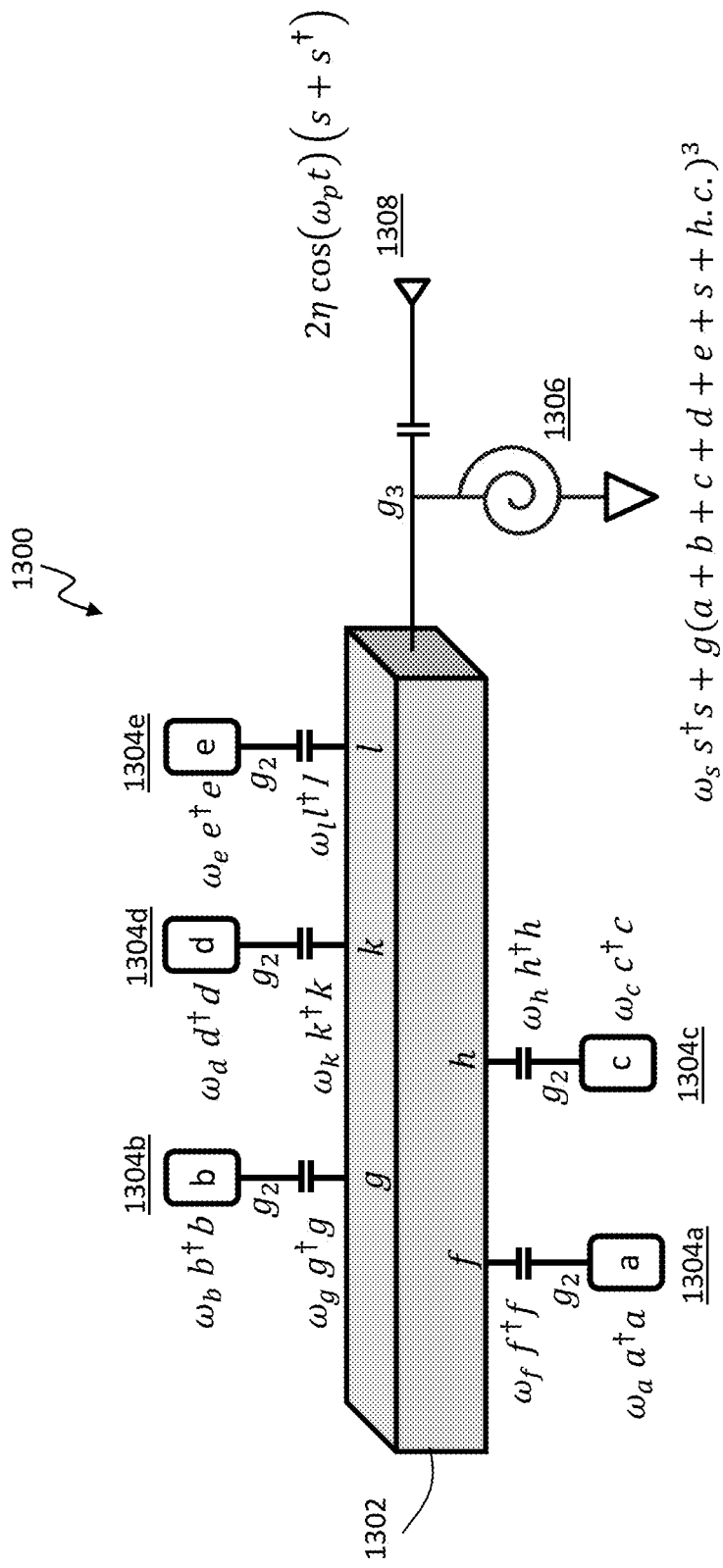
FIG. 13A is a diagram representing an exemplary quantum routing system including a quantum router and five module cavities.

FIG. 13A illustrates an exemplary quantum routing system 1300 including a quantum router 1302 and five modules 1304a, 1304b, 1304c, 1304d, 1304e (collectively referred to as 1304). In this "long hallway" implementation of the routing system, the router 1302 may have an oblong shape (e.g., in a rectangle). The router 1302 (e.g., waveguide) may be driven by a SNAIL 1306 and photon pump 1308. The modes of the quantum routing system 1300 can be defined as follows:

TABLE 5

Exemplary modes of the quantum routing system 1300
(where h.c. represents the Hermetian conjugate
of the preceding terms a, b, c, d, e, and s).

| Mode | Equation |
| --- | --- |
| Module mode a | $\omega_a a^\dagger a$ |
| Module mode b | $\omega_b b^\dagger b$ |
| Module mode c | $\omega_c c^\dagger c$ |
| Module mode d | $\omega_d d^\dagger d$ |
| Module mode e | $\omega_e e^\dagger e$ |
| Waveguide mode f | $\omega_f f^\dagger f$ |
| Waveguide mode g | $\omega_g g^\dagger g$ |
| Waveguide mode h | $\omega_h h^\dagger h$ |
| Waveguide mode k | $\omega_k k^\dagger k$ |
| Waveguide mode l | $\omega_l l^\dagger l$ |
| SNAIL mode s | $\omega_s s^\dagger s + g(a + b + c + d + e + s + h.c.)^3$ |
| Photon pump p | $2\eta \cos(\omega_p t)(s + s^\dagger)$ |

The Hamiltonian of the system 1300 can be represented as follows:

$$H_0 = \omega_a a^\dagger a + \omega_b b^\dagger b + \omega_c c^\dagger c + \omega_d d^\dagger d + \omega_e e^\dagger e + g(a+b+c+d+e+s+h.c.)^3 + 2\eta \cos(\omega_p t)(s+s^\dagger)$$

The following transformation can be applied:

$$U = D_Z = e^{zs^\dagger - z^*s}$$

where $$z = \frac{\eta}{\omega_p - \omega_s} e^{-i\omega_p t} - \frac{\eta}{\omega_p + \omega_s} e^{i\omega_p t}$$

Using the following stiff pump approximation:

$$\left| \frac{\omega_s \eta}{\omega_s^2 - \omega_p^2} \right| \gg 1$$

the Hamiltonian can be represented as follows:

$$H_0 = \omega_a a^\dagger a + \omega_b b^\dagger b + \omega_c c^\dagger c + \omega_d d^\dagger d + \omega_e e^\dagger e + g(a+b+c+d+e+A_p e^{i\omega_p t}s + h.c.)^3$$

Alternatively or additionally, the Hamiltonian can be expressed as:

$$H = \sum_n \omega_n n^\dagger n + \sum_{\substack{i,j \\ (i=g,\ldots,l) \\ (j=a,\ldots,e)}} g_{2_{ij}}(i^\dagger j + j^\dagger i) + \sum_{\substack{p,q \\ (p,q=g,\ldots,l)}} g_{3_{pq}}(p^\dagger q s^\dagger + p q^\dagger s) + \text{etc.}$$

The frequency of communicator cavities (modules) 1304 are selected such that the transition frequencies between the modes are 100 MHz away from each other (detuned). By pumping the SNAIL 1306 at the difference frequency, transitions can be induced between arbitrary cavity modes.

Figure 13C:
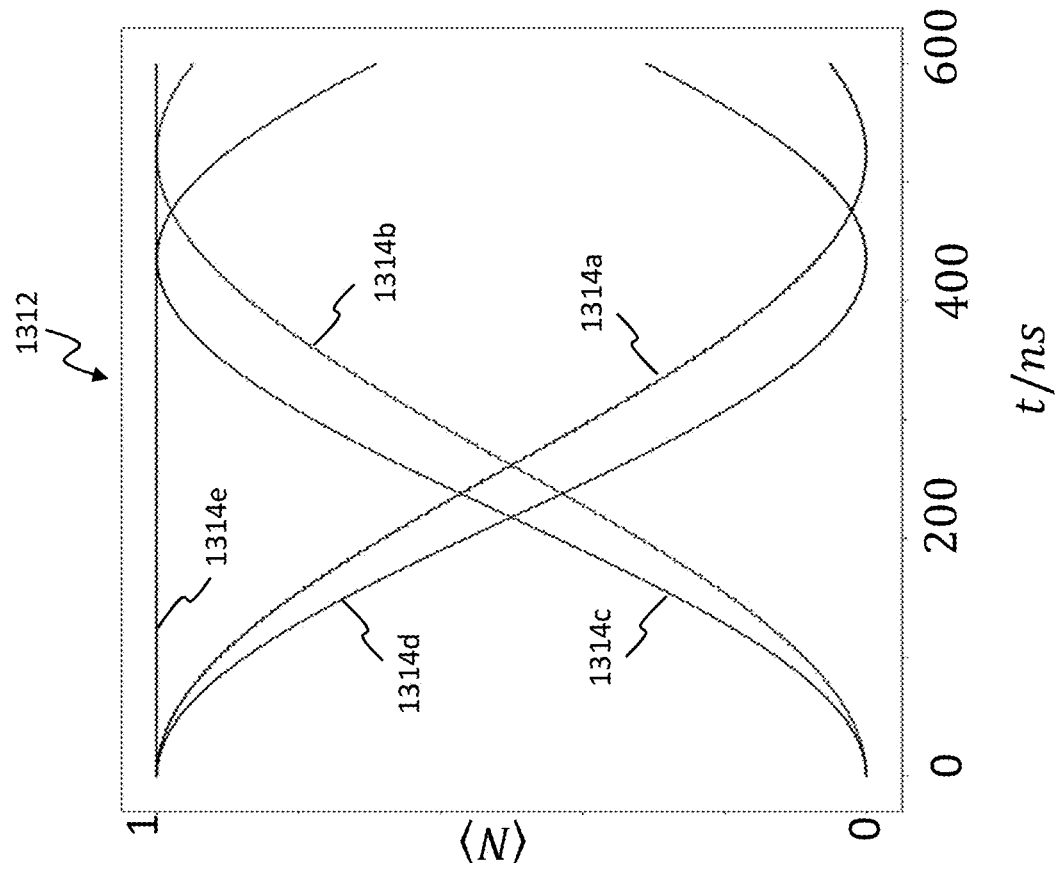
FIGS. 13B-13C are plots illustrating simulations of parametric photon swapping in an exemplary quantum router system in a two-mode swap and a multimode swap, respectively, as a function of time.
Figure 13B:
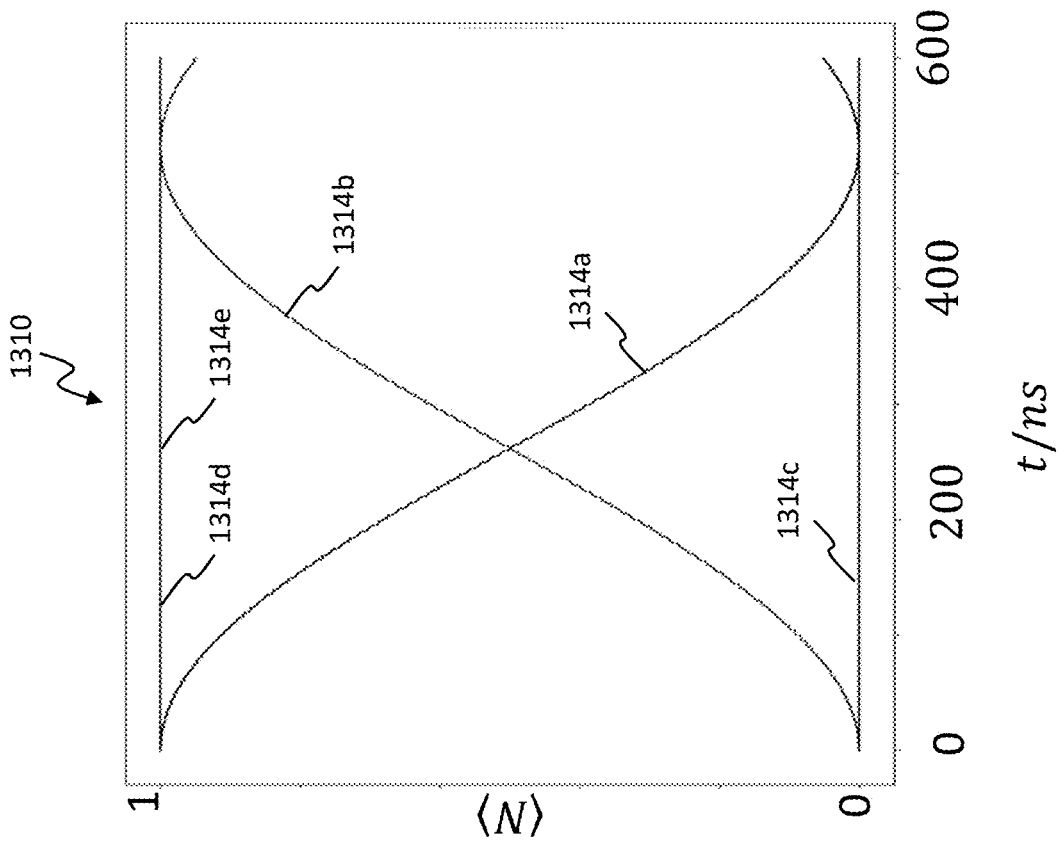

FIGS. 13B-13C are plots 1310, 1312 illustrating simulations of parametric photon swapping in the system 1300 in a two-mode swap (single photon transition) and a multimode swap (parallel photon transition), respectively, as a function of time. As an example, the module modes 1304 may have the following associated frequencies:

$f_a=7.0$ GHz,$f_b=7.1$ GHz,$f_c=7.3$ GHz,$f_d=7.7$ GHz,
$f_e=8.2$ GHz $g=100$ MHz

The initial state of the photons is 110011), such that photons reside in module modes a, d, and e. In the two-mode swap of plot 1310, the quantum information moves from cavity mode a (line 1314a) to cavity mode b (1314b). The waveguides can be driven by the following the complex sinusoid with pump strength $A_p$ with pumping frequency $\omega_p$:

$$A_p e^{i\omega_p t}$$

where $A_p=0.05, \omega_p=0.1$ GHz

In the multi-mode swap of plot 1312, the quantum information moves from cavity mode a (line 1314a) to cavity mode b (1314b) and from cavity mode d (line 1314d) to cavity mode c (1314c), represented by the following:

$$A_p e^{i\omega_p t} \to A_{p1} e^{i\omega_{p1} t} + A_{p2} e^{i\omega_{p2} t}$$

where $A \to_{p1}=0.05, \omega_{p1}=0.1$ GHz,$A_{p2}=0.06, \omega_{p2}=0.4$ GHz

Figures 13D, 13E:
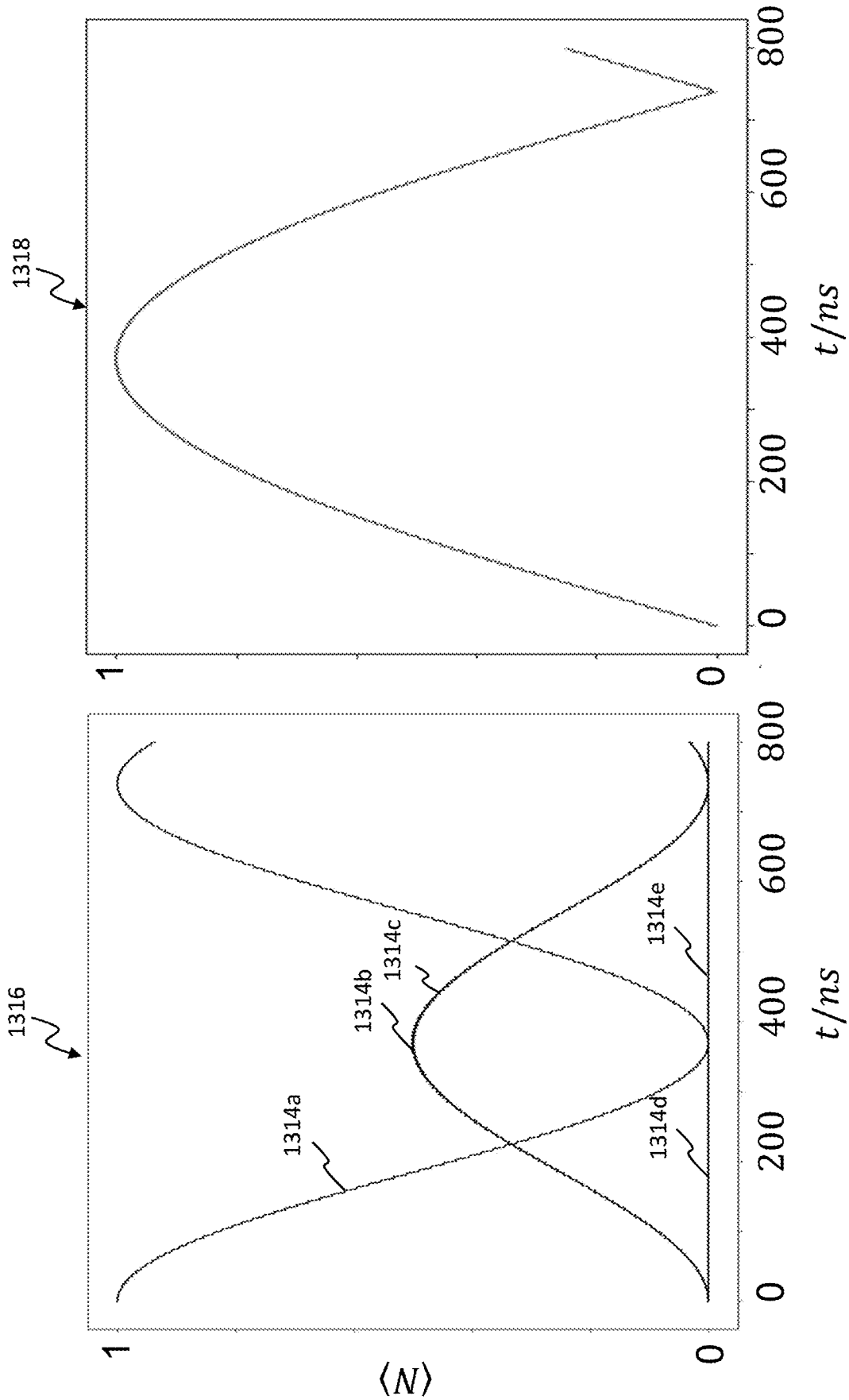
FIG. 13D is a plot illustrating the photon number expectation value as a function of normalized time.
FIG. 13E is a plot illustrating the fidelity for the particular photon transition as a function of normalized time.

The following example is based on the router system 1300, in which the initial state of the photons is 110000), such that quantum information resides in cavity mode a. FIG. 13D is a plot 1316 illustrating the photon number expectation value <N> as a function of time t (in units of ns). In this example, a photon occupies cavity mode a while cavity modes b, c, d, and e are unoccupied at the start, 0 ns. At approximately time 385 ns, the photon transitions from cavity mode a such that, theoretically, it "half" occupies mode b and "half" occupies cavity mode c. In reality, while the photon is not divided between cavity modes b and c but that cavity modes b and c are entangled. At approximately time 750 ns, the photon occupies cavity mode a again. FIG. 13E is a plot 1318 illustrating the fidelity for the particular state the photon is in according to the following relationship:

$$\frac{1}{\sqrt{2}}(|01000\rangle + e^{i\omega_{cb}t}|00100\rangle) = |0\rangle \otimes \frac{(|10\rangle + e^{i\omega_{cb}t}|01\rangle)}{\sqrt{2}} \otimes |00\rangle$$

Figures 13F, 13G:
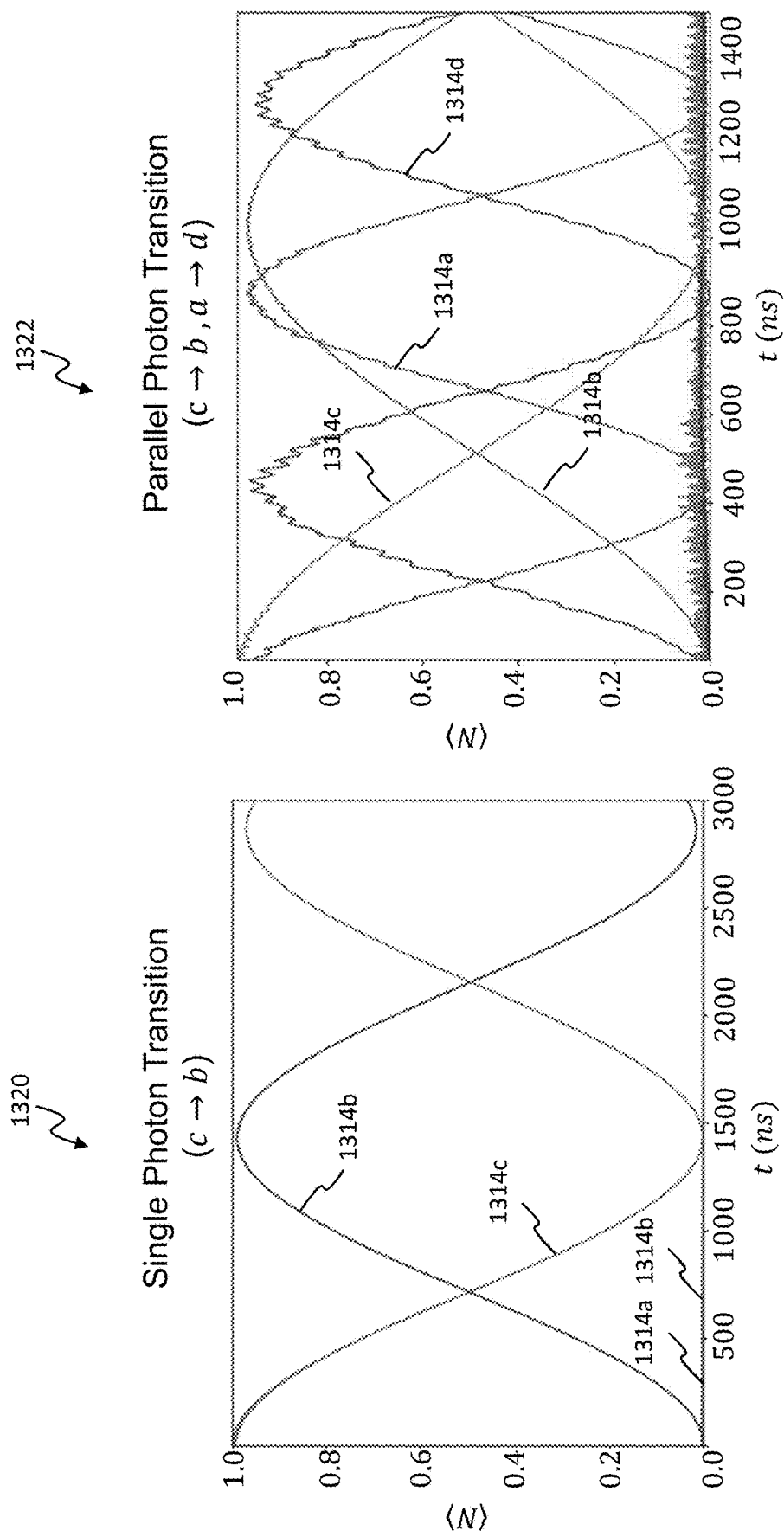
FIGS. 13F-13G are plots illustrating simulations of parametric photon swapping in an exemplary quantum router system in a single photon transition and parallel photon transition, respectively, as a function of time.

FIGS. 13F-13G are plots 1320, 1322 illustrating simulations of parametric photon swapping in the system 1300 in a single photon transition (e.g., between cavity c 1304c and cavity b 1304b) and parallel photon transition (e.g., between cavity c 1304c and cavity b 1304b and between cavity a 1304a and cavity d 1304d), respectively, as a function of time. In the single photon transition of plot 1320, the quantum information moves from cavity c (line 1314c) to cavity b (1314b). In this example, a single photon transition can be effected in approximately 1.5 μs with fidelity of approximately 98.8%. In the parallel photon transition of plot 1322, the quantum information moves from cavity c (line 1314c) to cavity b (1314b) and from cavity a (line 1314a) to cavity d (1314d). Parallel photon transition can be effected in approximately 1.5 μs with fidelity of approximately 96%.

FIG. 14A is an exemplary waveguide 1400 used in the routing of quantum information. In this example, a commercial waveguide, e.g., waveguide type WR137, with dimensions A=1.372 inches, B=0.622 inches, and L=5.14 inches is used. FIGS. 14B-14F are eigenmode simulations illustrating various modes that exist in the waveguide 1400 having the above-mentioned dimensions. The various modes and respective frequencies of the example waveguide 1400 are listed in Table 5 below.

TABLE 6

Exemplary modes and associated frequencies for waveguide 1400.

| Figure No. | Mode No. | Freq. (GHz) |
|---|---|---|
| FIG. 14B | $w_1$ | 4.452 |
| FIG. 14C | $w_2$ | 4.876 |
| FIG. 14D | $w_3$ | 5.510 |
| FIG. 14E | $w_4$ | 6.292 |
| FIG. 14F | $w_5$ | 7.173 |

In various embodiments, the above listed frequencies are selected such that there is sufficient difference between the frequencies according to the following relationships:

$$f_{ij}=|f_i-f_j|$$

$$\min(|f_{ij}-f_{kl}|)=f_{w_5w_4}-f_{w_4w_3}=99 \text{ MHz}$$

In this example, a separation of 99 MHz may be sufficient for a deliberate (and successful) photon transition. The difference frequency $f_{w_2w_5}$ is:

$$f_{w_2w_5}=|f_{w_2}-f_{w_5}|=4.876-7.173|GHz=2.297 \text{ GHz}$$

In this example, the nonlinear element can be driven at a difference frequency of 2.297 GHz to exchange quantum information between mode $w_2$ and mode $w_5$ of the waveguide 1400.

In some embodiments, the position for the nonlinear element on the waveguide 1400 is selected such that the position avoids null areas of the group of modes that are expected to be utilized in the waveguide. For example, if modes $w_2$ and $w_4$ are the modes expected to store information, then the nonlinear element would not be positioned at the midpoint 1404 or on either end 1406a, 1406b of the waveguide in FIGS. 14C and 14E. In another example, if modes $w_1$, $w_2$, $w_3$, $w_4$, and $w_5$ are expected to store information, then the nonlinear element may be positioned approximately at point 1402a or point 1402b to avoid the null areas. This way, there is a similar interaction of the nonlinear element with each of modes $w_1$ through $w_5$.

Router Tree Structures

In various embodiments, two or more routers may be organized into a "tree" structure and configured according to the exemplary methods and systems for routing quantum information described herein. For example, a router may be configured to have a number of internal modes (e.g., 2, 3, 5, 7, 10, or more). The router may be coupled to other routers to form a tree-shaped quantum router. The number of hops required to exchange a pair of qubits is logarithmic in the number of qubits. This is advantageous in comparison to surface code implementations for quantum information exchange, which requires the square root of the number of qubits.

Figure 15A:
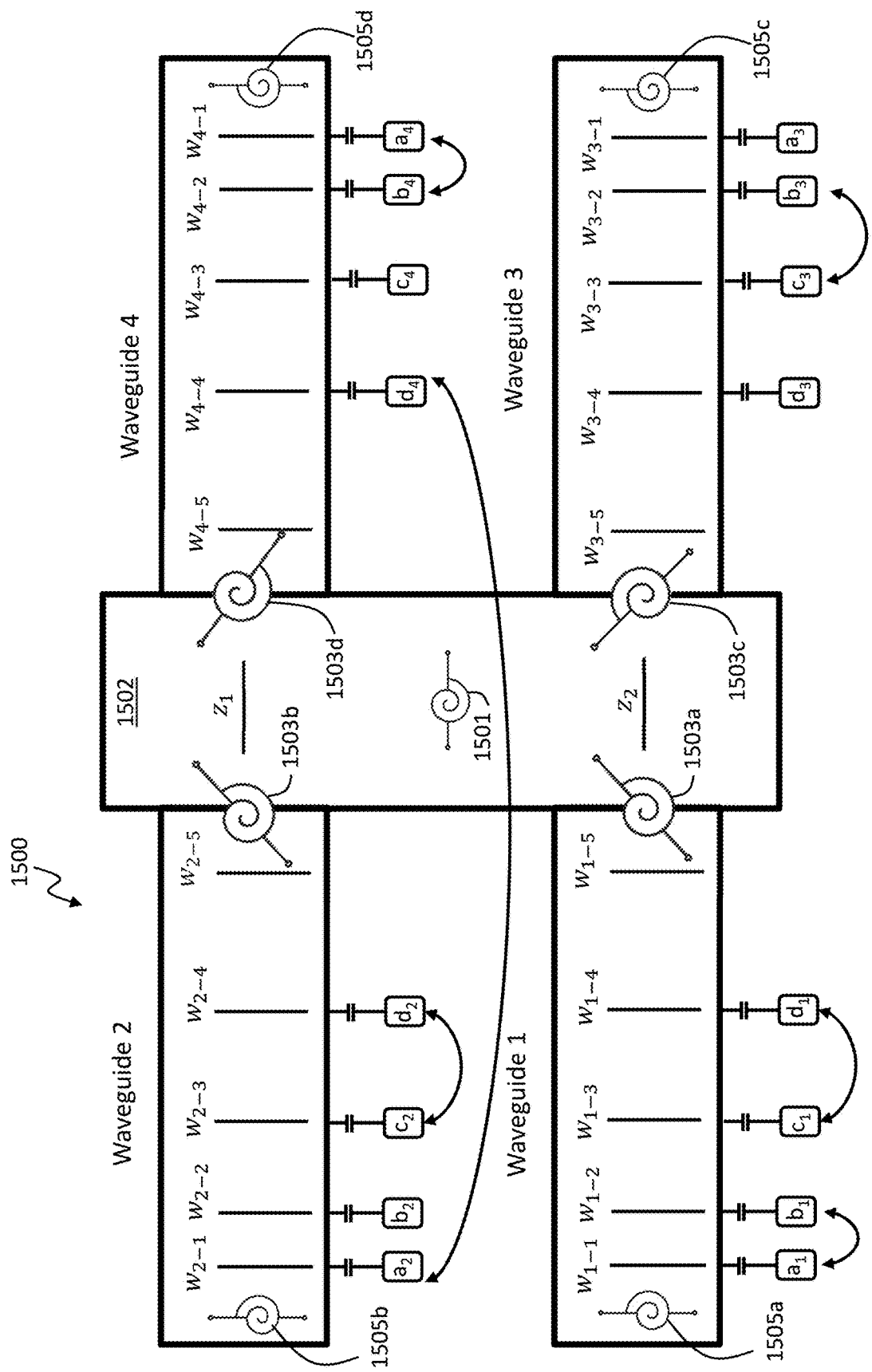
FIG. 15A is a diagram representing an exemplary router tree structure including two or more waveguides.

FIG. 15A illustrates a router tree structure 1500 including waveguides 1, 2, 3, and 4 (referred to as "branches"). These waveguides are coupled by a central waveguide 1502. Each waveguide may be coupled to one or more respective modules (e.g., modules a, b, c, d). As illustrated in the above examples for the single router case (e.g., refer to FIGS. 13B, 13C, 13F, and 13G), two or more of the transitions may be executed in parallel. In some embodiments, all of the transitions can be executed in parallel. In router tree structures, frequency separation as discussed (e.g., refer to FIGS. 12A-12B) may be "relaxed" due to the physical spatial separation, which can decouple the modes of waveguides. For example, the modes of waveguide 2 may be decoupled from the modes of waveguide 4 due to the physical separation. In some embodiments, it is not necessary that all difference frequencies be unique and usable within the larger tree structure. In some instances, multiple 'links' between pairs of modules in separate waveguides (e.g., waveguide 1 and waveguide 4) are desirable. This can enable parallel photon swap operations. In some instances, one swap operation can be sufficient, and can be supplemented with up to two local swaps between local modules in either waveguide to achieve universal coupling.

Each waveguide 1, 2, 3, 4 may be coupled to a respective nonlinear element 1505a, 1505b, 1505c, 1505d (collectively referred to as 1505). Nonlinear elements 1505 can be configured to drive photon transitions within a corresponding single waveguide. For example, nonlinear element 1505b can drive waveguide 2 to swap photons between modules $b_2$ and $d_2$. In various embodiments, two or more waveguides can be coupled to each other using nonlinear elements (e.g., SNAILs 1503a, 1503b, 1503c, 1503d, collectively referred to as 1503). Nonlinear elements 1503 can be configured to drive photon transitions between the modules of two or more waveguides. For example, nonlinear element $1503c$ can drive transitions between module $c_3$ of waveguide 3 and module $b_4$ of waveguide 4. The central waveguide 1502 may be driven by nonlinear element 1501. For example, the two modes $z_1$, $z_2$ of waveguide 1502 may be coupled by the nonlinear element 1501.

In this way, quantum information can be swapped between various modes, including between two different modes of two different waveguides. For example, photons can be swapped between module $a_2$ and module $d_4$; between module $c_3$ and $c_4$; etc. In some embodiments, a photon swap can be implemented between two or more modules coupled to waveguides 1, 2, 3, and/or 4 by directly swapping to the intermediate modes of the central element 1502. In some embodiments, a photon swap can be implemented via ancillary communication modules connected to waveguide 1502. In some embodiments, a photon swap may be implemented by using the (smaller) three-wave couplings created by the several SNAILs which hybridize the overall structure's modes. Note that a combination of two or more methods for swapping photons above can be used together to transmit quantum information within a tree structure.

Figure 15B:
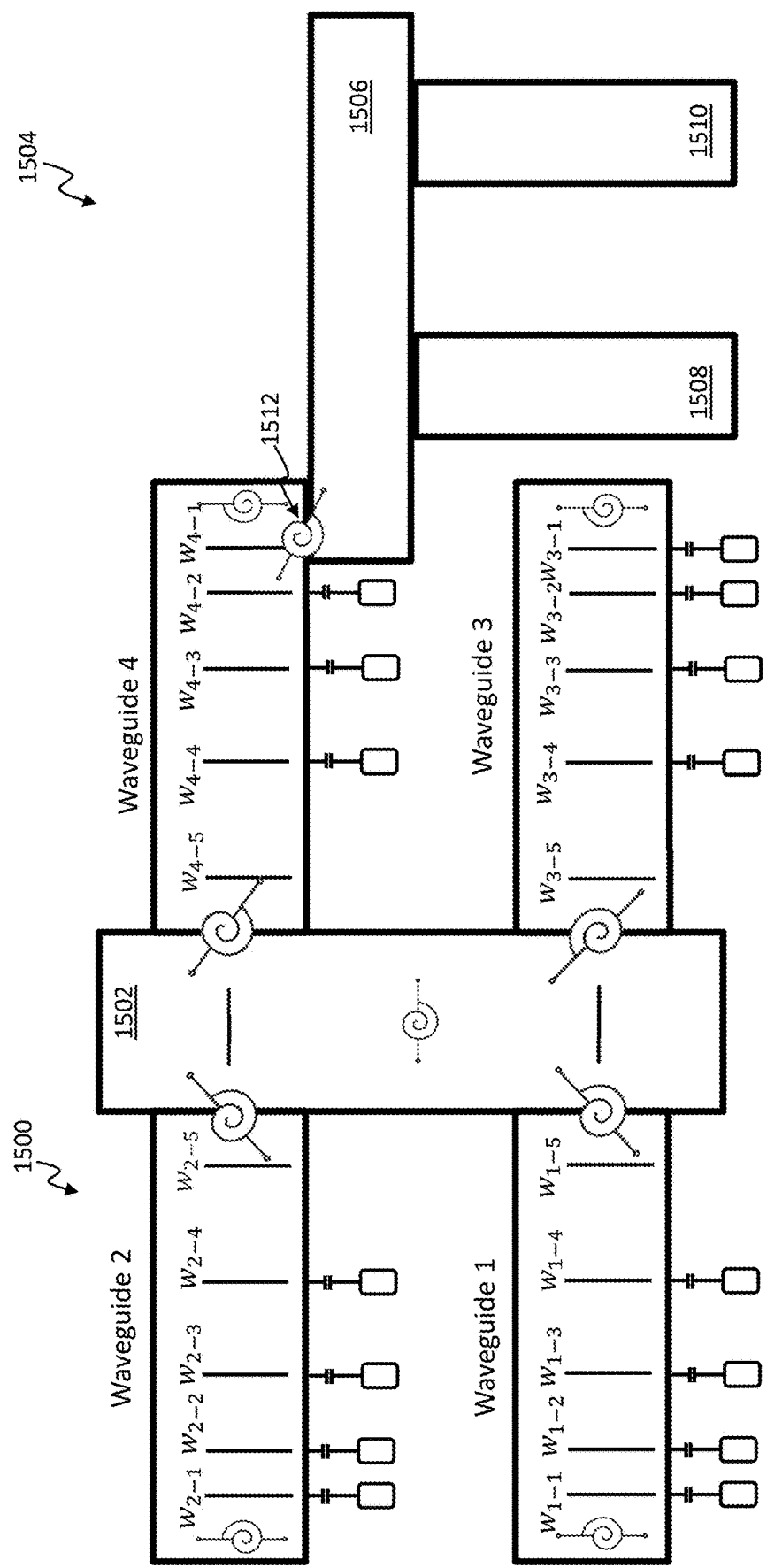
FIG. 15B is a diagram representing an exemplary extended router tree structure including the structure of FIG. 15A.

FIG. 15B depicts an extended router tree structure 1504 including the structure 1500. This example illustrates that the tree structures can be scaled up (or down) with the addition (or removal) of waveguides 1506, 1508, 1510, etc. Note that additional waveguides (e.g., 1506) is connected to structure 1500 by nonlinear element 1512.

FIG. 16A illustrates a router tree structure 1600a in which waveguide 1602a is coupled to waveguide 1602b via nonlinear element 1604. Note that the waveguides are coupled in a perpendicular configuration ("configuration type A"). In another example, FIG. 16B illustrates a router tree structure 1600b in which waveguide 1602a is coupled to waveguide 1602b via nonlinear element 1604. In this case, waveguide 1602a is joined with an offset to the center of waveguide 1602b ("configuration type B").

Figure 16C:
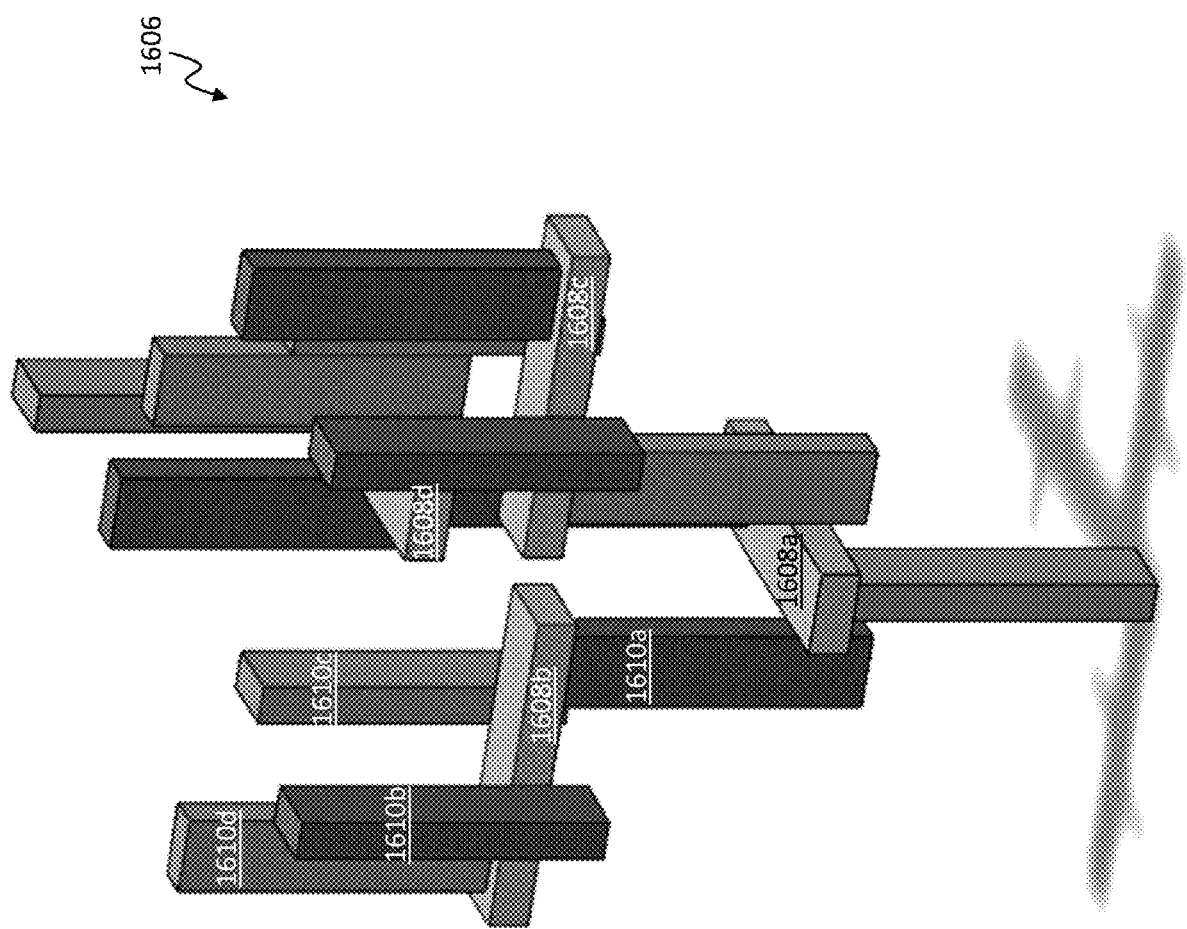
FIG. 16C is a model of an exemplary extended router tree structure in which each central waveguide is coupled to four other waveguides.

FIG. 16C depicts an extended router tree structure 1606 in which each central waveguide 1608a, 1608b, 1608c, 1608d is coupled to four other waveguides. For example, central waveguide 1608b is coupled to four waveguides 1610a, 1610b, 1610c, 1610d. In particular, waveguides 1610a and 1610d are coupled to central waveguide 1608b in configuration type A while waveguides 1610b and 1610c are coupled to central waveguide 1608b in configuration type B. In some embodiments, by varying the coupling types (e.g., A versus B or others), the tree branches avoid collisions with another branch. In various embodiments, a central waveguide may be coupled to 2, 3, 4, 5, 7, 10, or more other waveguides. In some embodiments, the number of other waveguides that may be coupled to a central waveguide may be at most 2, at most 4, at most 6, at most 10, etc. As discussed further herein with respect to coupling to modules, the number of other waveguides to which the central waveguide can couple to may be limited by physical constraints (e.g., how large the hardware can be) and/or the number of mode frequencies that can be accommodated in a single waveguide.

Figure 17:
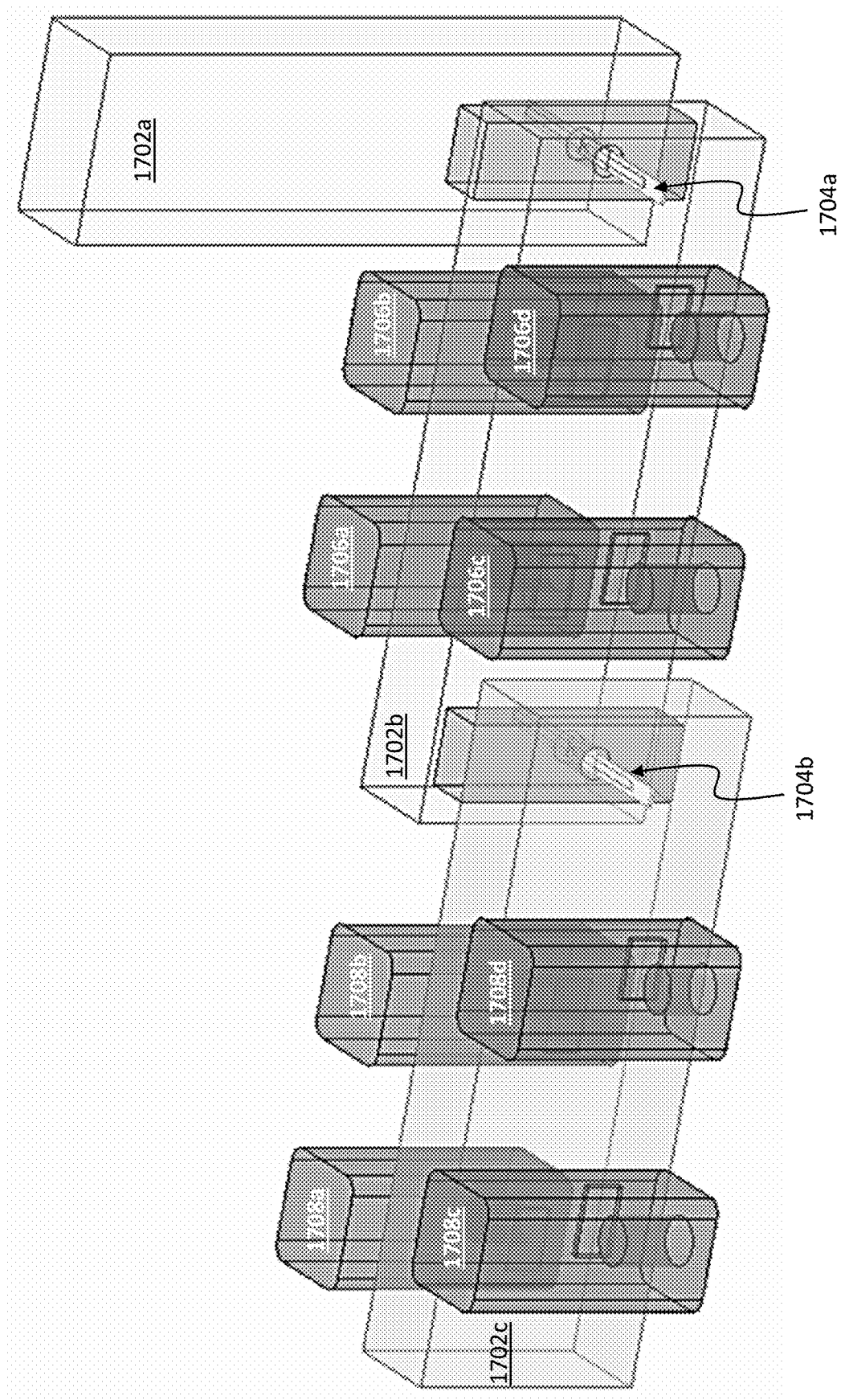
FIG. 17 is a diagram of an exemplary router tree structure in which a first waveguide is coupled via nonlinear element to a second waveguide, which is coupled via nonlinear element to a third waveguide.

FIG. 17 illustrates a router tree structure 1700 in which a waveguide 1702a is coupled (via nonlinear element 1704a) to waveguide 1702b, which is coupled (via nonlinear element 1704b) to waveguide 1702c. Waveguide 1702b is configured to be coupled to two or more modules (e.g., modules 1706a, 1706b, 1706c, 1706d, collectively referred to as modules 1706). Waveguide 1702c is configured to be coupled to two or more modules (e.g., 1708a, 1708b, 1708c, 1708d, collectively referred to as modules 1708). Note that, in this example, a central waveguide is not necessarily required directly between two module-bearing waveguides 1702b, 1702c. Instead, two module-bearing waveguides can be coupled to each other. In this embodiment, nonlinear element 1702a can be configured to drive photon transitions local to a particular waveguide (e.g., between two or modules 1706) and/or drive photon transitions between waveguides 1702a and 1702b. In some embodiments, nonlinear element 1702a can be configured to (1) locally drive waveguide 1702a, (2) locally drive waveguide 1702b, and (3) drive between waveguides 1702a and 1702b at or nearly the same time.

Note that other router tree structure implementations are contemplated and fall within the scope of this disclosure. For example, two or more waveguides may be coupled serially, in parallel, in a ladder shape, daisy-chained, or in another configurations. In some embodiments, the router tree structure may be modular such that portion(s) of the structure can be added to or removed from an existing structure.

Hardware Implementations

Figure 18:
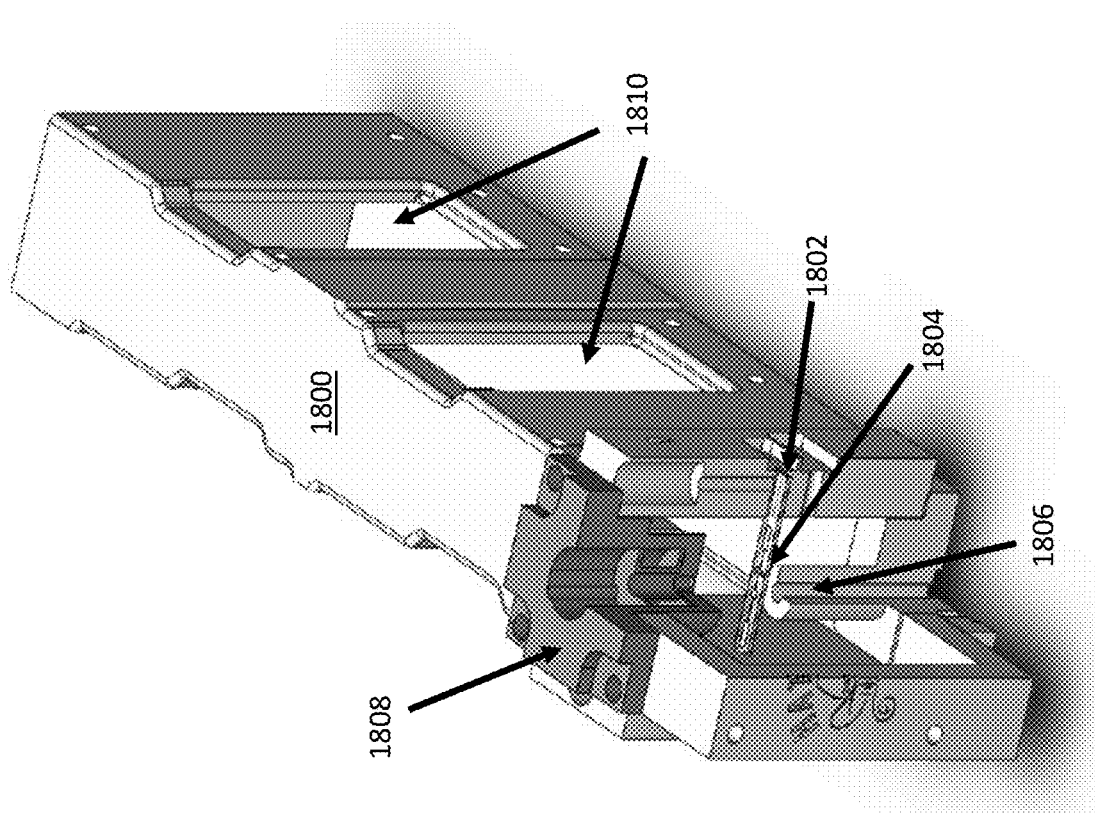
FIG. 18 is a model of an exemplary router for a quantum router system.
Figures 19A, 19B:
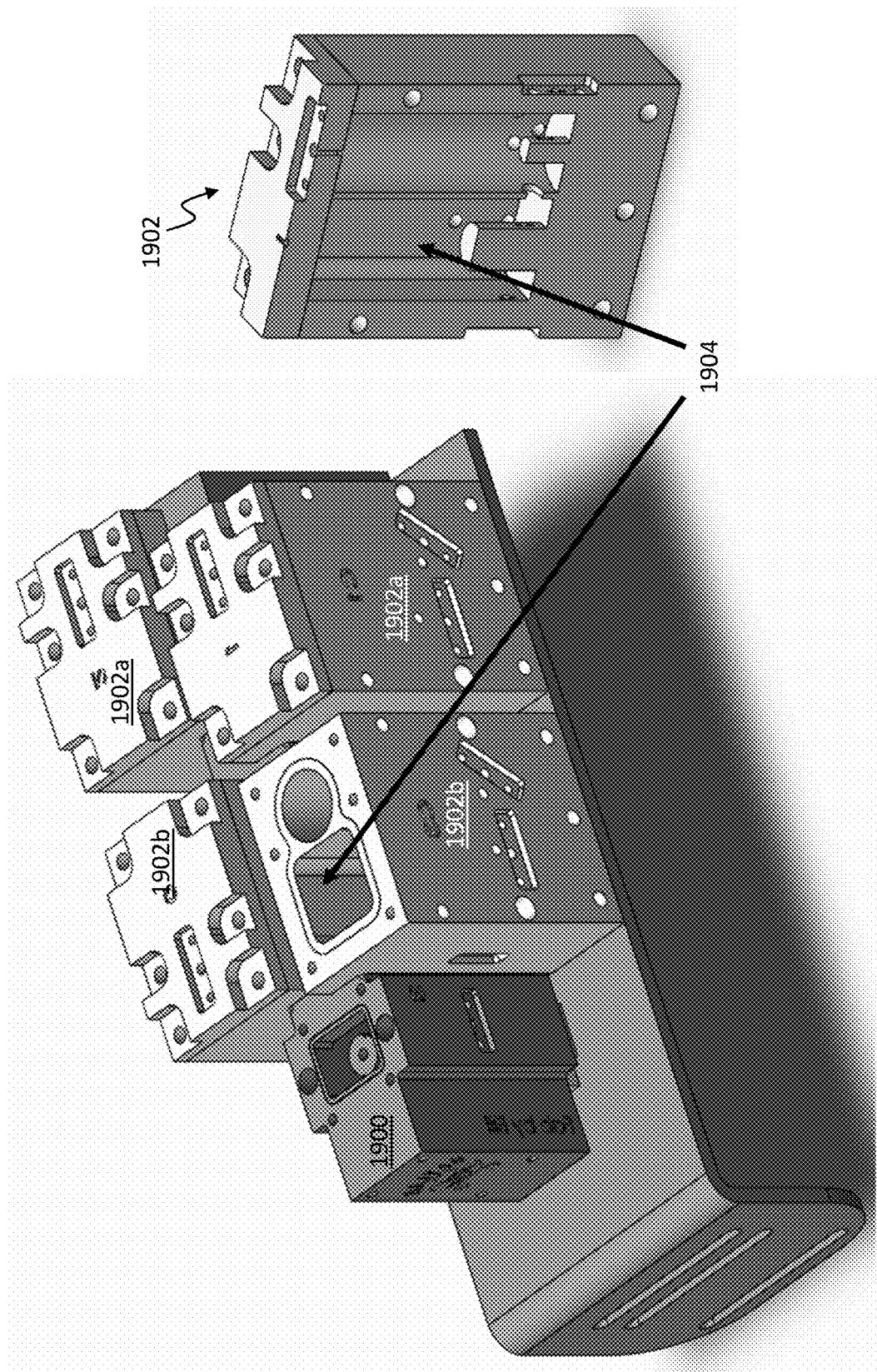
FIG. 19A is a model of an exemplary router coupled to four exemplary modules.
FIG. 19B is a cross-sectional view of an example module of FIG. 19A.

FIG. 18 is a model of an exemplary router 1800 for a quantum router system. The exemplary router 1800 is primarily linear in shape. The router 1800 can include a space 1802 (e.g., a slot or position) configured to hold a circuit or chip including the nonlinear element 1804 (e.g., SNAIL). The router 1800 can include a pump port 1806 configured for the pumping of photons toward the SNAIL 1804. The router 1800 can include a magnet 1808 to provide a flux bias. The router 1800 can include aperture(s) 1810 for coupling the router 1800 to module(s). FIG. 19A is a model of the router 1900 coupled to four exemplary modules 1902a, 1902b, 1902c, 1902d (collectively referred to as 1902). The modules 1902 can include a communication cavity 1904 for coupling quantum information into the router via the module ports 1810. FIG. 19B is a cross-sectional view of an example module 1902.

As discussed above, an exemplary router may have many router modes (e.g., theoretically an infinite number of router modes) and could therefore host just as many modules, thereby enabling just as many quantum swaps. To transfer information in a practical system, only a subset of the router's modes may be utilized as "operational modes". Further, the exemplary router can be configured to add or subtract operational modes by modifying the hardware of the router, e.g., by adding or closing apertures 1810 and attaching or removing a corresponding number of modules 1902. In some embodiments, the number of accessible router modes may be limited by the physical size of the waveguide 1900 and/or the modules 1902. For example, as illustrated in FIG. 19A, approximately four modules 1902 are attachable to the waveguide 1900. However, the waveguide 1900 may be modified as described to couple to fewer or more modules 1902.

Figure 20B:
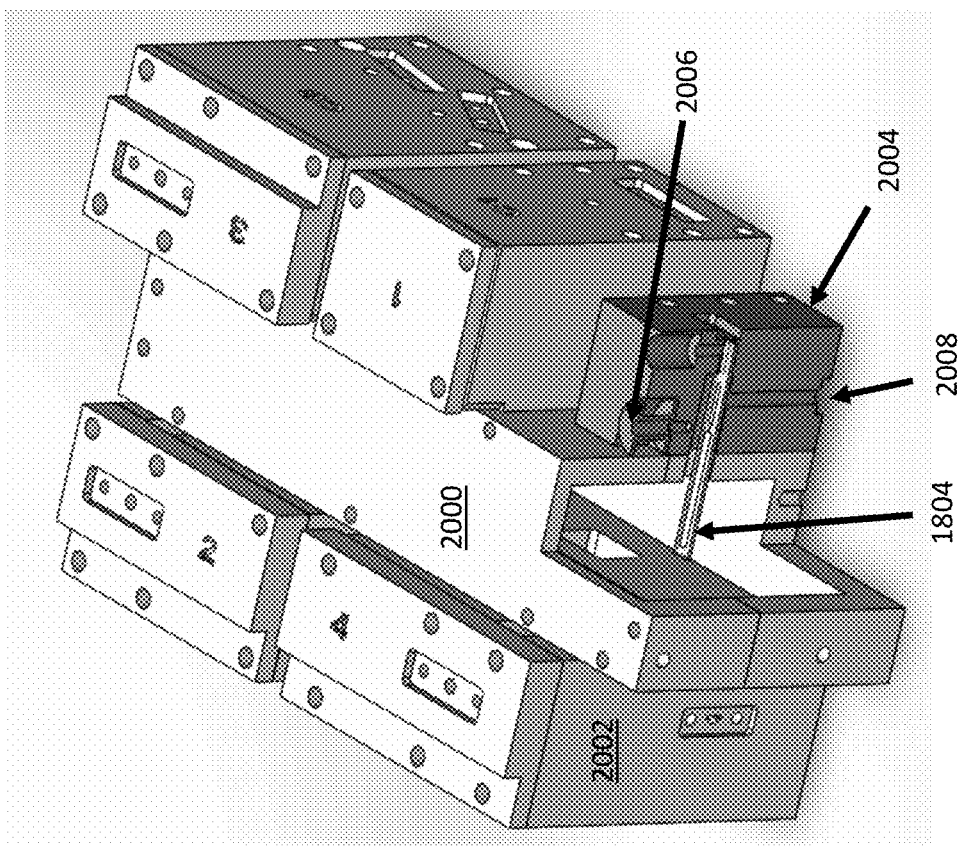
FIGS. 20A-20B are models of exemplary routers coupled to four exemplary modules.
Figure 20A:
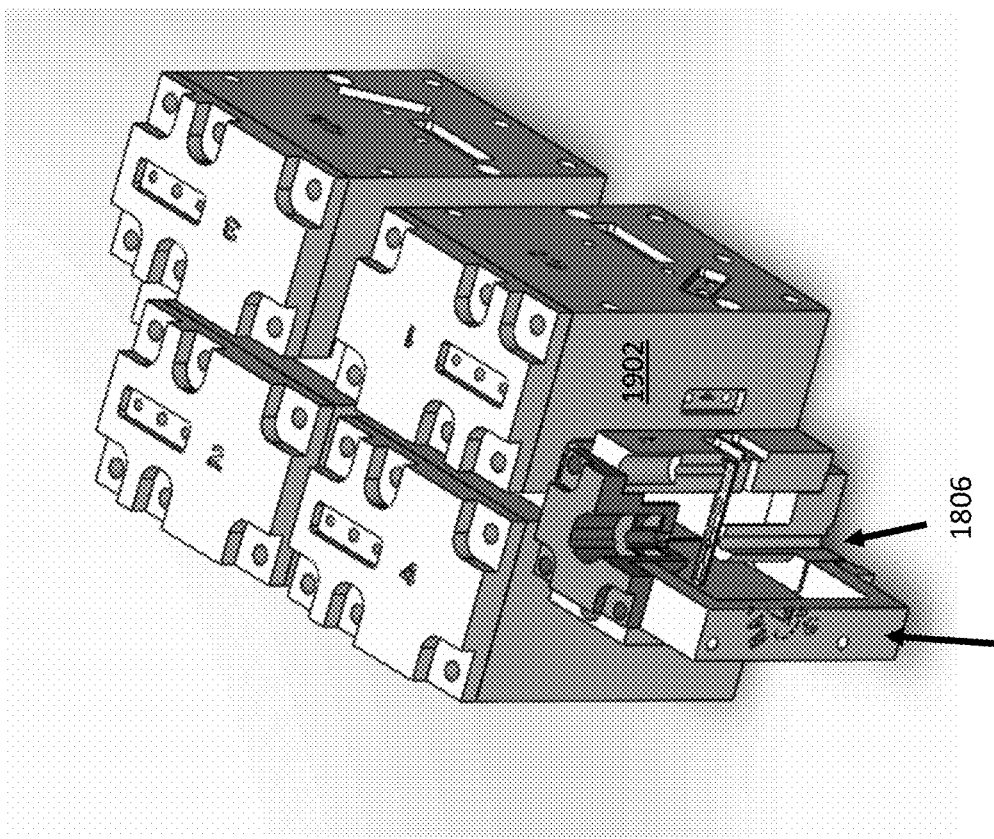

FIG. 20A is a model of a router 1800 coupled to four exemplary modules 1902 with the following experimentally verified properties:

$$T_{1,cav} \approx 700 \ \mu s$$

$$T_{1,wg} \approx 0.8 \ \mu s$$

$$(g/\Delta)_{ws} \approx 0.1$$

where $T_{1,cav}$ represents the lifetime of light in the cavity modes, $T_{1,wg}$ represents the lifetime of light in the waveguide modes, and $(g/\Delta A)_{ws}$ is the hybridization factor as described above. FIG. 20B is a model of a router 2000 coupled to four exemplary modules 2002 and element 2004 with the following design specifications:

$$T_{1,cav} \approx 700 \text{ µs}$$

$$T_{1,wg} \approx 3 \text{ µs}$$

$$(g/\Delta)_{ws} \approx 0.07$$

Element 2004 includes magnet 2006 and pump port 2008 and can be configured to hold at least a portion of the SNAIL 1804. One advantage of the model of FIG. 20B is the relative ease of manufacture or machining as compared that of FIG. 20A. Another advantage is that the model of FIG. 20B does not introduce extra modes in the router itself (e.g., in 2000) via the coupler post and magnet mount.

Figure 21:
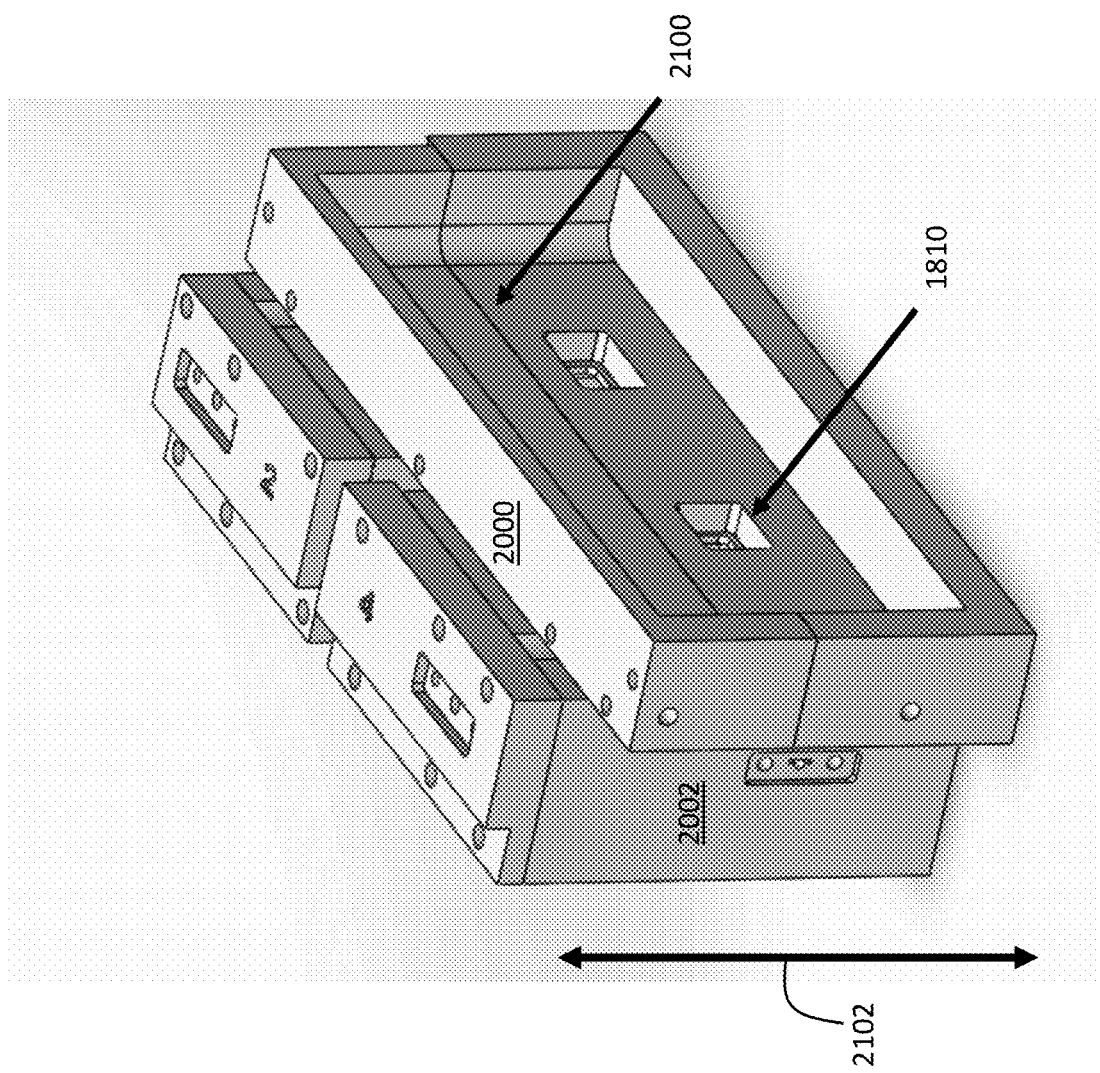
FIG. 21 is a cross-sectional view of the exemplary router of FIG. 20B coupled to two modules.

FIG. 21 is a cross-sectional view of the router 2000 coupled to two modules 2002. In some embodiments, the machining of the router 2000 may require a seam 2100 across a portion of the router 2000. In some instances, the position of the seam 2100 may affect the lifetime of the cavity. Given $g_{seam} \approx 1000 \ (\Omega \cdot m)^{-1}$, the position along axis 2102 of the seam 2100 may be determined on the router 2000. For example, the determined position may equal the condition that all the cavity lifetimes are greater than 750 µs. The quality factor associated with the seam can be defined as:

$$Q_{seam} = \omega E_{tot}/P_{loss}$$

where $$P_{loss} = \frac{1}{2g_{seam}} \int_{seam} (\vec{J} \times \hat{\imath})^2 dl$$

Figure 22B:
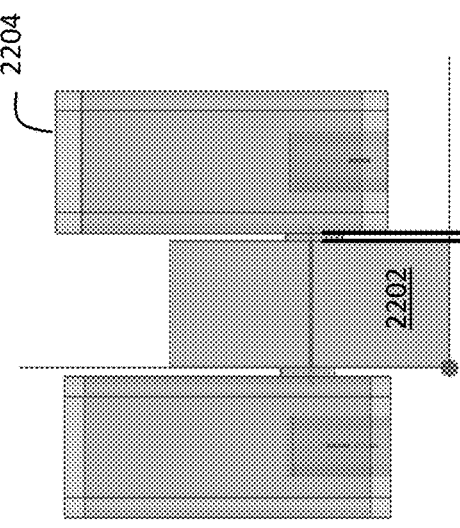
Figure 22A:
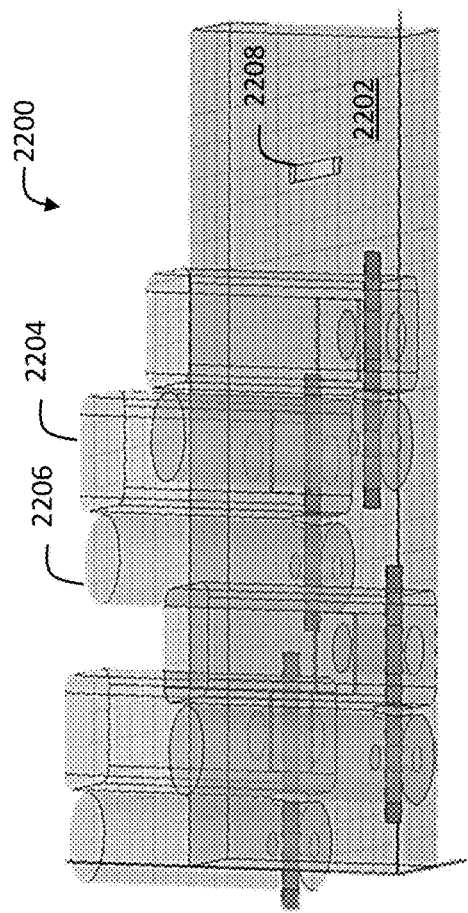
Figure 22D:
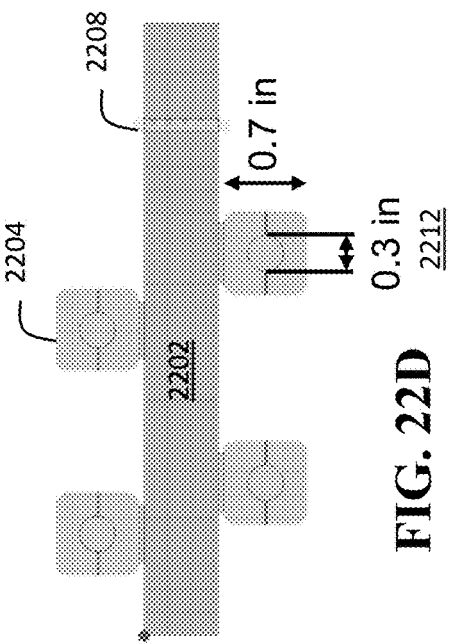
Figure 22C:
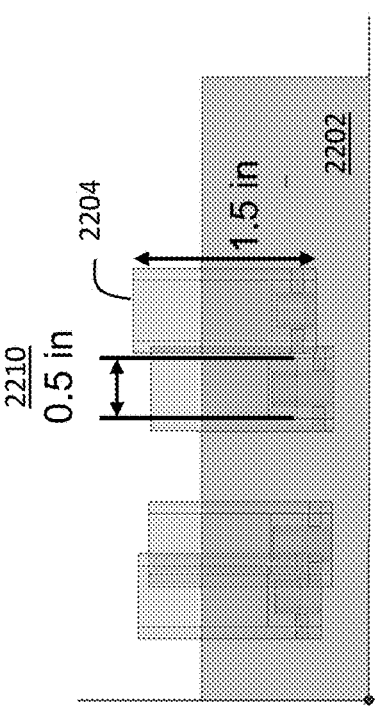
Figure 22H:
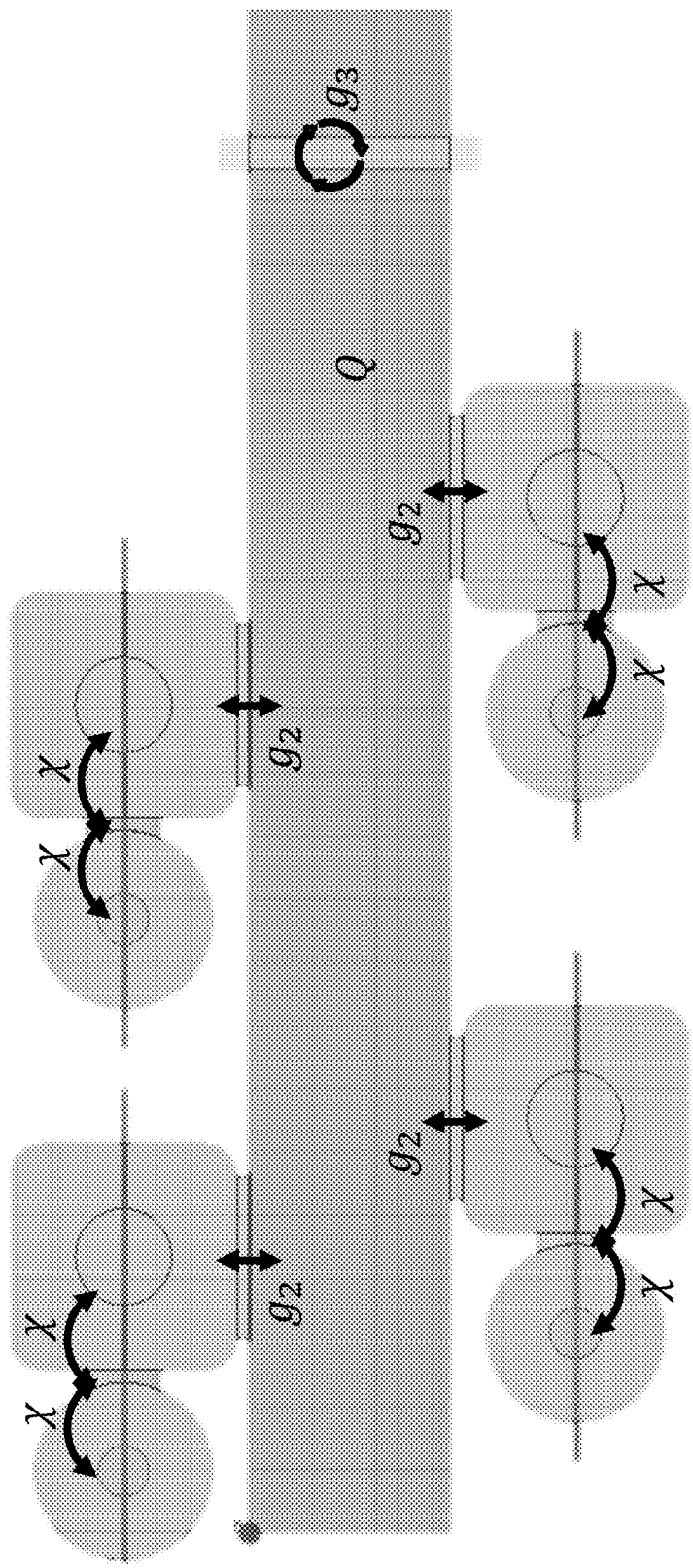

FIGS. 22A-22H depict multiple views of an exemplary quantum router system 2200, including a router 2202, modules having communication cavities 2204 and readout cavities 2206, and a nonlinear element 2208. In particular, the views illustrate the various dimensions and specifications of one or more components of the system 2200. For instance, the communication cavities 2204 may have the following exemplary dimensions:

Height: 1.5 in
Side length: 0.7 in
Bottom pin radius: 0.15 in
Corner radius: 0.1 in
Hole 2210: 0.5 in
Hole length: 0.04 in
Pin height: 0.3-0.5 in
Hole 2212: 0.23-0.27 in The readout cavities 2206 may have the following exemplary dimensions:

Cavity radius: 7 mm
Bottom pin radius: 2 mm
Bottom pin height: 7 mm
Tunnel length: 1 mm
Tunnel radius: 3 mm FIG. 22H depicts the coupling terms for system 2200 as follows:

$$g_3 \approx 0.1\text{-}0.6 \text{ MHz}$$

$$g_2 = 7 \text{ MHz}$$

$$X = 1.3 \text{ MHz}$$

with quality factor:

$$Q_{Cu} = 16000$$

In various embodiments, the pump port 1806 can be configured to pump photons at a particular frequency to attain the desired parametric photon transitions, as discussed herein. For example, the pump port 1806 may be coupled to a filter and/or directional coupler to enable medium-lived waveguide modes and/or long-lived cavity modes. In some cases, pump port 1806 can be configured such that it is easy to pump (e.g., require less energy) at low frequencies. The exemplary pump port 1806 may have following decay rates:

$$\kappa_s/2\pi \approx 3.7 \text{ MHz}$$

$$\kappa_w/2\pi \approx 0.3 \text{ MHz}$$

Figure 23:
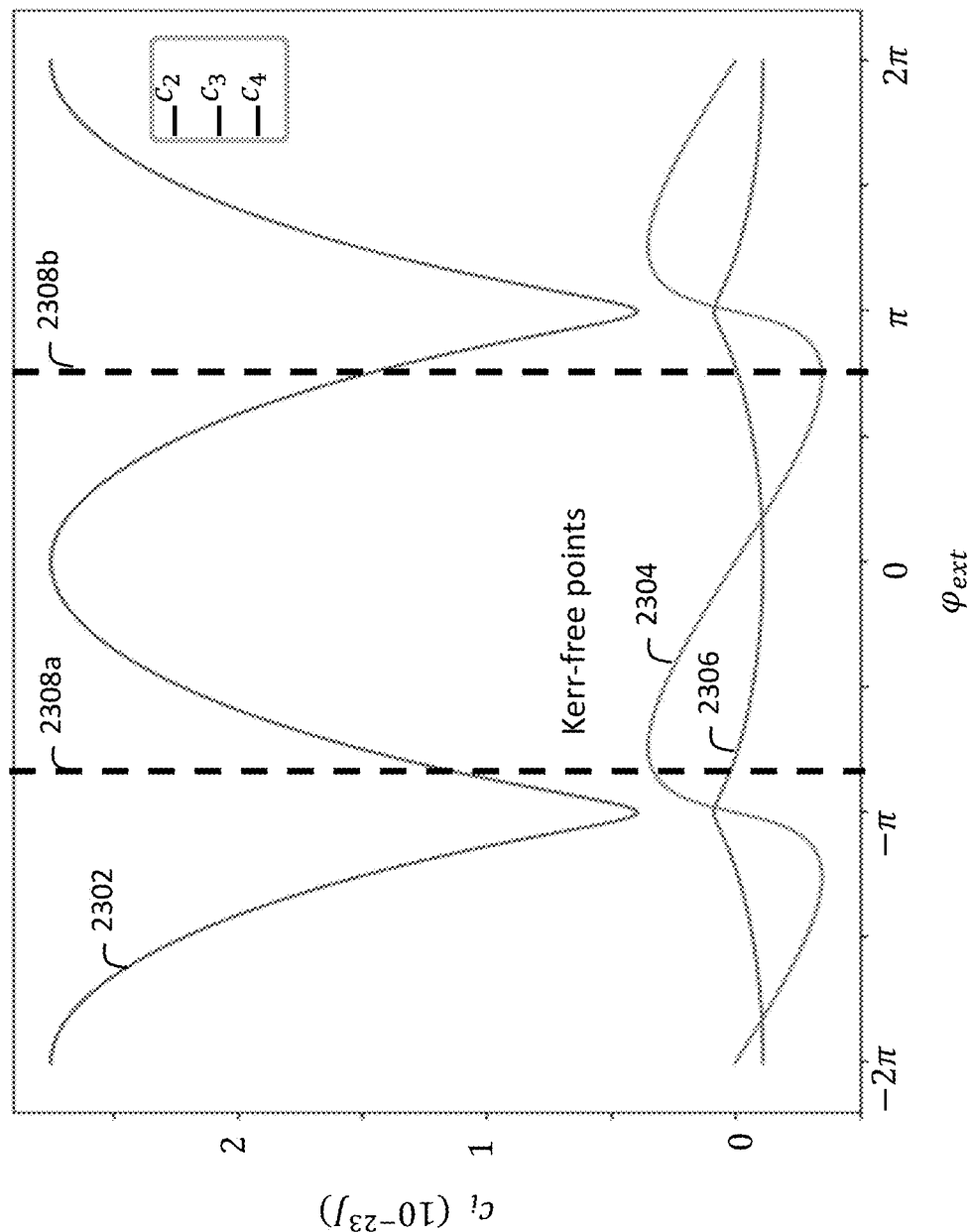
FIG. 23 is a plot illustrating the nonlinearity property of a SNAIL.

FIG. 23 is a plot illustrating the nonlinearity property of a SNAIL. The Hamiltonian of the SNAIL can be expressed as:

$$H_{SNAIL} = c_2(\varphi_{ext})\varphi^2 + c_3(\varphi_{ext})\varphi^3 + c_4(\varphi_{ext})\varphi^4 + \ldots$$

In particular, line 2302 is proportional to the SNAIL frequency; line 2304 represents the third-order strength; and line 2306 represents the fourth-order term (Kerr). The plot illustrates that the SNAIL can be tuned with a particular frequency 2302 at line 2308a and/or line 2308b while keeping the fourth-order Kerr at or near zero and with a high third-order non-linearity (discussed above).

Figure 24:
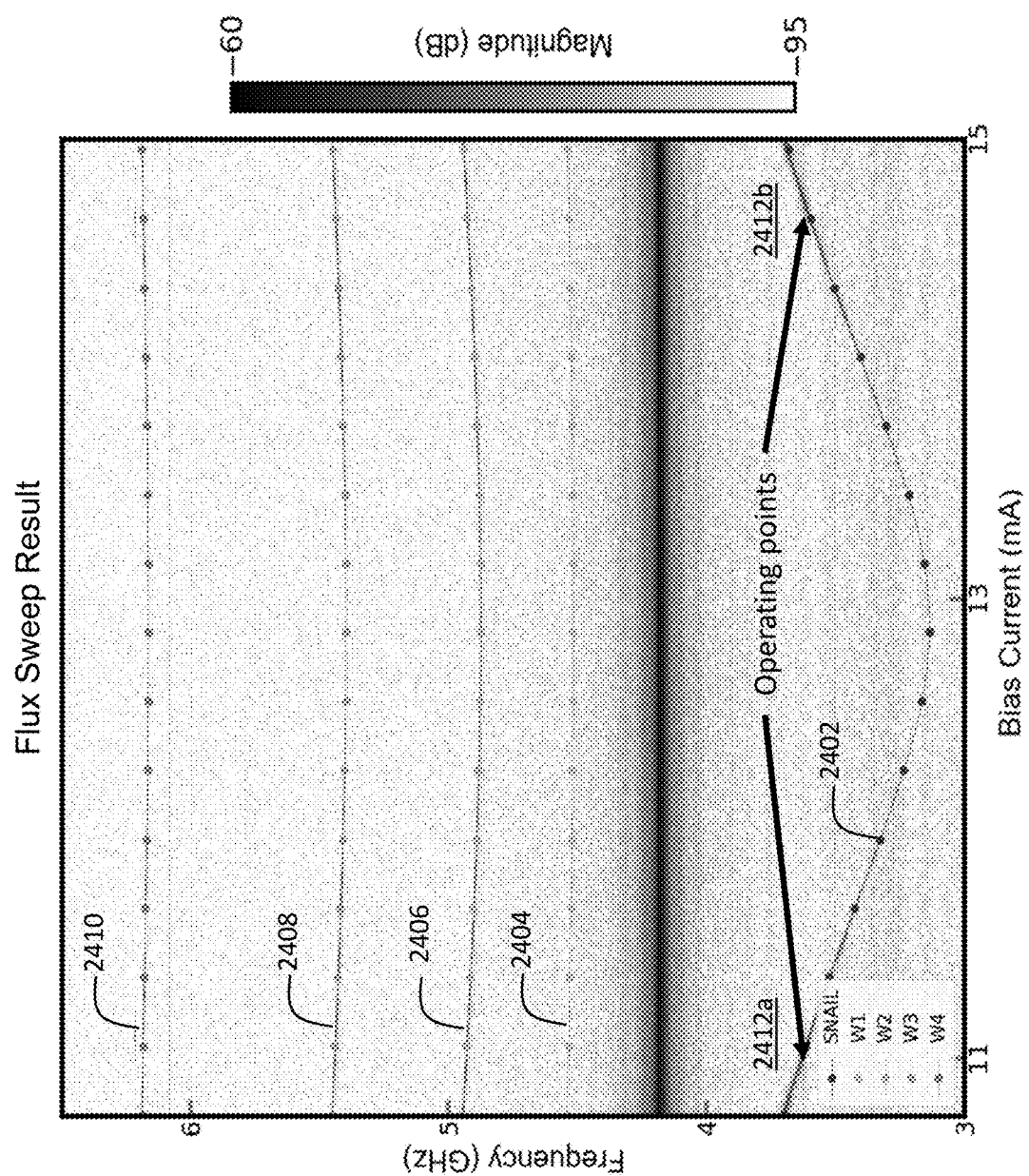
FIG. 24 is a plot of measurements of the mode frequency (GHz) and magnitude (dB) of flux as a function of bias current (mA) in an exemplary quantum router system.

FIG. 24 is a plot of measurements of the mode frequency (GHz) and magnitude (dB) of flux as a function of bias current (mA) in an exemplary quantum router system. In the plot, line 2402 represents data for the SNAIL mode; line 2404 represents data for waveguide mode $w_1$; line 2406 represents data for waveguide mode $w_2$; line 2408 represents data for waveguide mode $w_3$; and line 2410 represents data for waveguide mode $w_4$. The operating points are indicated at points 2412a and 2414b (where separate measurements show Kerr nearly nulled) equivalent to the points 2308a and 2308b respectively in FIG. 23.

Figure 25A:
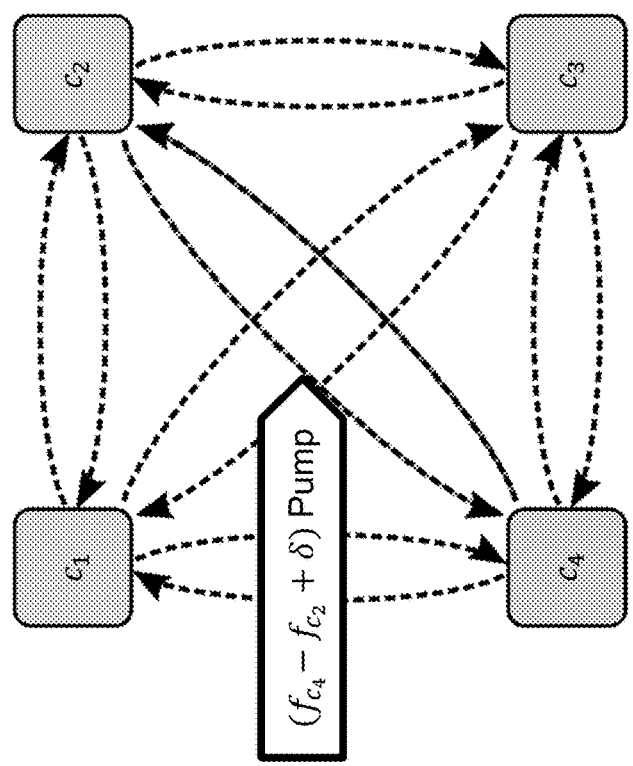
FIG. 25A is a diagram of quantum transition pathways between four module cavities $c_1$, $c_2$, $c_3$, $c_4$.
Figure 25B:
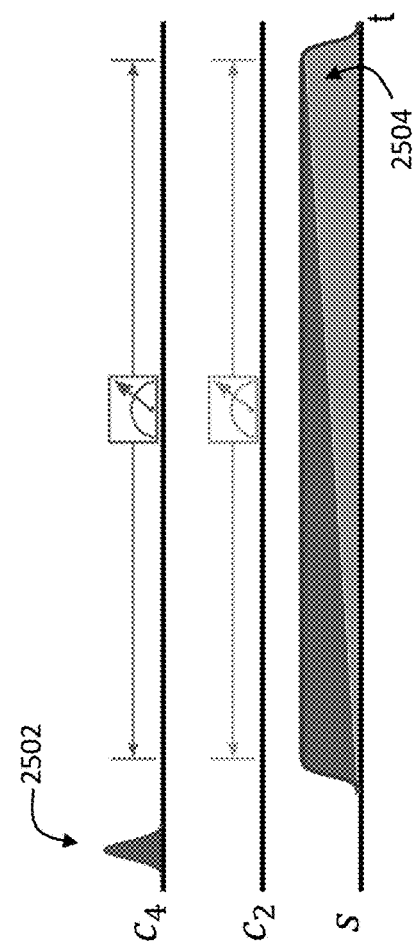
FIG. 25B illustrates the photon swap between modes of cavities $c_2$ and $c_4$ as function of time.

FIG. 25A is a diagram of quantum transition pathways between four module cavities $c_1$, $c_2$, $c_3$, $c_4$. FIG. 25A illustrates the pumping at $f_{pump}=(f_{c_4}-f_{c_2}+\delta)$, which is the difference between the frequencies of the two modes $c_2$ and $c_4$ with an additional empirical detuning term $\delta$. FIG. 25B illustrates the photon swap between modes of cavities $c_2$ and $c_4$ as function of time. In particular, the light is inputted to mode $c_4$ (peak 2502) and is swapped continuously back and forth to mode $c_2$, as depicted by drive of the SNAIL mode s in graphic 2504. Light leaking out of the weakly coupled ports of the cavities can be monitored while the swapping drive is applied.

Figure 26:
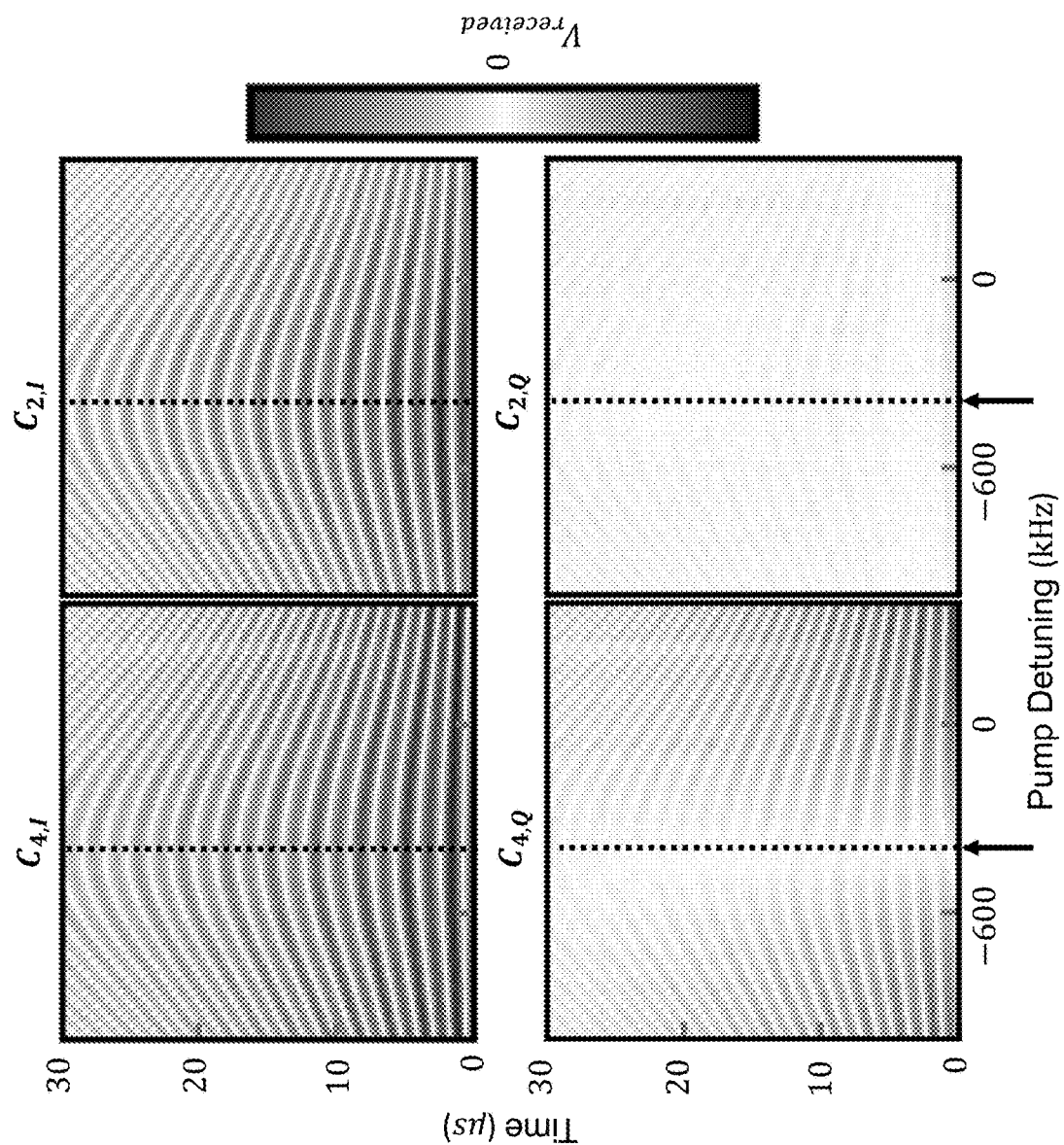
FIG. 26 is a set of plots illustrating the pump detuning frequency as a function of time for each of the four cavities $c_1$, $c_2$, $c_3$, $c_4$ of FIG. 25A.

FIG. 26 is a set of plots illustrating continuous swapping of light between the cavities $C_2$ and $C_4$, monitored as a coherent I/Q voltage for both cavities. The period of the fringes indicates the swapping rate, and the dotted lines indicate the detuned frequency of an example optimum operation.

Figure 27:
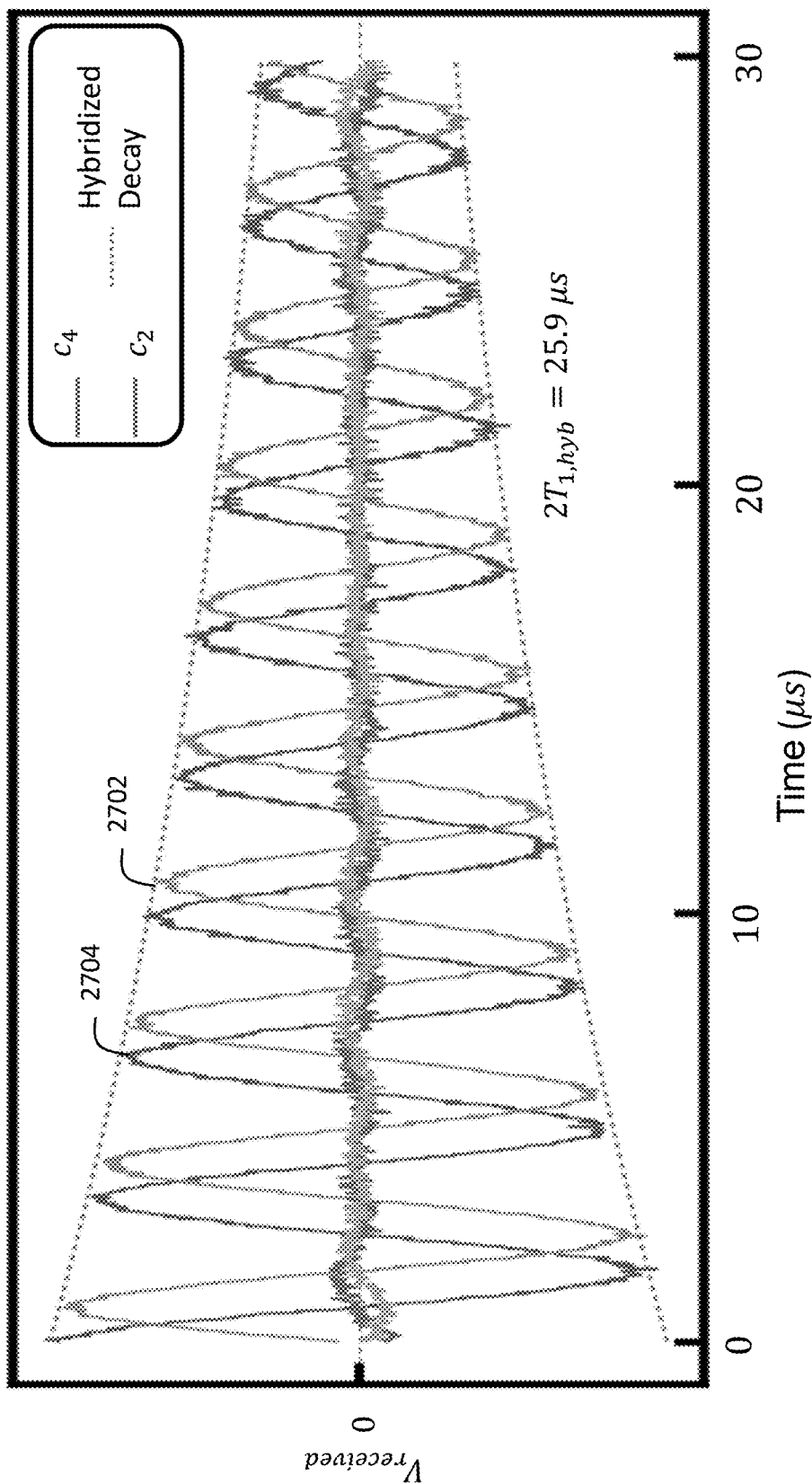
FIG. 27 is a plot of measured photon transitions between cavities $c_2$ and $c_4$ as a function of time.

FIG. 27 illustrates an exemplary optimum drive frequency for photon swapping between cavities $c_2$ and $c_4$. In particular, the plot is of the received voltage waveforms 2702 (cavity $c_2$) and 2704 (cavity $c_4$) as a function of time, illustrating the swap trace at pump detuning of −416 kHz with a hybridization lifetime of $2T_{1,hyb}=25.9$ µs. To examine how the photon is swapped between two cavity modes, the decay rate of each cavity may be measured. From the decay rate, the photon decay trace 2502 can be determined. As illustrated, the photons are swapped between cavities $c_2$ and $c_4$ with minimal exchange with the waveguide modes.

TABLE 7

Exemplary photon transition durations for particular pairs of cavities.

| Swap Pair | Swap Time (ns) |
|---|---|
| $C_1C_2$ | 1248 |
| $C_1C_3$ | 651 |
| $C_1C_4$ | 535 |
| $C_2C_3$ | 942 |
| $C_2C_4$ | 832 |
| $C_3C_4$ | 375 |

FIGS. 28A-28C are plots of the photon swap rate and exemplary optimal pump frequency detuning as a function of pump power. FIG. 28A illustrates the pump power as a function of time. The plot of FIG. 28B confirms that the swap rates measured in plot of FIG. 27 appear as expected. The swap rate (in $\mu s^{-1}$) can be expressed as:

$$\Gamma_{SWAP} = g_3 \cdot \sqrt{10^{P-a}/10}$$

where a is the power offset. The function above indicates that the swap rate $\Gamma_{SWAP}$ scales with the square root of the pump power $10^{P-a}/10$. The plot of FIG. 28C confirms that the detunings of the pumping frequency $f_{pump}$ appear as expected. The shifts in pumping frequency can be expressed as:

$$\delta = g_4 \cdot 10^{P-a}/10$$

where $\delta$ is the detuning in pumping frequency, the term $g_4$ is the fourth-order Kerr, and $10^{P-a}/10$ represents the pump power.

FIGS. 29A-29C illustrate parallel photon swap between two pairs of cavities. FIG. 29A is a diagram illustrating the photon transition between cavities $c_1$ and $c_4$ and between cavities $c_2$ and $c_3$. FIGS. 29B-29C illustrate that the photon swaps between cavities $c_1$ (line 2902) and $c_4$ (line 2904) and between cavities $c_2$ (line 2906) and $c_3$ (line 2908) at the same or approximately the same rate. These parallel photon swaps can be executed at the same time. Further, the parallel photon swap operation depicted in FIGS. 29A-29C can be realized in any number of pairs of cavity modes, e.g., two (2) pairs, three (3) pairs, four (4) pairs, five (5) pairs, etc. This may be subject to hardware limitations (e.g., the size of the waveguide and/or the size of modules). The table below lists the detuning of the pumping frequency $f_{pump}$ for each of the single swap and parallel swap operations.

TABLE 8

Exemplary pump detuning frequencies for particular pairs of cavities.

| Swap type | | Pump detune (kHz) |
|---|---|---|
| $C_4C_1$ | Single swap | −200 |
| | Parallel swap | −10 |
| $C_3C_2$ | Single swap | −240 |
| | Parallel swap | 60 |

FIGS. 30A-30C illustrate V-shaped swap among a group of cavities. FIG. 30A is a diagram illustrating the photon transition between cavities $c_2$ and $c_4$ and between cavities $c_2$ and $c_3$. FIGS. 30B-30C illustrate that the photon swaps between cavities $c_2$ and $c_4$ and between cavities $c_2$ and $c_3$ at the same or approximately the same rate. The measurements in FIG. 30C demonstrates the feasibility of the photon swap operation described above for FIG. 13D.

In particular, line 3002 represents the voltage measurement for cavity mode $c_2$; line 3004 represents the voltage measurement for cavity mode $c_4$; and line 3006 represents the voltage measure for cavity mode $c_3$. The measurements confirm that the light is fully present in cavity mode $c_2$ while having "split" presence between cavity modes $c_3$ and $c_4$.

Note that the V-shaped photon swap operation depicted in FIGS. 30A-30C can be realized in any number of triplets (groups of three) of cavity modes, e.g., one (1) triplet, two (2) triplets, three (3) triplets, four (4) triplets, etc. In some embodiments, two or more V-shaped photon swap operations can be executed at the same time. For example, a first V-shaped swap between cavity modes $c_2$, $c_3$, and $c_4$ (as depicted in FIG. 30A) and a second V-shaped swap between cavity modes $c_1$, $c_3$, and $c_4$ can be executed in parallel. This may be subject to hardware limitations (e.g., the size of the waveguide and/or the size of modules). The table below lists the detuning of the pumping frequency $f_{pump}$ for each of the single swap and V-shaped swap operations.

TABLE 9

Exemplary pump detuning frequencies for particular pairs of cavities.

| Swap type | | Pump detune (kHz) |
|---|---|---|
| $C_2C_3$ | Single swap | −129 |
| | V-shaped swap | −79 |
| $C_2C_4$ | Single swap | −150 |
| | V-shaped swap | −80 |

Figure 31A:
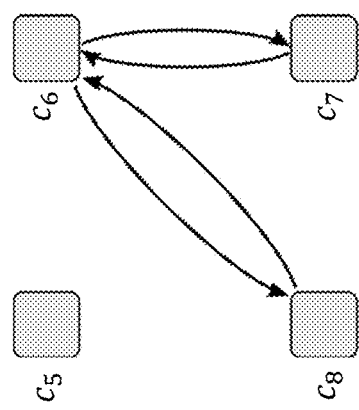
FIG. 31A is a diagram illustrating an example of a non-overlapping swapping operation.
Figure 31B:
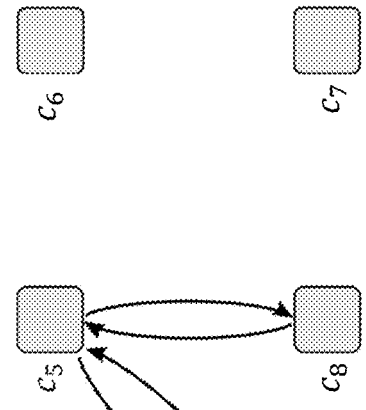
FIG. 31B is a diagram illustrating an example of an overlapping operation.

In some embodiments, one or more parallel photon swaps and one or more V-shaped photon swaps can be executed in non-overlapping manner or in an overlapping manner FIG. 31A illustrates an example of a non-overlapping operation that includes (1) a parallel photon swap between cavity modes $c_1$ and $c_4$ and between cavity modes $c_2$ and $c_3$ and (2) a V-shaped photon swap between cavity modes $c_6$, $c_7$, and $c_8$. FIG. 31B illustrates an example of an overlapping operation that includes (1) a parallel photon swap between cavity modes $c_1$ and $c_4$ and (2) a four-module 'N' shaped photon swap (e.g., including a V-shaped swap) between cavity modes $c_2$, $c_3$, $c_5$, and $c_8$. In various embodiments, any number of modules may be linked via multiple, simultaneous processes.

Figure 32A:
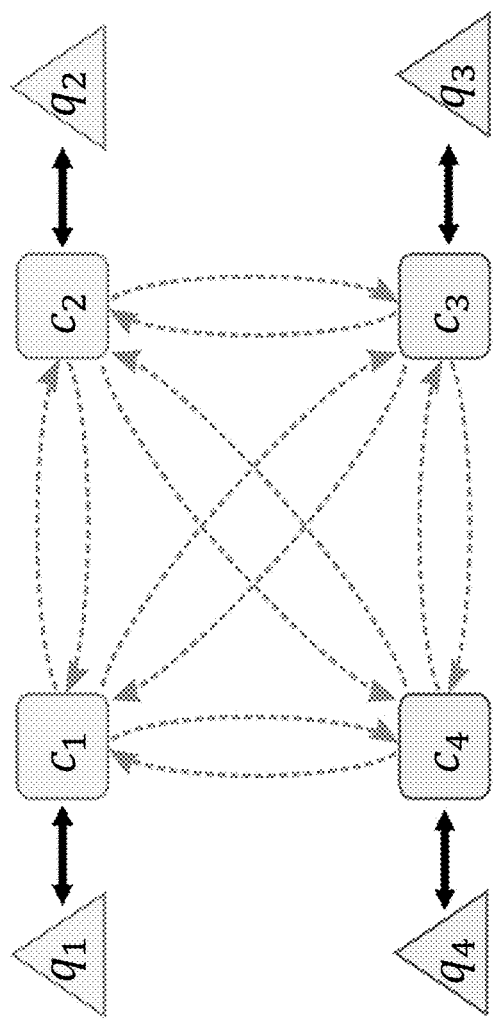
FIGS. 32A-32B are diagrams illustrating the adding of qubits $q_1$, $q_2$, $q_3$, $q_4$ (e.g., units of quantum information) to module cavities $c_1$, $c_2$, $c_3$, $c_4$.
Figure 32B:
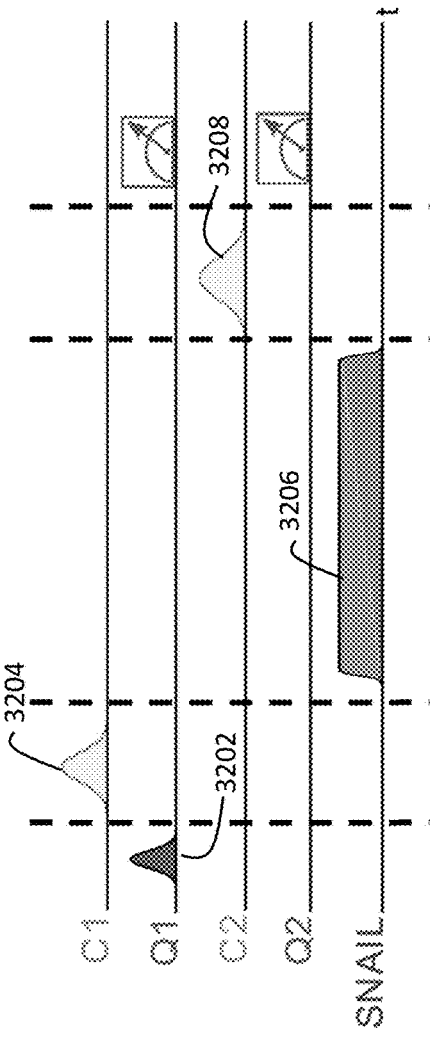

FIGS. 32A-32B illustrate the adding of qubits $q_1$, $q_2$, $q_3$, $q_4$ (e.g., units of quantum information) to module cavities $c_1$, $c_2$, $c_3$, $c_4$. In FIG. 32B, all modes start in the ground state. A $\pi\pi/2$ pulse is applied to qubit $q_1$ to prepare a superposition state which is then entangled with cavity C1 via a qubit-cavity 'CNOT' gate, where the logical states in C1 are Fock states. The C1 cavity state is swapped via the router to cavity C2, and then via an intra-module swap operation to Q2. Q1 and Q2 are then in a Bell state, which can be verified via tomography.

Methods for Routing Quantum Signals

Figure 33:
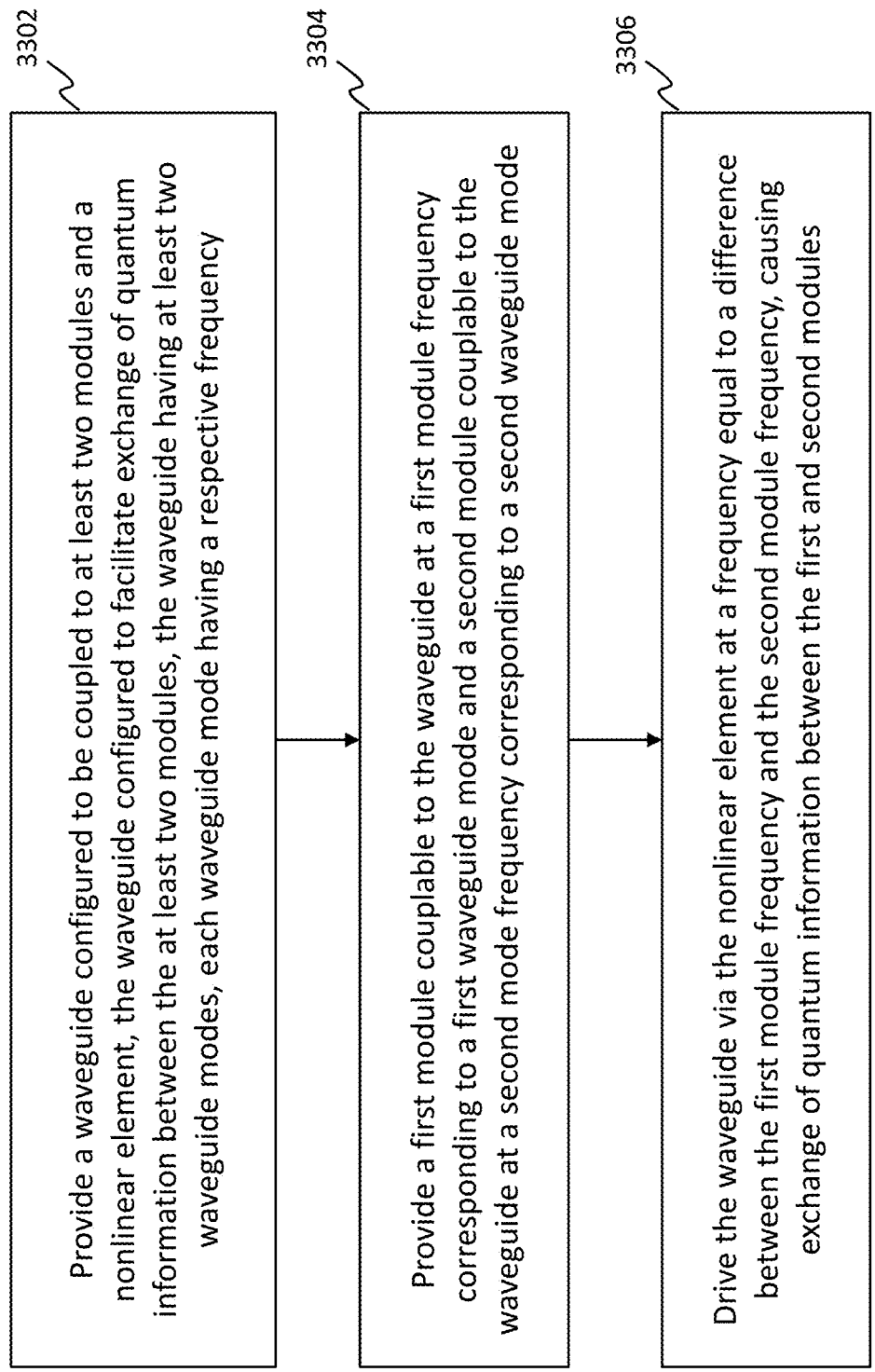
FIG. 33 is a flowchart of an exemplary method for routing quantum signals in a quantum computing system.

FIG. 33 is a flowchart of an exemplary method for routing quantum signals in a quantum computing system. In step 3302, a waveguide (e.g., waveguide 206, 606, 1002, etc.) configured to be coupled to two or more modules (e.g., modules 202, 802, 1004, etc.) is provided. In some embodiments, the waveguide can be coupled to four or more modules. The waveguide can be configured to facilitate exchange of quantum information between the modules. As described above, the waveguide has a nonlinear element, e.g., a superconducting nonlinear asymmetric inductive element (SNAIL) or superconducting quantum interference device (SQUID). The waveguide can have at least two waveguide modes. The waveguide modes each have a respective frequency, as described above. In some embodiments, the number of waveguide modes corresponds to the number of modules.

In step 3304, two or more modules are provided such that they are each couplable to the waveguide. Each of the modules can be coupled to a corresponding waveguide mode. For instance, the first module has a first module frequency corresponding to the first waveguide mode, the second module has a second module frequency corresponding to the second waveguide mode, and so on. In some embodiments, each module frequency is detuned from the corresponding waveguide mode's frequency by a detuning frequency.

In step 3306, the waveguide can be driven via the nonlinear element at a first difference frequency $f_{d1}$ equal to the difference between the first module frequency and the second module frequency, thereby causing the exchange of quantum information between the first module and the second module. In some embodiments, the exchange of quantum information includes parametric photon exchange, as described above. In some embodiments, the first waveguide mode can be coupled to the second waveguide mode.

In some embodiments, a third module is provided such that it is couplable to the waveguide at a third module frequency corresponding to a third waveguide mode. In some embodiments, the waveguide can be driven at a second difference frequency $f_{d2}$ equal to the difference between the first module frequency and the third module frequency, causing the exchange of quantum information between the first and third modules. In some embodiments, the waveguide can be driven at third difference frequency $f_{d3}$ equal to the difference between the second module frequency and the third module frequency, causing the exchange of quantum information between the second and third modules. In some embodiments, the waveguide can be driven at two more difference frequencies simultaneously. For example, the waveguide can be driven with difference frequencies $f_{d1}$, $f_{d2}$, and/or $f_{d3}$ at the same time. In some embodiments, each difference frequency is different from every other difference frequency. For example, each difference frequency is different from another difference frequency by 10 MHz to 1000 MHz.

Terminology

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for routing quantum signals in a quantum computing system, the method comprising:
providing a waveguide configured to be coupled to at least two modules and a nonlinear element, the waveguide configured to facilitate exchange of quantum information between the at least two modules, the waveguide having at least two waveguide modes, each waveguide mode having a respective frequency;
providing a first module couplable to the waveguide at a first module frequency corresponding to a first waveguide mode of the at least two waveguide modes and a second module couplable to the waveguide at a second module frequency corresponding to a second waveguide mode of the at least two waveguide modes; and
driving the waveguide via the nonlinear element at a first difference frequency equal to a difference between the first module frequency and the second module frequency, thereby causing exchange of quantum information between the first module and the second module.

2. The method of claim 1, further comprising:
establishing coupling between the first waveguide mode and the second waveguide mode of the at least two waveguide modes.

3. The method of claim 1, wherein the exchange of quantum information comprises parametric photon exchange.

4. The method of claim 1, wherein each module frequency is different from a corresponding waveguide mode frequency by a respective detuning frequency.

5. The method of claim 1, further comprising:
providing a third module couplable to the waveguide at a third module frequency corresponding to a third waveguide mode; and
driving the waveguide via the nonlinear element at a second difference frequency equal to a difference between the first module frequency and the third module frequency, thereby causing exchange of quantum information between the first module and the third module.

6. The method of claim 5, wherein the driving the waveguide at the first difference frequency is at a same time as the driving the waveguide at the second difference frequency.

7. The method of claim 6, wherein the waveguide is driven such that (i) the exchange of quantum information between the first module and the second module and (ii) the exchange of quantum information between the first module and the third module occurs in parallel.

8. The method of claim 5, wherein the first difference frequency is different from the second difference frequency.

9. The method of claim 8, wherein the first difference frequency is different from the second difference frequency by 10 MHz to 1000 MHz.

10. The method of claim 1, further comprising:
providing a third module couplable to the waveguide at a third module frequency corresponding to a third waveguide mode;
providing a fourth module couplable to the waveguide at a fourth module frequency corresponding to a fourth waveguide mode; and
driving the waveguide via the nonlinear element at a second difference frequency equal to a difference between the third module frequency and the fourth module frequency, thereby causing exchange of quantum information between the third module and the fourth module.

11. The method of claim 10, wherein the waveguide is driven such that (i) the exchange of quantum information between the first module and the second module and (ii) the exchange of quantum information between the third module and the fourth module occurs in parallel.

12. The method of claim 1, wherein the nonlinear element is one of a superconducting nonlinear asymmetric inductive element (SNAIL) or superconducting quantum interference device (SQUID).

13. A system for routing quantum signals, the system comprising:
a waveguide couplable to at least two modules and a nonlinear element, the waveguide configured to facilitate exchange of quantum information between the at least two modules, the waveguide comprising at least two waveguide modes, each waveguide mode having a respective frequency;
a first module couplable to the waveguide at a first module frequency corresponding to a first waveguide mode of the at least two waveguide modes; and
a second module couplable to the waveguide at a second module frequency corresponding to a second waveguide mode of the at least two waveguide modes, wherein the nonlinear element is configured to drive the waveguide at a first difference frequency equal to a difference between the first module frequency and the second module frequency, thereby causing exchange of quantum information between the first and the second modules.

14. The system of claim 13, wherein the first waveguide mode of the at least two waveguide modes is configured to be coupled to the second waveguide mode of the at least two waveguide modes.

15. The system of claim 13, wherein the exchange of quantum information comprises parametric photon exchange.

16. The system of claim 13, wherein each module frequency is different from a corresponding waveguide mode frequency by a respective detuning frequency.

17. The system of claim 13, further comprising:
a third module couplable to the waveguide at a third module frequency corresponding to a third waveguide mode, wherein the nonlinear element is configured to drive the waveguide at a second difference frequency equal to a difference between the first module frequency and the third module frequency, thereby causing exchange of quantum information between the first and the third modules.

18. The system of claim 15, wherein the nonlinear element is configured to drive the waveguide at the first difference frequency and the waveguide at the second difference frequency at a same time.

19. The system of claim 15, wherein the first difference frequency is different from the second difference frequency.

20. The system of claim 11, wherein the nonlinear device is one of a superconducting nonlinear asymmetric inductive element (SNAIL) or superconducting quantum interference device (SQUID).

* * * * *